Figure 1:
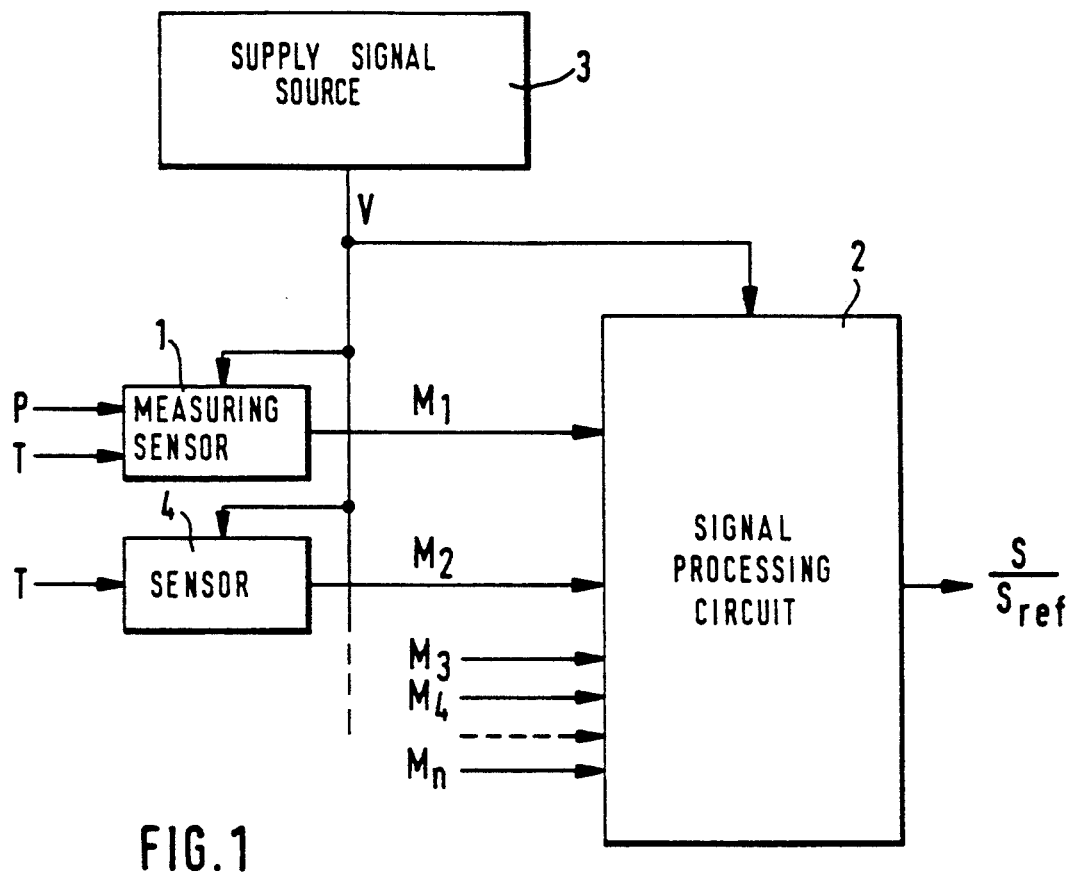

United States Patent [19]

Schneider et al.

[11] Patent Number: 5,257,210
[45] Date of Patent: Oct. 26, 1993

[54] PROCESSOR FOR PROCESSING SENSOR SIGNALS TO OBTAIN A DESIRED TRANSFER BEHAVIOR

[75] Inventors: Georg Schneider, Schopfheim-Langenau; Richard Wagner, Maulburg, both of Fed. Rep. of Germany

[73] Assignee: Endress u. Hauser GmbH u. Co., Fed. Rep. of Germany

[21] Appl. No.: 583,820

[22] Filed: Sep. 17, 1990

[30] Foreign Application Priority Data

Sep. 28, 1989 [DE] Fed. Rep. of Germany ....... 3932479
Dec. 7, 1989 [DE] Fed. Rep. of Germany ....... 3940537

[51] Int. Cl.$^5$ ............................................. G06F 15/332
[52] U.S. Cl. ................................... 364/553; 364/581; 364/556
[58] Field of Search .................... 364/553, 571.03, 572, 364/573, 571.01, 571.06, 581, 556; 341/119

[56] References Cited

U.S. PATENT DOCUMENTS

| | | | |
|---|---|---|---|
| 4,322,707 | 3/1982 | Ort | 338/2 |
| 4,329,878 | 5/1982 | Utner et al. | 73/766 |
| 4,402,054 | 8/1983 | Osborne et al. | 364/554 |
| 4,592,665 | 6/1986 | Wheable | 374/143 |
| 4,633,491 | 12/1986 | Kuehnel | 377/20 |
| 4,715,003 | 12/1987 | Keller et al. | 364/571.03 |
| 4,805,126 | 2/1989 | Rodems | 364/571.01 |
| 4,813,001 | 3/1989 | Sloane | 364/553 |
| 4,816,745 | 3/1989 | Schneider | 324/704 |
| 4,817,022 | 3/1989 | Jornod et al. | 364/571.03 |
| 4,873,655 | 10/1989 | Kondraske | 364/553 |

FOREIGN PATENT DOCUMENTS 0105120 4/1984 European Pat. Off. .
3242967 5/1984 Fed. Rep. of Germany .
3309802 9/1984 Fed. Rep. of Germany .

OTHER PUBLICATIONS

"VDI-Berichte, Nr. 509", VDI-Verlag GmbH, 1984, pp. 125-129, 141-145, 155-158, 165-167, 217-222, Germany.

"A Switched-Capacitor Charge-Balancing Analog-to-Digital Converter and Its Application to Capacitance Measurement", H. Matsumoto et al. IEEE Transactions on Instrumentation and Measurement, vol. IM-36, No. 4, Dec. 1987, pp. 873-878.

"Designer's Casebook", Eric G. Breeze, Electronics, pp. 78-79, Aug. 28, 1972.

Primary Examiner—Thomas G. Black
Assistant Examiner—Michael Zanelli
Attorney, Agent, or Firm—Barnes & Thornburg

[57] ABSTRACT

The arrangement serves to process sensor signals which are furnished by a measuring sensor and by one or more further sensors. The measuring sensor generates a measuring effect which depends on a physical measured quantity to be determined and on physical disturbance quantities and each further sensor generates a measuring effect which depends substantially only on physical disturbance quantities. The arrangement includes a signal processing circuit which receives the measuring effects as input quantities. By analog processing of the sensor signals the signal processing circuit furnishes an output quantity, the ratio of which to a reference quantity in dependence upon the measuring effects forming the input quantities is governed by a transfer function defined in specific manner. The coefficients of the transfer function are adjustable for obtaining the desired transfer behavior in dependence upon the properties of the measuring sensor, the influence of the disturbance quantities on the measuring effect of the measuring sensor thereby being compensated and errors in the relationship between the measured quantity and the measuring effect of the measuring sensor being corrected.

25 Claims, 18 Drawing Sheets

PROCESSOR FOR PROCESSING SENSOR SIGNALS TO OBTAIN A DESIRED TRANSFER BEHAVIOR

According to claim 1, the invention consists of an arrangement for processing sensor signals which are furnished by a measuring sensor, which in response to the physical action of a physical measured quantity to be determined and one or more physical disturbance variables generates a measuring effect $M_1$ which depends on the physical measured quantity to be determined and on the physical disturbance variables, and which are furnished by one or more further sensors which generate measuring effects $M_2, \ldots, M_n$ which depend substantially only on physical disturbance variables, comprising a signal processing circuit which receives the measuring effects as input quantities and which is so configured that by analog processing of the sensor signals it furnishes an output quantity S of which the ratio to a reference quantity $S_{ref}$ is defined in dependence upon the measuring effects $M_1, M_2, \ldots, M_n$ forming the input quantities by the transfer function $$\frac{S}{S_{ref}} = \frac{b_{11} + b_{12} \cdot M_2 + \ldots + b_{1n} \cdot M_n + (b_{21} + b_{22} \cdot M_2 + \ldots + b_{2n} \cdot M_n) \cdot M_1}{c_{11} + c_{12} \cdot M_2 + \ldots + c_{1n} \cdot M_n + (c_{21} + c_{22} \cdot M_2 + \ldots + c_{2n} \cdot M_n) \cdot M_1}$$

the coefficients $b_{11} \ldots b_{2n}$ and $c_{11} \ldots c_{2n}$ of which are adjustable for obtaining the desired transfer behaviour in dependence upon the properties of the measuring sensor.

In practically all sensors which serve to measure physical quantities the problem is encountered that the measuring effect furnished by the sensor does not have the desired relationship with the quantity to be determined. On the one hand, the relationship between measured quantity and measuring effect is usually not linear and on the other the measuring effect depends not only on the physical quantity to be determined but also on physical disturbance variables. One example for a physical disturbance variable frequently arising is the temperature. Most sensors are temperature dependent so that the measuring effect generated by them, which may for example be a capacitance ratio or a resistance ratio, depends not only on the physical quantity to be measured, for example pressure, humidity or the like, but also on the temperature.

It is known by a suitable processing of the sensor signal on the one hand to establish a desired usually linear relationship between the output of the signal processing circuit and the physical measured quantity to be determined and on the other hand to suppress the influence of certain disturbance or interfering variables. For example, in the German Periodical "VDI-Berichte", No. 509,1984, pp. 165 to 167, an arrangement is described for compensating the temperature error of a capacitive single-chamber differential pressure sensor in which the measuring capacitances are incorporated in combination with charge resistors in measuring integrators and are supplied from an amplitude-controlled sinusoidal oscillator of predetermined frequency. A reference integrator with fixed time constant is operated parallel to the measuring integrators. The output voltages of the integrators are weighted and summed and the rectified output voltage of the summation point is used for amplitude control of the sinusoidal oscillator by keeping it equal to a fixed reference voltage. The temperature compensation of the zero point and the compensation of the zero point shift is effected by additional weighting of the output signals of the integrators which are then summated to form the output signal representing the measured value.

This known arrangement is restricted to the processing of sensor signals of capacitive sensors and the correction of a single disturbance variable, that is the temperature. Furthermore, its principle cannot be applied to other types of analog signal processing, for example to the increasingly used signal processing by quantized charge transport with charge balancing by means of switch-capacitor structures ("switched capacitor charge balancing"). For example, the journal "IEEE Transactions on Instrumentation and Measurement", Vol. IM-36, No. 4, December 1987, p. 873 to 878, describes how the output signal of a capacitive differential pressure sensor can be processed by this principle and U.S. Pat. No. 4,816,745 describes how the output signal of a resistance sensor in the form of a half-bridge with oppositely variable resistances can be processed by the same principle. However, in these publications no steps are described for correcting the influence of disturbance variables or errors in the relationship between measured quantity and measuring effect.

The problem underlying the invention is the provision of an arrangement of the type mentioned at the beginning which permits the correction of the influence of any number of disturbance variables of any type on the measuring effect and the correction of errors in the relationship between the measured quantity and the measuring effect in a sensor of any type generating measuring effects of the type indicated at the beginning and which in particular is also suitable for signal processing by quantized charge transport with charge balancing by means of switch-capacitor structures.

With the transfer function of the signal processing circuit indicated above all important characteristic data of a sensor can be corrected in such a manner that the desired relationship is obtained between the measured quantity acting on the sensor and the output quantity of the signal processing circuit and the influences of all measuring effects originating from disturbance variables is corrected. For this purpose it is only necessary to measure the characteristic data of the sensor and correspondingly adjust the coefficients of the transfer function in the signal processing circuit, depending on the structure thereof. If the signal processing circuit is constructed according to one example of embodiment of the invention with weighting circuits for weighting the measuring effects the weighting factors of the weighting circuits are adjusted corresponding to the necessary coefficients of the transfer function. If the signal processing circuit operates with quantized charge transport and charge balancing by means of switch-capacitor structures, the transfer function in accordance with a particularly advantageous embodiment of the invention is implemented by generating additional correction charge packets which are incorporated into the charge balance. In this case, the coefficients of the transfer function can be set to the necessary values by adjusting the capacitances, resistances and/or voltages governing the correction charge packets.

The signal processing circuit may be designed to provide both an analog output signal and different kinds of digital output signals.

The invention is thus applicable to all types of sensors generating measuring effects of the type indicated and the usual use of such sensors is not impaired in any way by employment of the invention. Advantageous embodiments and further developments of the invention are characterized in the subsidiary claims.

Figure 2:
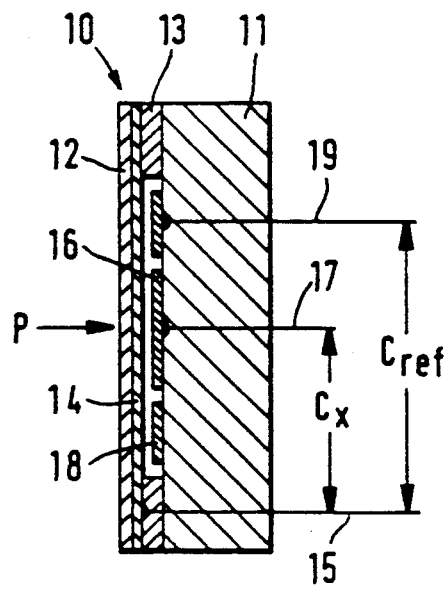
Figure 3:
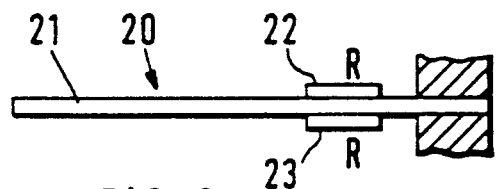
Figure 4:
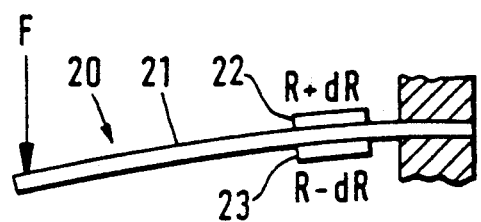
Figure 5:
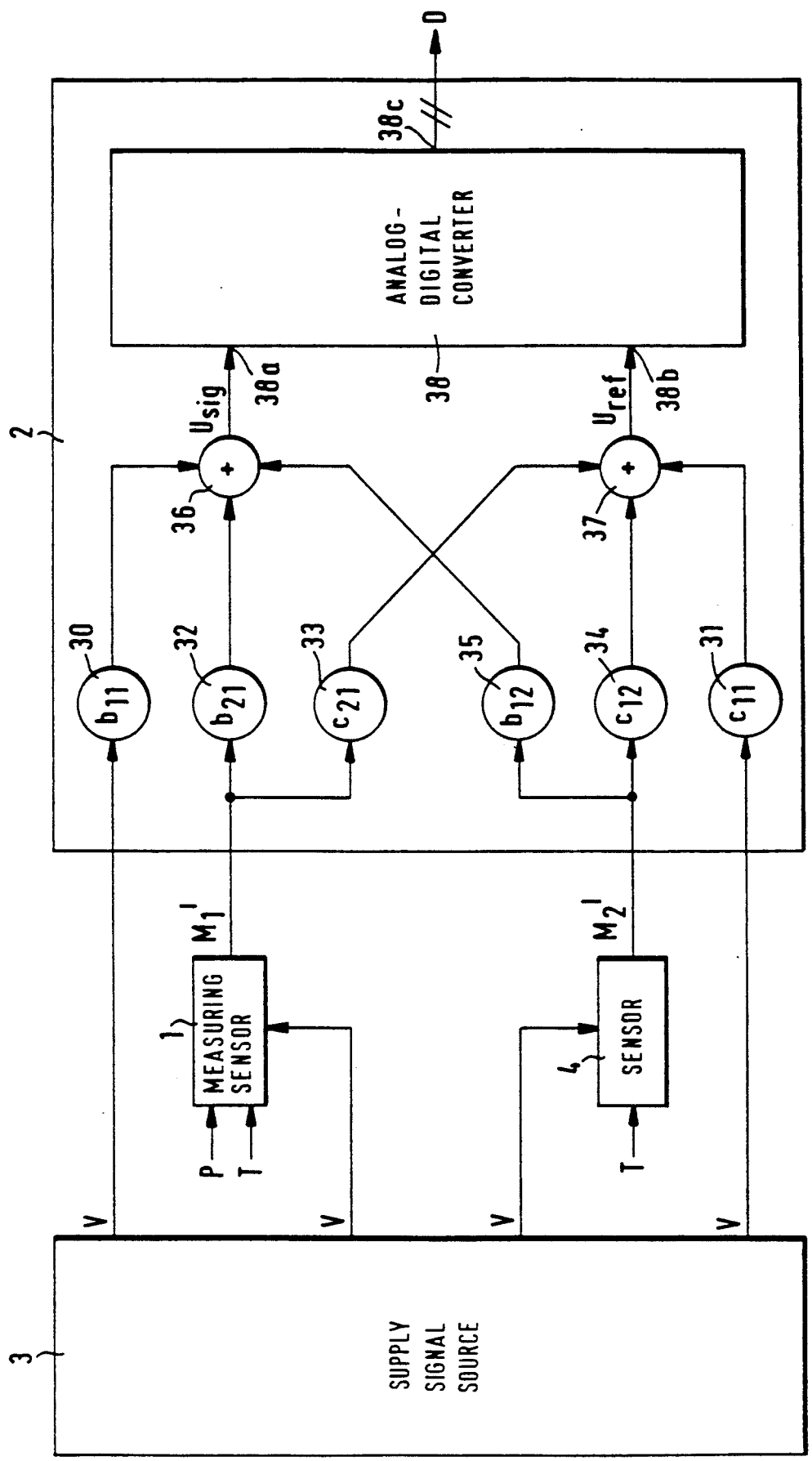
Figure 6:
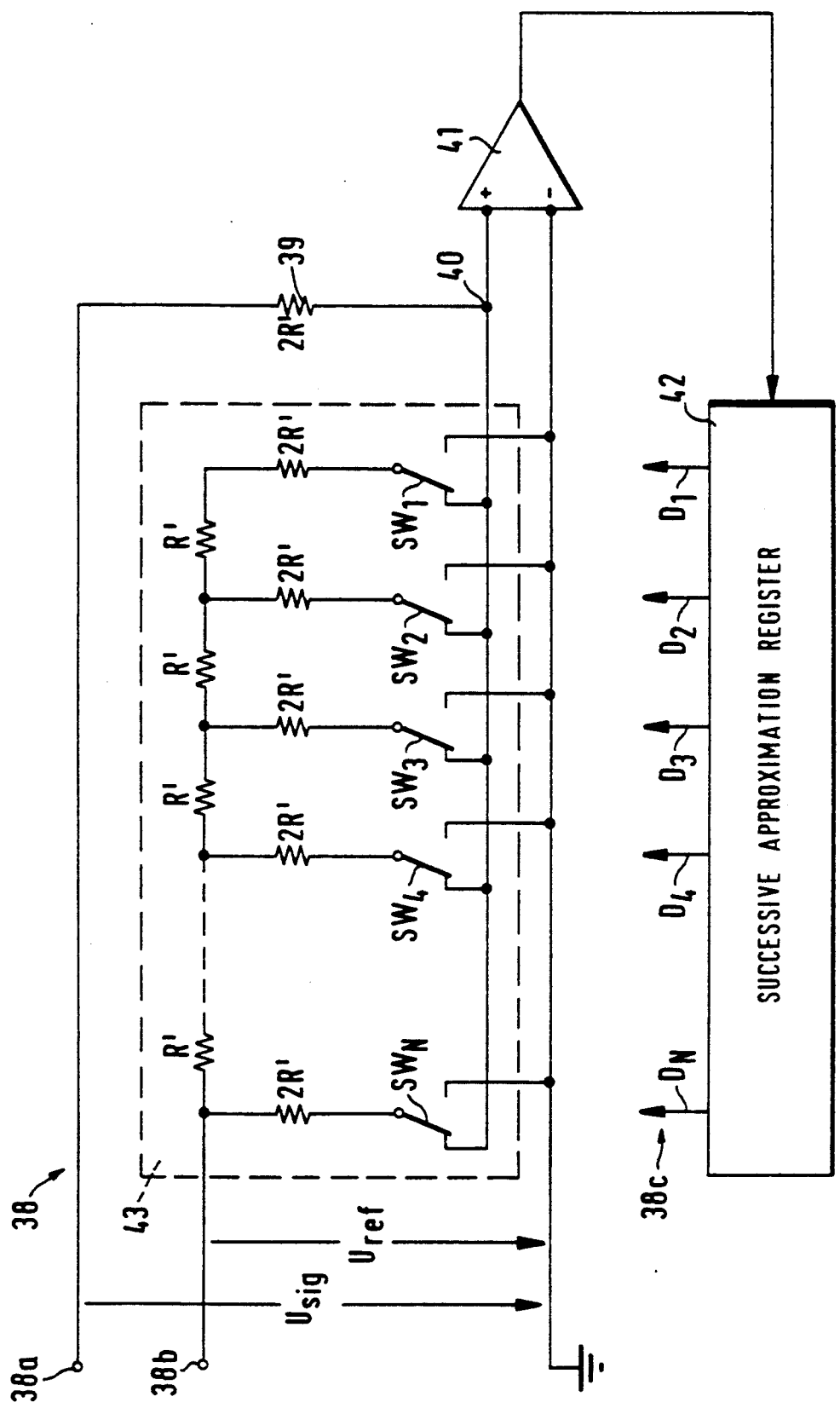
Figure 7:
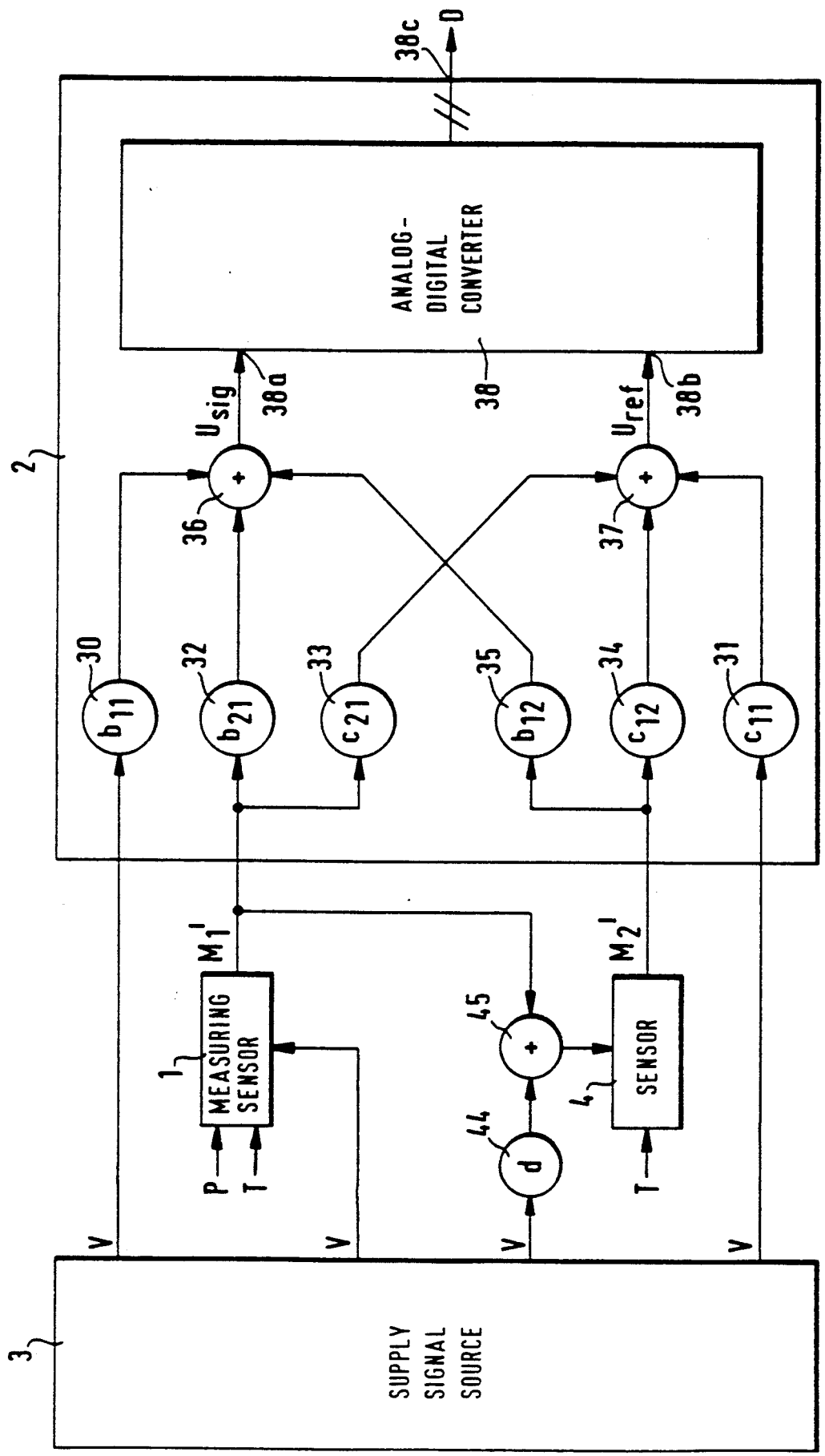
Figure 8:
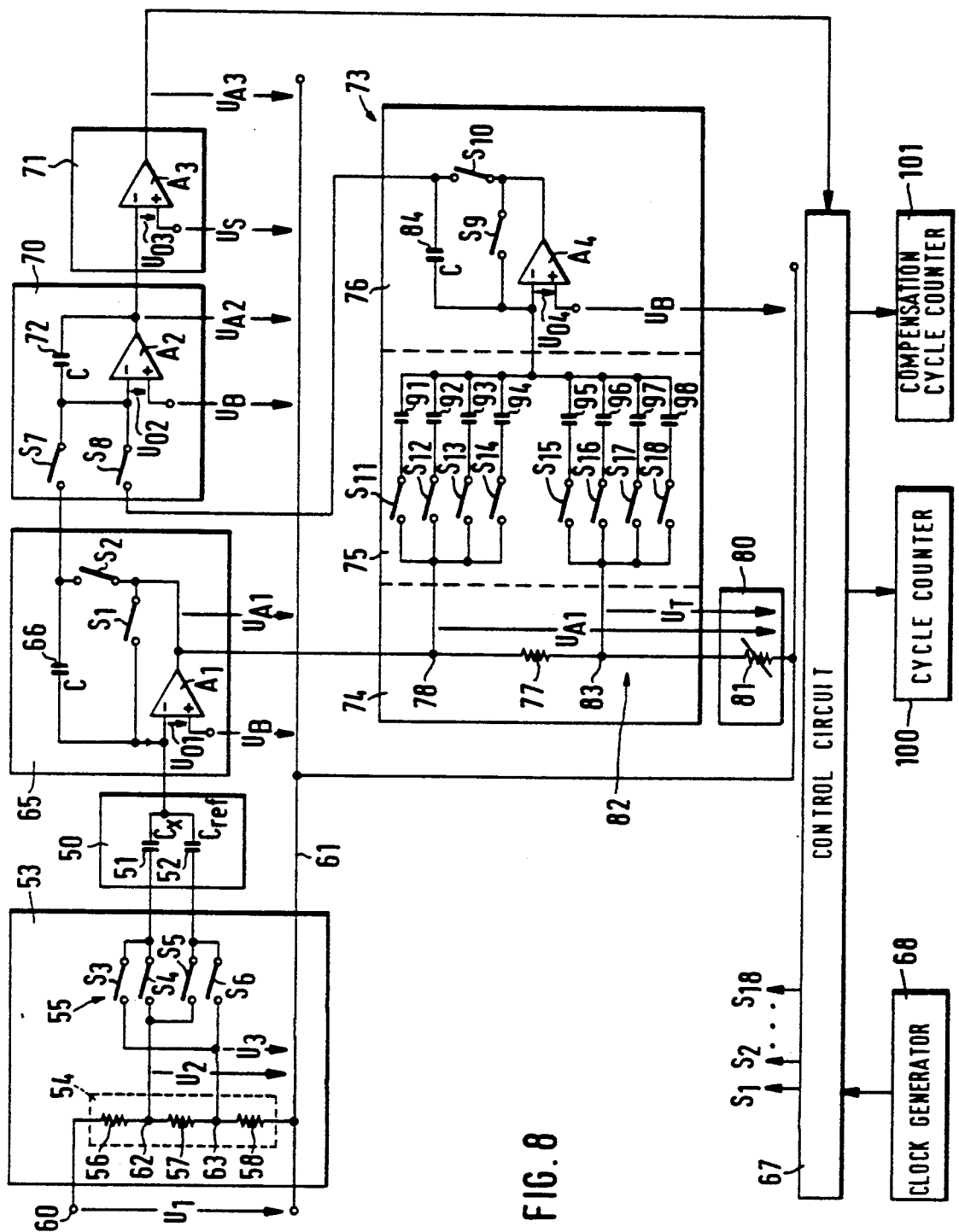
Figure 9:
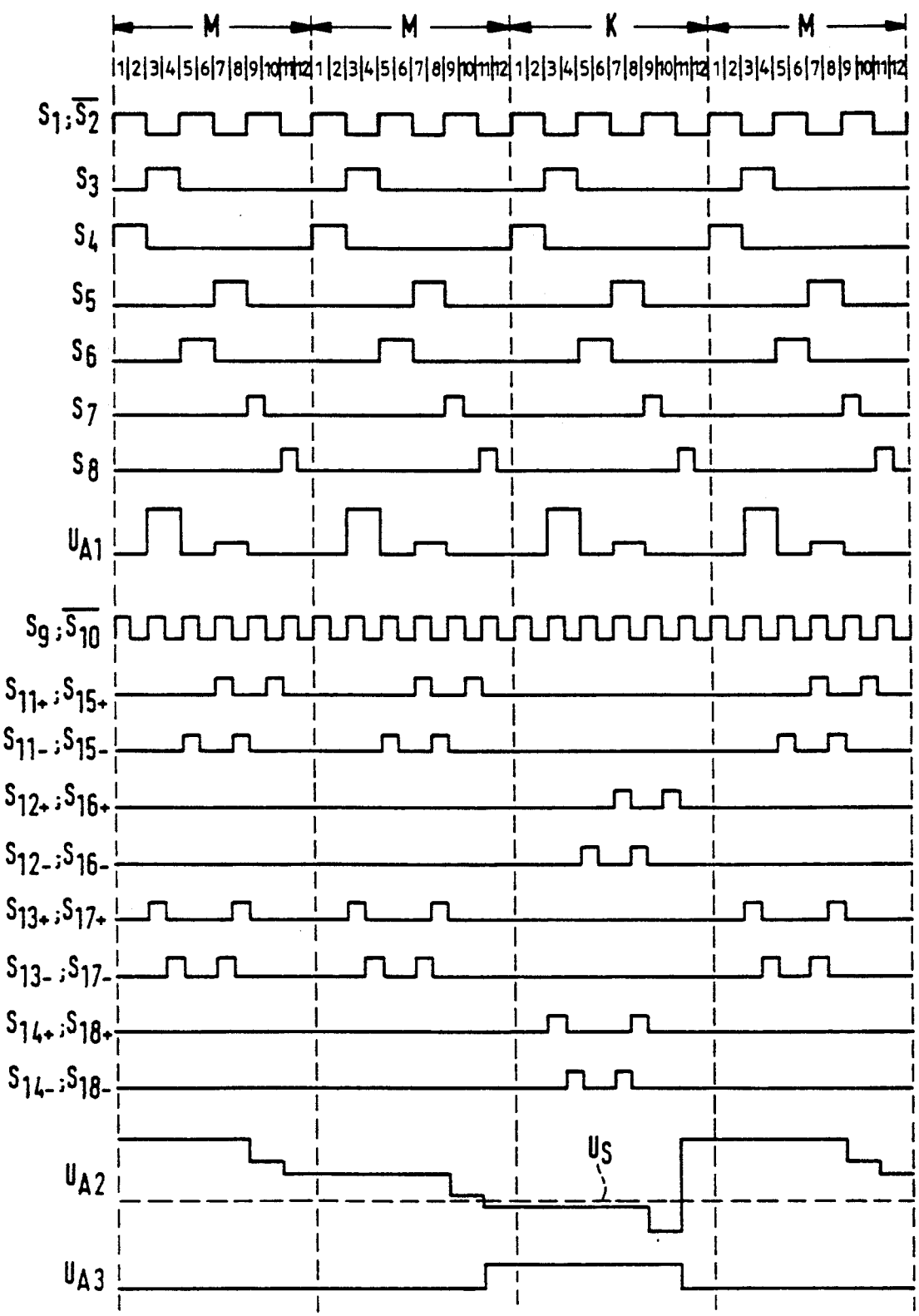
Figure 10:
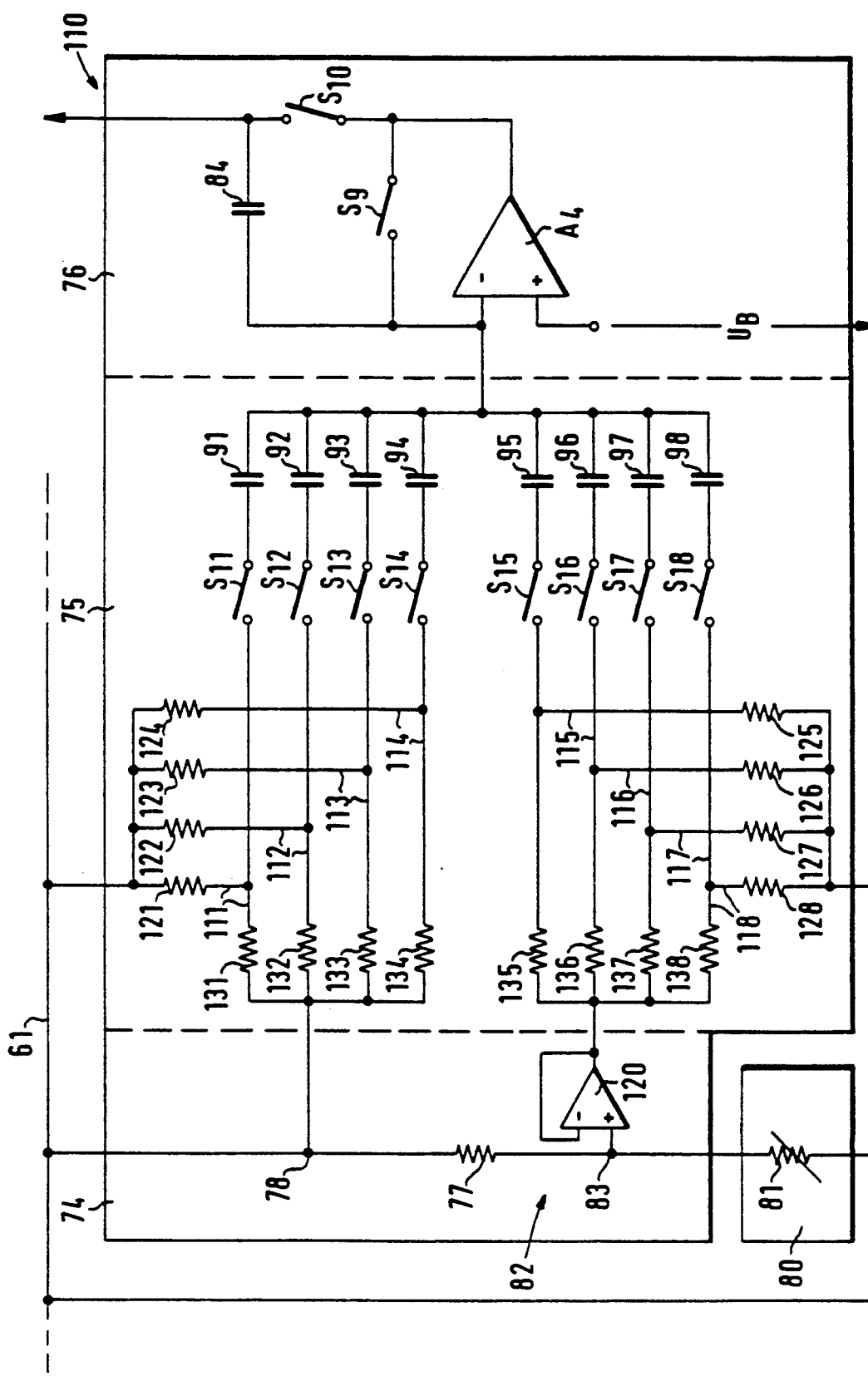
Figure 11:
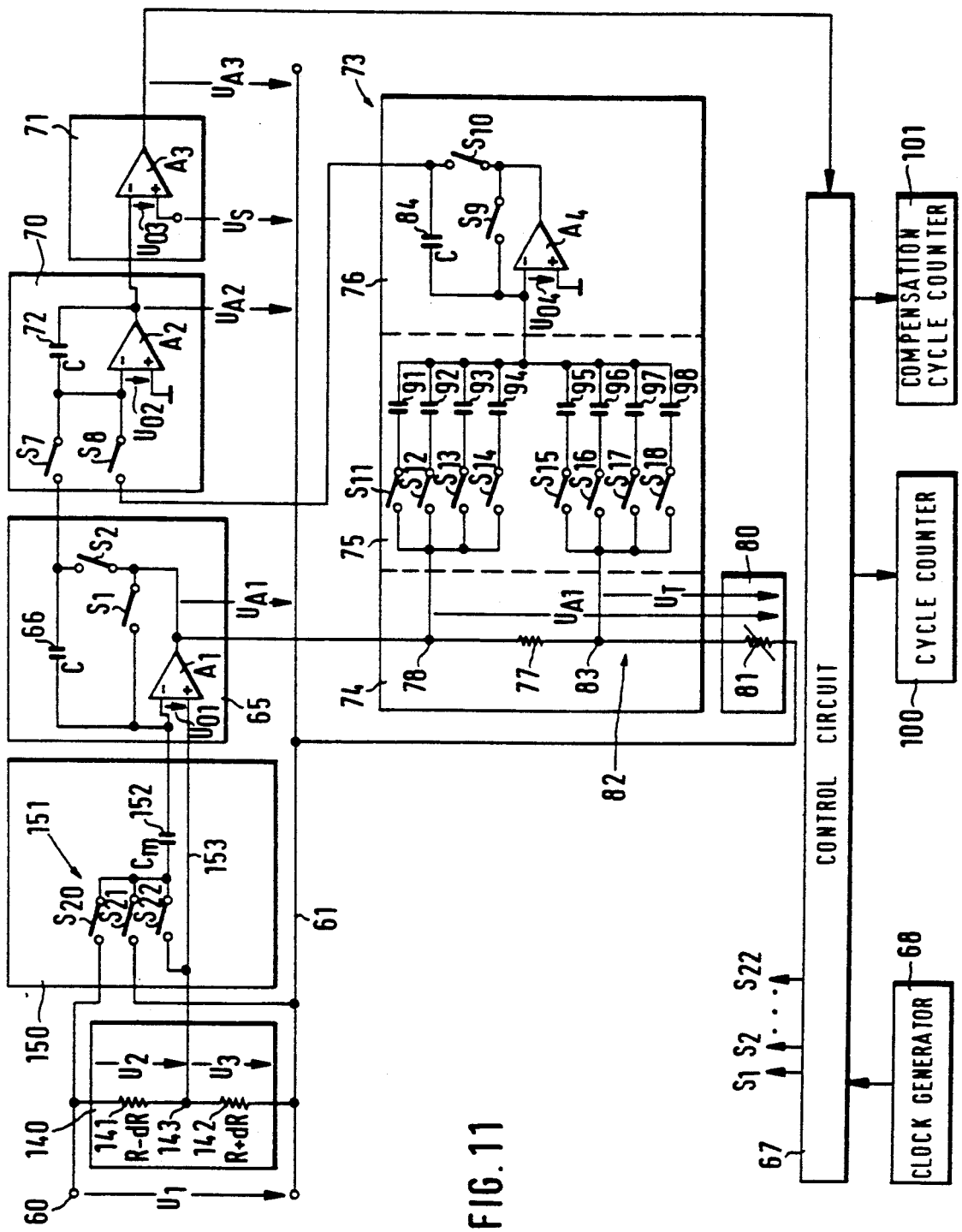
Figure 12:
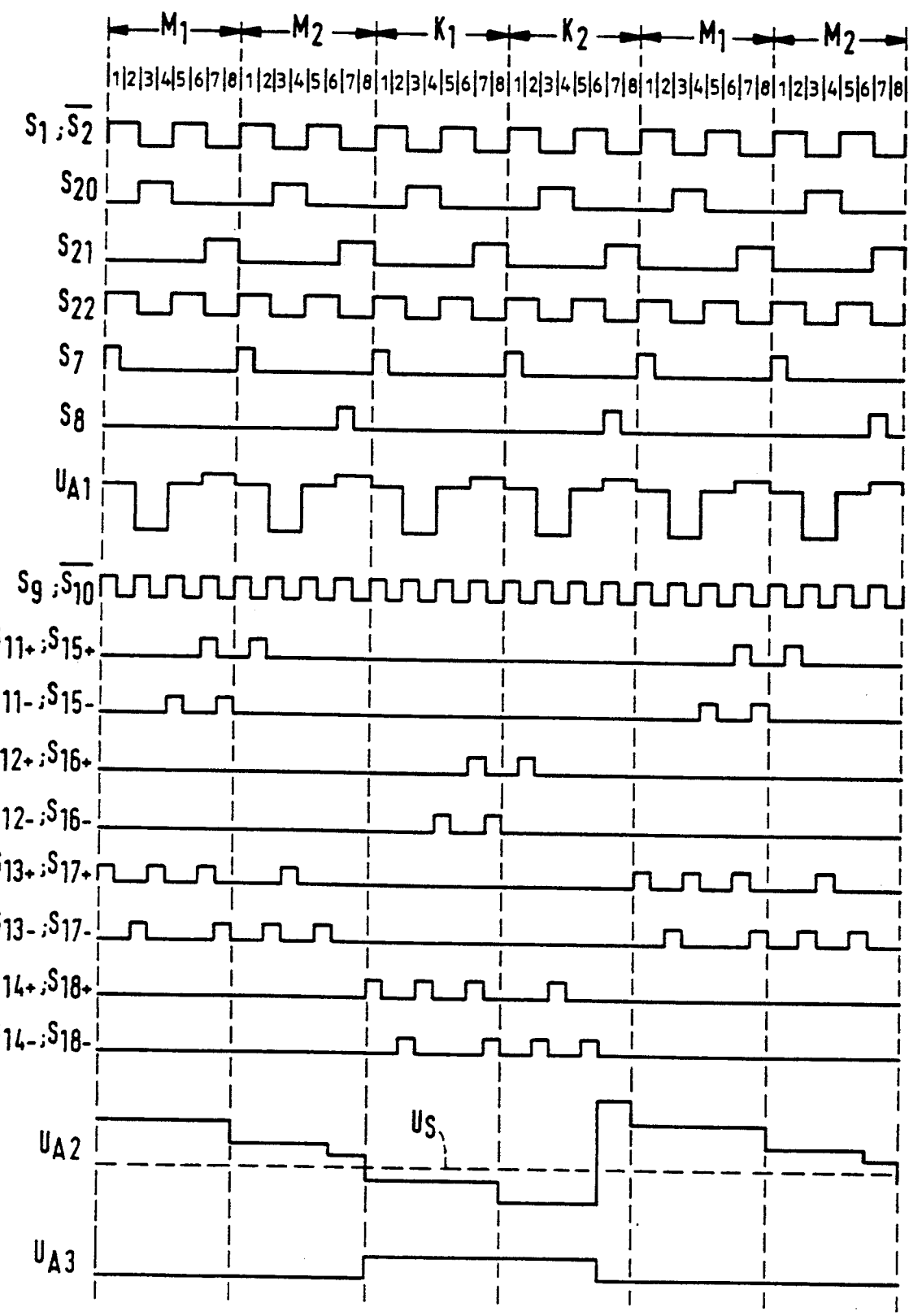
Figure 13:
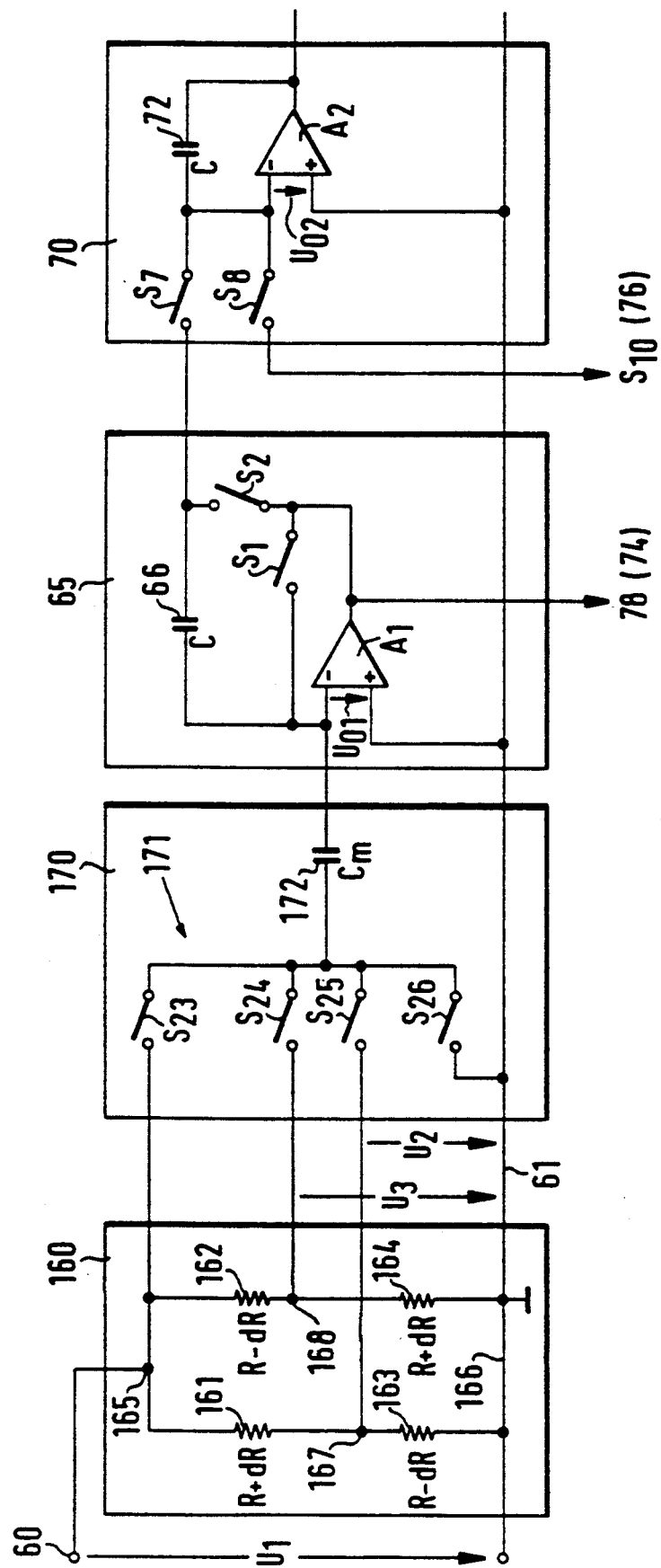
Figure 14:
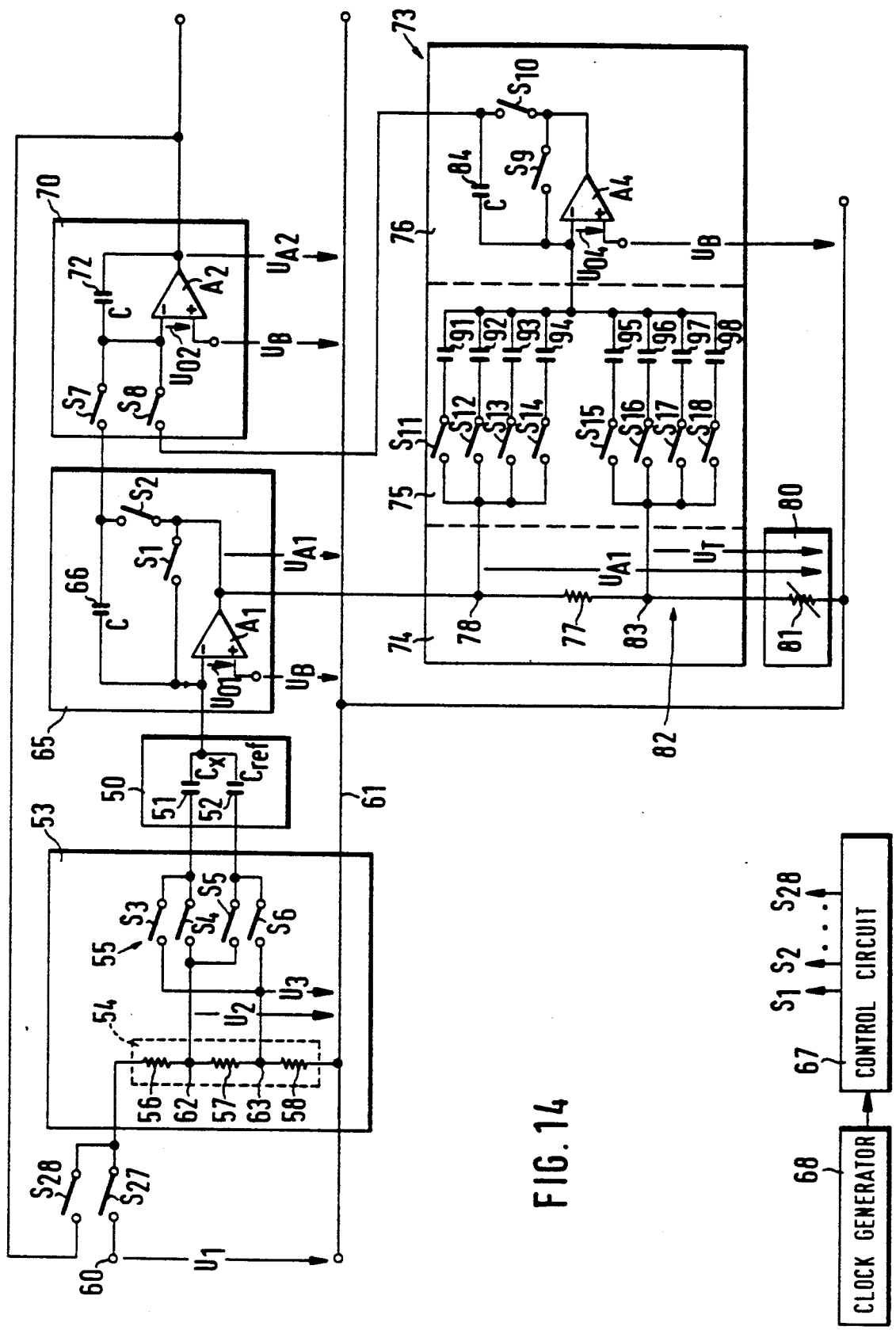
Figure 15:
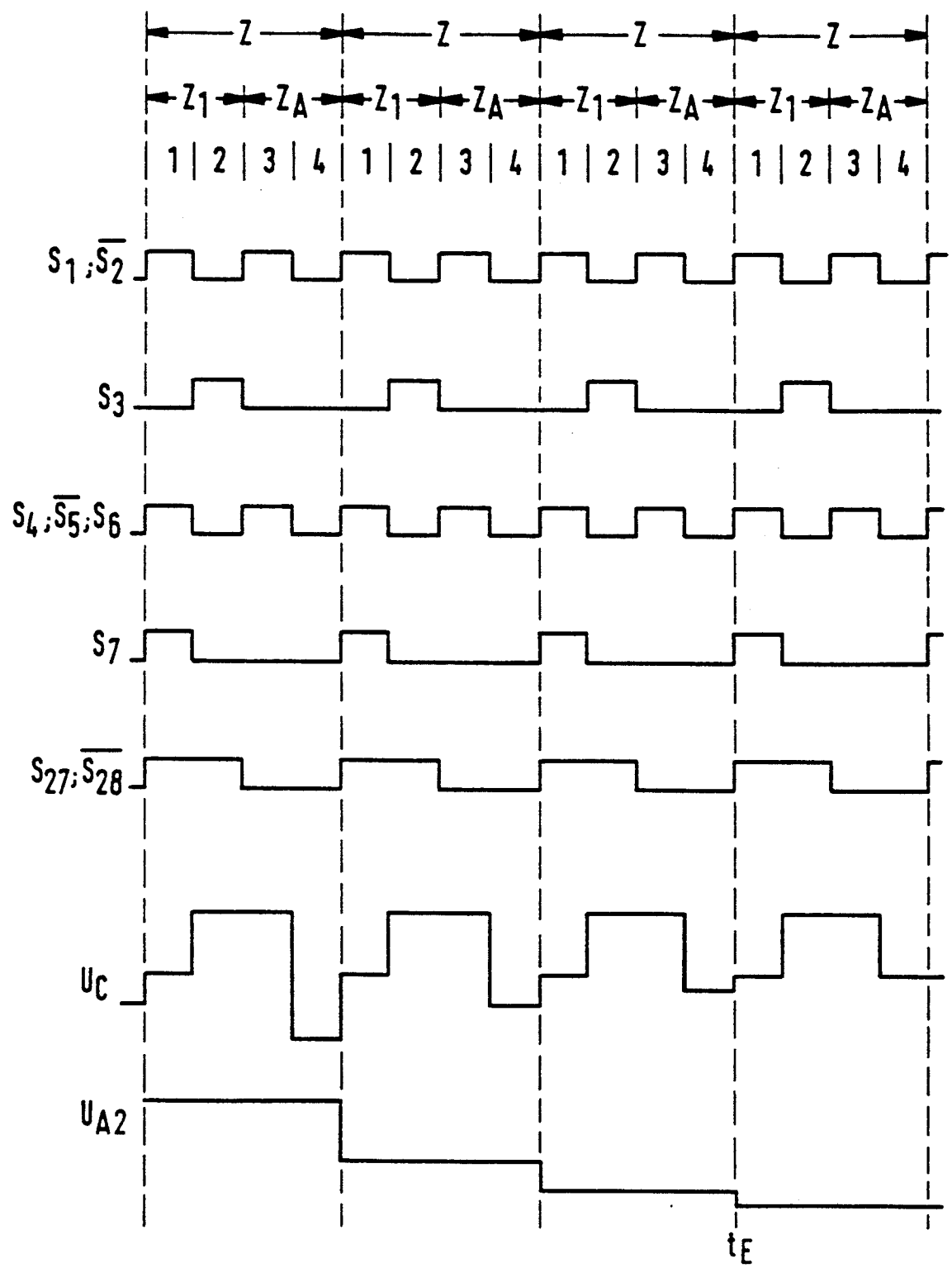
Figure 16:
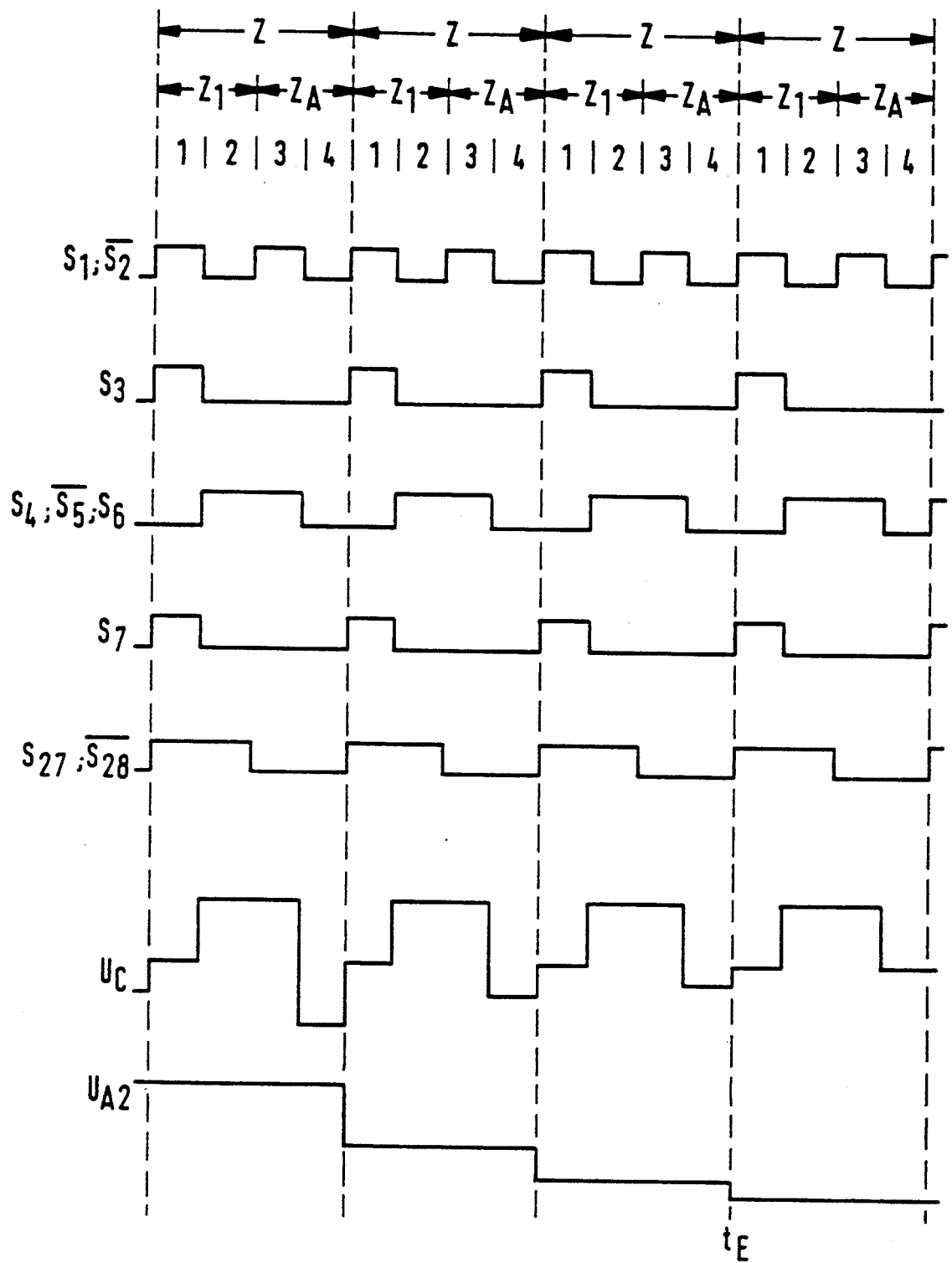
Figure 17:
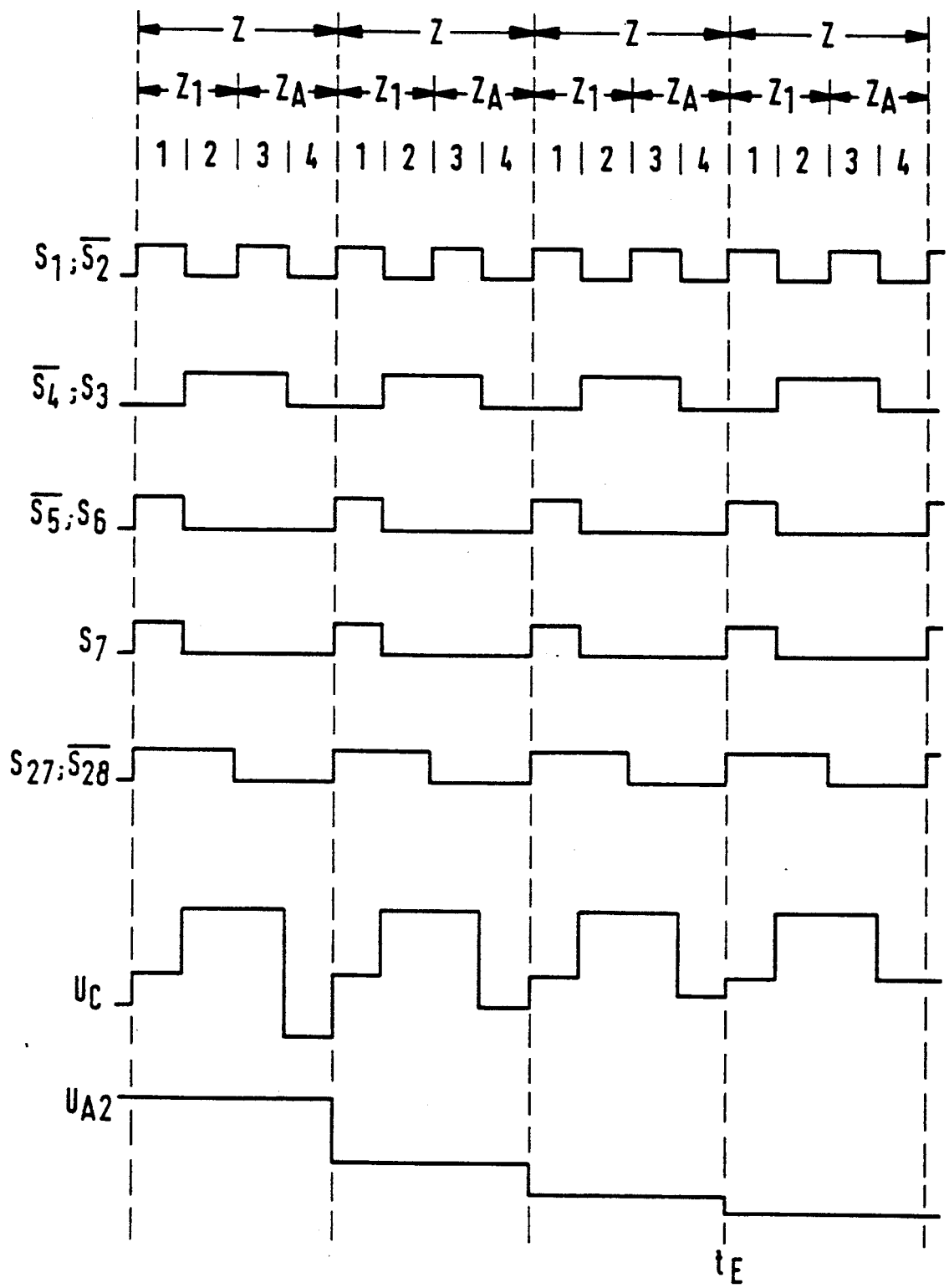
Figure 18:
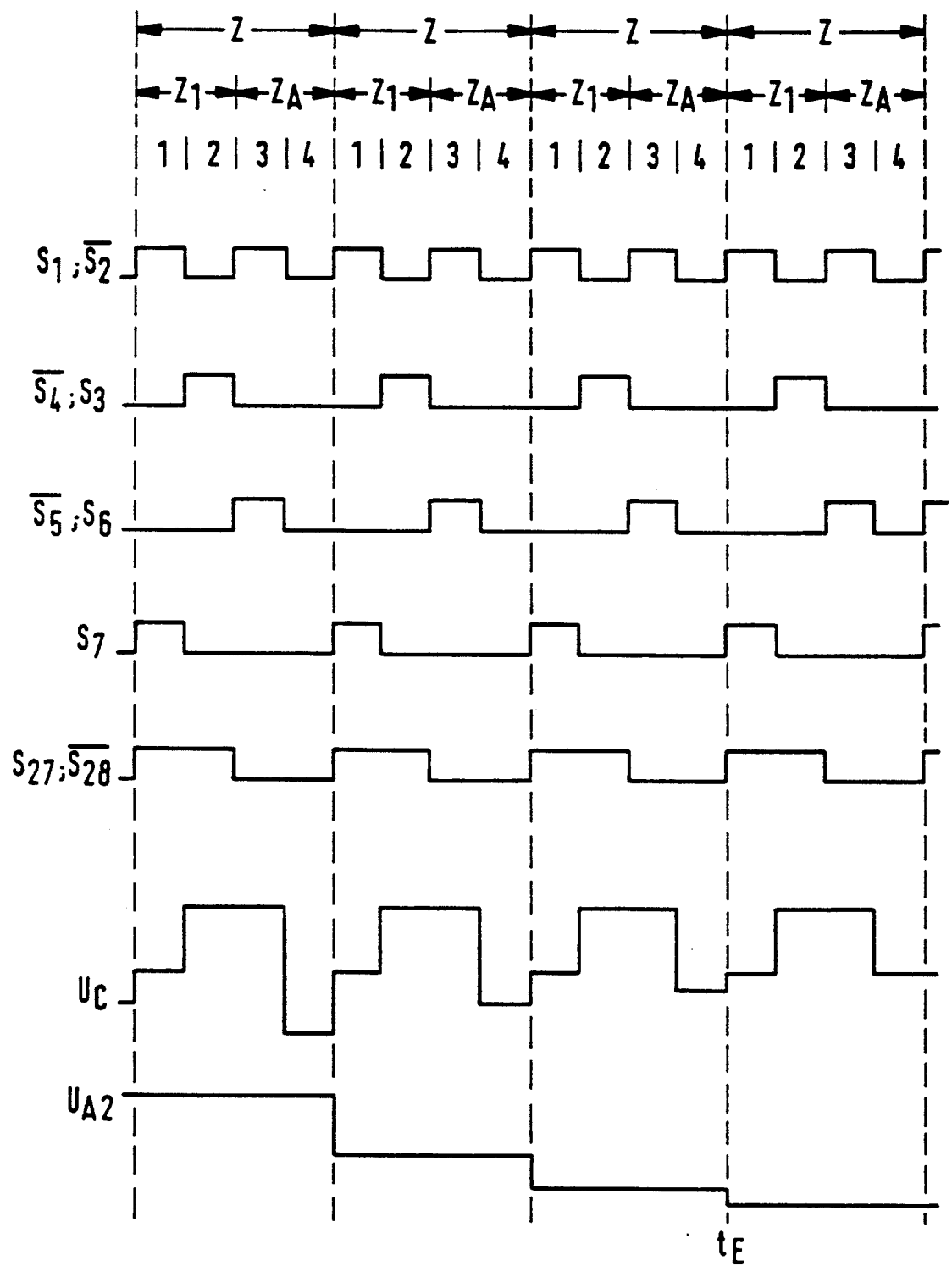
Figure 19:
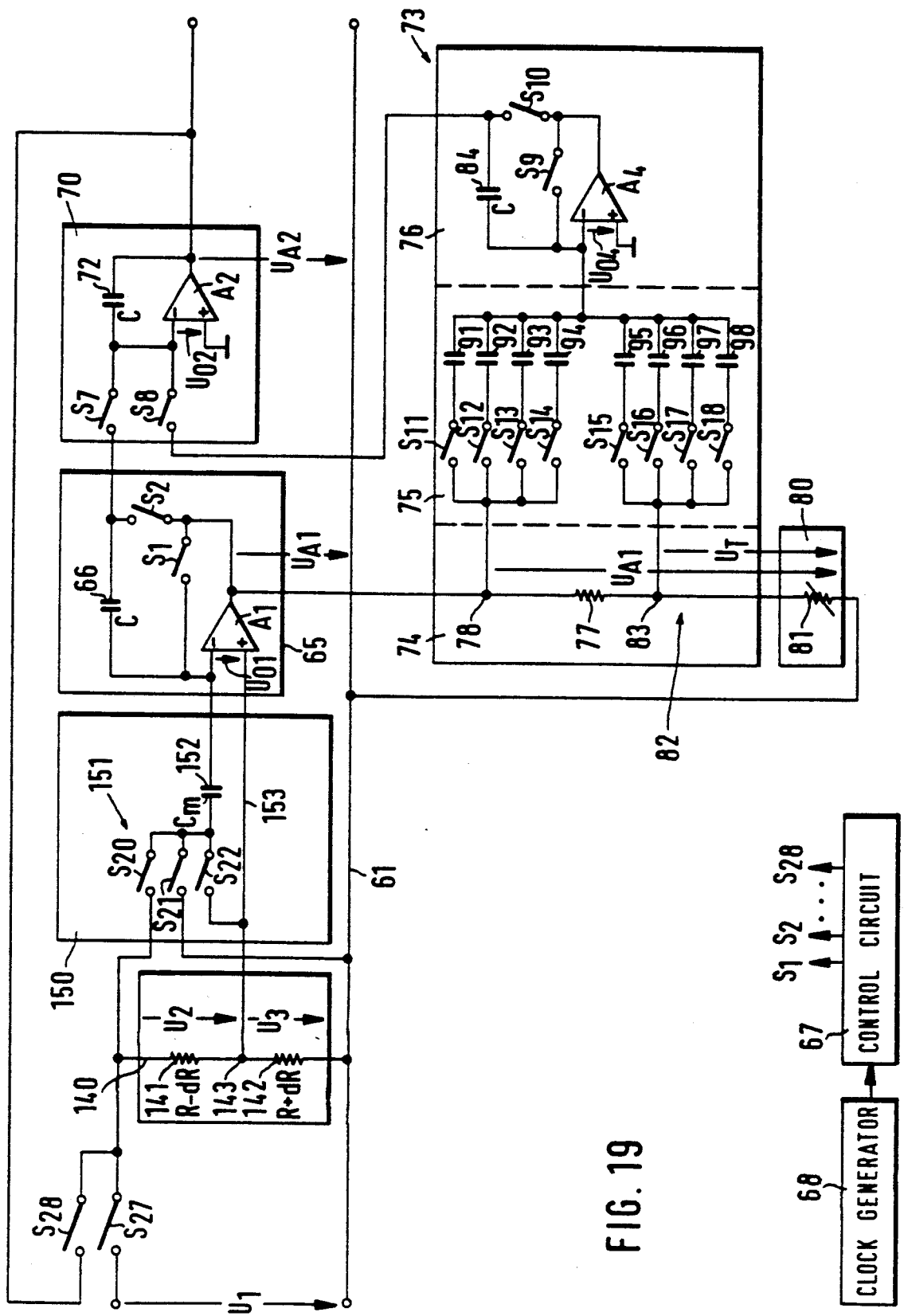
Figure 20:
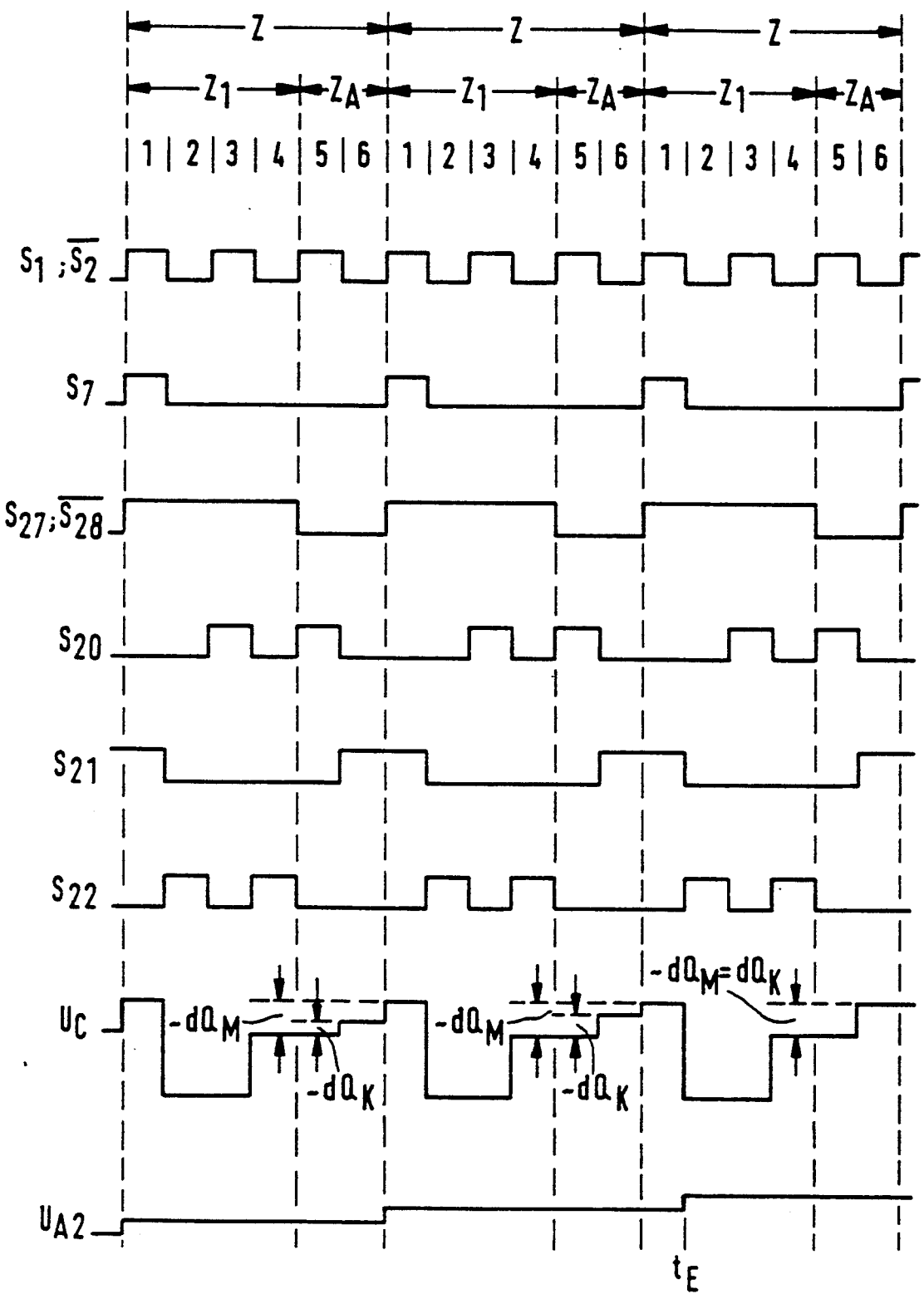
Figure 21:
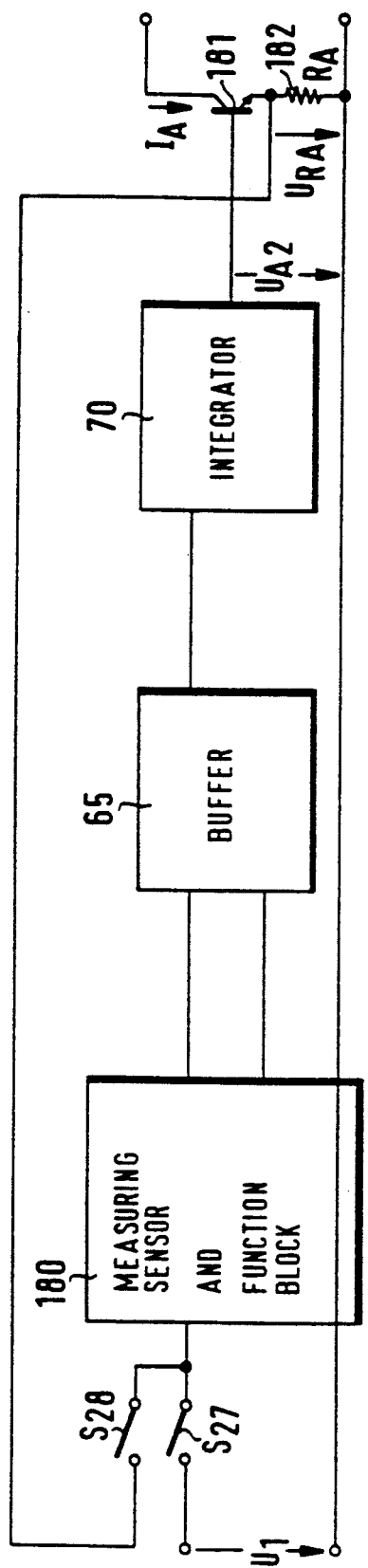

Further features and advantages of the invention will be apparent from the following description of examples of embodiment which are illustrated in the drawings, wherein:

FIG. 1 shows a fundamental scheme for explaining the problem underlying the invention, FIG. 2 is a sectional view of a capacitive sensor, FIG. 3 is a schematic representation of a resistance sensor with strain gauges in the unloaded state, FIG. 4 shows the resistance sensor of FIG. 3 in the loaded state, FIG. 5 is a block circuit diagram of an embodiment of the arrangement according to the invention in which the signal processing circuit is constructed with weighting circuits and an analog-digital converter, FIG. 6 is a circuit diagram of an example of embodiment of the analog-digital converter in the arrangement of FIG. 5, FIG. 7 shows a modified embodiment of the arrangement of FIG. 5, FIG. 8 shows the circuit diagram of a signal processing circuit operating with quantized charge transport and charge balancing by means of switch-capacitor structures for processing the sensor signals furnished by a capacitive sensor generating a digital output signal, FIG. 9 shows the time diagrams of signals which occur in the signal processing circuit of FIG. 8, FIG. 10 shows a modified embodiment of the correction circuit contained in the arrangement of FIG. 8, FIG. 11 shows the circuit diagram of a signal processing circuit operating with quantized charge transport and charge balancing by means of switch-capacitor structures for processing the sensor signal furnished by a resistance half-bridge, FIG. 12 shows time diagrams of signals which occur in the signal processing circuit of FIG. 11, FIG. 13 shows part of a modified embodiment of the arrangement of FIG. 11 for processing the sensor signal furnished by a resistance full bridge, FIG. 14 shows the circuit diagram of a signal processing circuit operating with quantized charge transport and charge balancing by means of switch-capacitor structures for processing the sensor signals furnished by a capacitive sensor generating an analog output signal being fed back to the measuring sensor, FIG. 15 is a timing diagram for the signal processing circuit of FIG. 14 if the measuring effect is $(C_x - C_{ref})/C_{ref}$, and $C_x > C_{ref}$, FIG. 16 is a timing diagram for the signal processing circuit of FIG. 14 if the measuring effect is $-(C_x - C_{ref})/C_{ref}$, and $C_x < C_{ref}$, FIG. 17 is a timing diagram for the signal processing circuit of FIG. 14 if the measuring effect is $(C_x - C_{ref})/C_x$, with $C_x > C_{ref}$, FIG. 18 is a timing diagram for the signal processing circuit of FIG. 14 if the measuring effect is $C_x/C_{ref}$ and $C_x > C_{ref}$ or $C_x \leq C_{ref}$, FIG. 19 is a circuit diagram of a signal processing circuit using quantized charge transport and charge balancing by means for switched-capacitor structures for processing the sensor signal provided by a resistance half-bridge, the circuit providing an analog output signal which is fed back to the sensor, FIG. 20 is a timing diagram for the signal processing circuit of FIG. 19, and FIG. 21 shows a portion of a modified embodiment of the arrangement of FIG. 19 for processing the sensor signal provided by a resistance full bridge.

With the aid of the schematic illustration of FIG. 1 the problem underlying the invention will be explained. FIG. 1 shows a sensor 1 with the aid of which a physical quantity is to be measured. The sensor 1 is so constructed that it has an electrical characteristic quantity which varies in dependence upon the physical quantity to be measured. The sensor 1 is connected to a signal processing circuit 2 which converts the value of the electrical characteristic quantity of the sensor to an output signal S which is related to a reference signal $S_{ref}$ and which therefore likewise depends on the physical quantity to be measured. The variable electrical characteristic quantity of the sensor 1 may for example be a capacitance or a resistance. The output signal S may for example be an analog signal, a digital signal or a frequency. A supply voltage source 3 supplies to the sensor 1 a supply signal V which makes it possible to convert the change of the capacitance, resistance or other electrical characteristic quantity to an electrical signal which is supplied to the signal processing circuit 2. The supply signal source 3 is shown separately in FIG. 1 for clarity; in practice it is usually contained in the signal processing circuit 2 which supplies the necessary supply signal to the sensor 1. In FIG. 1 a second sensor 4 is illustrated, the purpose of which will be explained later.

If it is assumed for example that the physical quantity to be measured is a pressure, a capacitive pressure sensor in which the electrical characteristic quantity dependent on the pressure is a capacitance or a capacitance ratio may be used for the sensor 1. FIG. 2 shows a sectional view of a capacitive pressure sensor 10 which is suitable for this purpose. The pressure sensor 10 has a base body 11 and a diaphragm 12 which are connected together at the periphery by a spacer ring 13. The face of the diaphragm 12 facing the base body 11 is provided with a metallization 14 which is connected to a connection conductor 15 led through the spacer ring 13 and the base body 11. The face of the base body 11 facing the diaphragm 12 carries a central circular metallization 16 which is connected to a connection conductor 17 led through the base body 11 and an annular metallization 18 surrounding the metallization 16 and connected to a connection or terminal conductor 19 led through the base body 11.

When a pressure P acts on the outer surface of the diaphragm 12 the latter is deformed so that the distance between the centre region of the metallization 14 and the opposite central metallization 16 varies in dependence upon said pressure. The two metallizations 14 and 16 therefore form the electrodes of a measuring capacitor having a capacitance $C_x$ which depends on the pressure P and can be measured between the connection conductors 15 and 17. In contrast, the distance between the edge region of the metallization 14 and the opposite annular electrode 18 remains substantially unchanged during the pressure-dependent deformation of the diaphragm 12 because said distance is fixed by the spacer ring 13. The two metallization 14 and 18 therefore form the electrodes of a reference capacitor having a capacitance $C_{ref}$ which is independent of the pressure P and can be measured between the connection conductors 15 and 19.

The measuring effect dependent on the pressure in such a capacitive pressure sensor is thus the change of the measuring capacitance $C_x$ relatively to the reference capacitance $C_{ref}$. Depending on the particular use, the measuring effect can be differently represented. For example, the measuring effect can correspond to the capacitance ratio $C_x/C_{ref}$ between the measuring capacitance and the reference capacitance but preferably the capacitance ratio $(C_x-C_{ref})/C_{ref}$ is used because by forming the difference larger relative changes are obtained. A further possibility would be the capacitance ratio $(C_x-C_{ref})/C_x$. Of course, the pressure-dependent measuring capacitance $C_x$ may be used as measuring effect on its own but the quotient formation has the advantage that the measuring effect remains largely unaffected by disturbing influences acting in the same manner on the two capacitances $C_x$ and $C_{ref}$.

If the physical quantity to be measured is a force, a force sensor as illustrated in FIGS. 3 and 4 may be used for the sensor 1. The force sensor 20 comprises a resilient beam 21 which is fixedly clamped at one end and deformable by a force F acting on its free end. On two opposite sides of the beam 21 two strain gauges 22 and 23 are secured in such a manner that they deform in opposite senses on deformation of the beam 21. For example, with the deformation of the beam 21 illustrated in FIG. 4 the strain gauge 22 is extended and the strain gauge 23 shortened. As is known, in strain gauges the ohmic resistance depends on the change in length. In the undeformed state (FIG. 3) the two strain gauges 22 and 23 have the same ohmic resistance R. With the opposite deformation illustrated in FIG. 4 the strain gauge 22 has the ohmic resistance R+dR and the strain gauge 23 the ohmic resistance R-dR. The force sensor 20 of FIGS. 3 and 4 is thus an example of a sensor in which the electrical characteristic quantity depending on the physical quantity to be measured is a resistance. The measuring effect which is employed to measure the force F is preferably the resistance ratio dR/R. To obtain a sensor signal proportional to this resistance ratio it is known to connect the two oppositely deformable strain gauges 22, 23 electrically so as to form a resistance half-bridge. Strain gauge sensors are also known in which two pairs of oppositely deformable strain gauges are present which are connected together to form a resistance full bridge.

Numerous other sensors are known which depending upon the nature of the physical quantity to be measured can be used for the sensor of FIG. 1.

In the ideal case the measuring effect $M_1$ furnished by the sensor 1 and used in the signal processing circuit 2 to generate to the output signal $S/S_{ref}$ would correspond to the desired measuring effect, i.e. for example the measuring effect $(C_x-C_{ref})/C_{ref}$ in the case of the capacitive pressure sensor of FIG. 1 or the ratio dR/R in the case of the force sensor of FIGS. 3 and 4. For various reasons, this ideal case is not achieved with the usual sensors. Thus, for example, in the capacitive pressure sensor 10 of FIG. 2 the measuring capacitance $C_x$ is not necessarily proportional to the pressure P acting on the diaphragm 12. Furthermore, the zero point shift, i.e. the value zero of the measuring effect, does not correspond to the value zero of the pressure to be measured. Finally, in most cases the measuring effect $M_1$ furnished by the sensor depends not only on the physical quantity to be measured but also on disturbance variables. For example, with the capacitive pressure sensor 10 of FIG. 2 the measuring capacity $C_x$ is not only depended on the pressure P acting on the diaphragm 12 but also on the temperature T. Accordingly, the measuring effect $M_1$ furnished by the pressure sensor depends not only on the capacitance ratio $(C_x-C_{ref})/C_{ref}$ desired but also on the temperature T which in this case represents an interfering quantity.

To correct the influence of such disturbance variables it is known to provide further sensors which each furnish measuring effects which are influenced only by the disturbance variables and not by the quantity to be measured. For the case referred to above where the temperature T represents a disturbance variable, in FIG. 1 the second sensor 4 is provided and furnishes a measuring effect $M_2$ which depends only on the temperature T but not on the pressure P to be measured. The second sensor 4 may contain for example a temperature-dependent resistor connected in series with a temperature-independent resistor so that a voltage divider is formed having a voltage division ratio which depends on the temperature. The measuring effect $M_2$ is then the temperature-dependent voltage division ratio. It can be used in the signal processing circuit 2 to correct the temperature dependence of the measuring effect $M_1$. Corresponding further sensors furnishing measuring effect $M_3, M_4, \ldots M_n$ may be provided for correction of the influence of other disturbance variables as indicated in FIG. 1 by further inputs of the signal processing circuit 2.

The influence of the disturbance variables on the measuring effect $M_1$ can then be expressed by the measuring effects $M_2, M_3, \ldots M_n$ of the further sensors so that the faulty measuring effect $M_1$ can be represented approximately in the following form:

$$\begin{aligned} M_1 &= f(E_1, E_1^2, M_2 \ldots M_n) \\ &= (a_{11} + a_{12} \cdot M_2 + \ldots + a_{1n} \cdot M_n) + \\ &\quad (a_{21} + a_{22} \cdot M_2 + \ldots + a_{2n} \cdot M_n) \cdot E_1 + a_{31} \cdot E_1^2 \end{aligned} \quad (1)$$

$E_1$ represents the desired error-free response, that is for example in the sensor of FIG. 2 a linear relationship between the capacitance ratio $(C_x-C_{ref})/C_{ref}$ and the pressure P to be measured, and in the sensor of FIGS. 3 and 4 a linear relationship between the resistance ratio dR/R and the force F to be measured. The coefficients $a_{11} \ldots a_{2n}$ describe the dependence of the measuring effect $M_1$ on the measuring effects $M_2 \ldots M_n$ of the further sensors and the coefficient $a_{31}$ describes the nonlinearity of the relationship between the measuring effect $M_1$ and the influence $E_1$ (neglecting terms of higher order).

The signal processing circuit 2 is configured to correct a faulty measuring effect $M_1$ in such a manner that the following relationship exists between the various input quantities $M_1, M_2 \ldots M_n$ and the output quantity $S/S_{ref}$:

$$\frac{S}{S_{ref}} = \frac{b_{11} + b_{12} \cdot M_2 + \ldots + b_{1n} \cdot M_n + (b_{21} + b_{22} \cdot M_2 + \ldots + b_{2n} \cdot M_n) \cdot M_1}{c_{11} + c_{12} \cdot M_2 + \ldots + c_{1n} \cdot M_n + (c_{21} + c_{22} \cdot M_2 + \ldots + c_{2n} \cdot M_n) \cdot M_1} \quad (2)$$

The above equation will be referred to hereinafter as "transfer function". With such a transfer function, within certain ranges a faulty measuring effect $M_1$ of the type of the above equation (1) can be corrected.

Hereinafter examples of embodiment of the signal processing circuit will be described in which for simplification it is assumed that only one disturbance effect $M_2$ occurs. The erroneous measuring effect then has the form $$M_1 = f(E_1, E_1^2, M_2) \quad (3)$$
$$= (a_{11} + a_{12} \cdot M_2) + (a_{21} + a_{22} \cdot M_2) \cdot E_1 + a_{31} \cdot E_1^2$$

and the signal processing circuit for correcting said faulty measured quantity $M_1$ has the following transfer function:

$$\frac{S}{S_{ref}} = \frac{b_{11} + b_{12} \cdot M_2 + (b_{21} + b_{22} \cdot M_2) \cdot M_1}{c_{11} + c_{12} \cdot M_2 + (c_{21} + c_{22} \cdot M_2) \cdot M_1} \quad (4)$$

FIG. 5 shows very schematically the basic structure of a signal processing circuit 2 constructed according to this principle, it being assumed as example that the output signal is a digital signal formed by a multidigit digital word D which is formed by analog-digital conversion of the analog output signals of the sensors 1 and 4. In FIG. 5 once again the supply signal source 3 is shown which furnishes the supply signal V to the sensors 1 and 4.

As an example it will be assumed that the physical quantity to be measured is a pressure P and that the temperature T represents a disturbance variable. The sensor 1 can therefore for example correspond to the sensor 10 of FIG. 2 and have the structure illustrated therein. Its output signal is described by the measuring effect $M_1'$ which results from the product of the supply signal V and the function $M_1(P,T)$ dependent on the physical influences:

$$M_1' = M_1 \cdot V \quad (5)$$

The supply signal V is also supplied to the second sensor 4 which responds only to the disturbance variable, i.e. in the present case to the temperature T. Its output signal is described by the measuring effect $M_2'$ which results from the product of the supply signal V and the function $M_2(T)$ depending on the influence of the temperature T:

$$M_2' = M_2 \cdot V \quad (6)$$

The supply signal V is weighted in a symbolically represented weighting circuit 30 with a coefficient $b_{11}$ and in a weighting circuit 31 with a coefficient $c_{11}$. The weighting circuits may be formed in a manner known per se by analog multipliers, for example by operational amplifiers with the amplification factor $b_{11}$ and $c_{11}$. In corresponding manner the output signal $M_1'$ of the sensor 1 is weighted in a weighting circuit 32 with a coefficient $b_{21}$ and in a weighting circuit 33 with a coefficient $c_{21}$ and the output signal $M_2'$ of the sensor 4 is weighted in a weighting circuit 34 with the coefficient $c_{12}$ and in a weighting circuit 35 with the coefficients $b_{12}$.

The weighted output signals of the weighting circuits 30, 32 and 35 are summated in a summation circuit 36 and the weighted output signals of the weighting circuit 31, 34 and 33 are summated in a summation circuit 37. The output voltage $U_{sig}$ of the summation circuit 36 is supplied to the signal input 38a of an analog-digital converter 38 and the output voltage $U_{ref}$ of the summation circuit 37 is supplied to the reference input 38b of the analog-digital converter 38. The analog-digital converter 38 makes available at its output the digital word $$D = (2^N - 1) U_{sig}/U_{ref} \quad (7)$$

N being the number of bits of the digital word.

An example of embodiment of the analog-digital converter 38 known per se and operating by the principle of current balance is represented in FIG. 6. The signal input 38a is connected via a resistor 39 of value $2R'$ to the summation node 40 at the noninverting input of an operational amplifier 41, the inverting input of which is connected to ground. The operational amplifier 41 is connected as threshold value comparator in that its feedback circuit is open. The output voltage of the operational amplifier 41 thus has a low value when the voltage at the noninverting input is above the ground potential present at the invention input and it jumps to the high signal value as soon as the voltage at the noninverting input drops below the ground potential. The output of the operational amplifier 41 is connected to a control input of a successive approximation register 42.

The reference input 38b is connected to the input of a resistance network 43 which is formed in the manner of a ladder circuit, the series arms of which each contain a resistor of value $R'$ whilst in each shunt arm there is a resistor of value $2R'$. By an associated switch $SW_1 \ldots SW_N$ each transverse branch resistor can be selectively connected to the summation node 43 or to ground. The switches are controlled by binary signals which are emitted at associated outputs $D_1 \ldots D_N$ of the approximation register 42. Each switch $SW_1 \ldots SW_N$ connects the associated resistor in the position illustrated to the summation node 40 when the binary signal at the associated output of the approximation register 42 has the signal value 0; when said signal has the signal value 1 the respective switch moves into the other position in which it connects the associated resistor to ground.

In dependence upon the signal level at the output of the operational amplifier 41 the approximation register 42 sets the binary signals at the outputs $D_1 \ldots D_N$ in such a manner that in the ideal case the voltage difference between the two inputs of the operational amplifier 41 becomes zero. In this ideal balance case form the signal input 38a the signal current $$i_{sig} = U_{sig}/2R' \quad (8)$$

flows via the resistor 39 to the summation node 40 and the switches $SW_1 \ldots SW_N$ of the resistance network 43 are set by the approximation register 42 so that for the reference current flowing from the resistance network 43 to the summation node 40 the following holds true:

$$i_{ref} = -i_{sig} \quad (9)$$

The adjustment of the approximation register 42 and thus the connection of the resistors of the resistance network 43 is changed under the influence of the output level of the comparator formed by the operational amplifier 41 until this state is reached. There is then current balance at the summation node 40 and the binary signals at the outputs $D_1 \ldots D_N$ of the approximation register 42 form the digital word D according to equation (7). These outputs thus correspond to the output 38c of FIG. 5.

Instead of the analog-digital converter of FIG. 6 operating with successive approximation an integrating analog-digital converter may also be used, for example a dual slope converter in which the current balance takes place in the integration capacitor. This is known to the expert and will not be specially explained.

From the equation (7) and the structure of FIG. 5 the output quantity of the analog-digital converter 38 is obtained as $$\frac{D}{2^N - 1} = \frac{U_{sig}}{U_{ref}} = \frac{b_{11} \cdot V + b_{12} \cdot M_2' + b_{21} \cdot M_1'}{c_{11} \cdot V + c_{12} \cdot M_2' + c_{21} \cdot M_1'} \quad (10)$$

and it follows from the equations (5) and (6) that:

$$\frac{D}{2^N - 1} = \frac{b_{11} + b_{12} \cdot M_2 + b_{21} \cdot M_1}{c_{11} + c_{12} \cdot M_2 + c_{21} \cdot M_1} \quad (11)$$

Equation (11) represents the transfer function of the signal processing circuit of FIG. 5 with which the most significant characteristic data of a sensor of the type according to equation (1) can be corrected with the following correction coefficients

| Zero point | $b_{11}$ |
| TC zero point | $b_{12}$ |
| Sensitivity | $b_{21}, c_{11}$ |
| TC sensitivity | $c_{12}$ |
| Nonlinearity | $c_{21}$ |

"TC" is the abbreviation for "temperature coefficient".

It can be seen from equations (10) and (11) why in the signal processing circuit 2 of FIG. 5 the supply signal V is also weighted with the coefficients $b_{11}$ and $c_{11}$: In this manner the supply signal is eliminated from all terms of the transfer function so that it does not affect the output signal obtained.

It is in no way necessary for all the sensors to obtain the same supply signal. The circuit illustrated in FIG. 7 differs from that of FIG. 5 in that for the supply of the sensor 4 the supply signal V is weighted in a weighting circuit 44 with a factor d and in that in a summation circuit 45 the output signal $M_1'$ of the sensor 1 is added to the signal thus weighted. The output quantity of the digital-analog converter 38 is thus obtained in accordance with the following transfer function:

$$\frac{D}{2^N - 1} = \frac{U_{sig}}{U_{ref}} = \frac{b_{11} \cdot V + b_{12} \cdot M_2' + b_{21} \cdot M_1'}{c_{11} \cdot V + c_{12} \cdot M_2' + c_{21} \cdot M_1'} \quad (12)$$

$$\frac{D}{2^N - 1} = \frac{b_{11} + d \cdot b_{12} \cdot M_2 + (b_{21} + b_{12} \cdot M_2) \cdot M_1}{c_{11} + d \cdot c_{12} \cdot M_2 + (c_{21} + c_{12} \cdot M_2) \cdot M_1} \quad (13)$$

With this transfer function the most significant characteristic data of the sensor of the type according to equation (1) can be corrected with the following correction coefficients:

| Zero point | $b_{11}$ |
| TC zero point | $d \cdot b_{12}$ |
| Sensitivity | $b_{21}, c_{11}$ |
| TC sensitivity | $b_{12}, d \cdot c_{12}$ |
| Nonlinearity | $c_{21}$ |
| TC nonlinearity | $c_{22}$ |

Hereinafter, with reference to various examples of embodiment it will be described how the error correction explained above can be implemented in signal processing circuits which operate by the principle of charge balancing with switch-capacitor combinations.

FIG. 8 shows an example of embodiment of the signal processing circuit 2 of FIG. 1 for the signal processing with error correction of the sensor signal furnished by a capacitive sensor 50. The sensor 50 includes a measuring capacitor 51 of capacitance $C_x$ and a reference capacitor 52 of capacitance $C_{ref}$, it may for example have the structure illustrated in FIG. 2. The measuring effect $M_1$ of interest is the capacitance ratio $(C_x - C_{ref})/C_{ref}$. For better understanding of the functional processes the sensor 50 in FIG. 8 is inserted between two circuit blocks of the signal processing circuit but in reality it will be spatially separate from the signal processing circuit, which may be configured as integrated circuit, and connected to the latter via shielded lines. The signal processing circuit operates by the principle of charge balancing with switch-capacitor combinations and converts the analog sensor signal to a digital output signal having a frequency representing the corrected measured value.

The sensor 50 is connected on the one hand to a function block 53 containing an ohmic voltage divider 54 and a switch group 55. The ohmic voltage divider 54 consists of three series-connected resistors 56, 57, 58 and is connected between an input terminal 60 and a reference conductor 61 carrying the reference potential of the entire circuit. The voltage divider 54 has a first tap 62 between the resistors 56 and 57 and a second tap 63 between the resistors 57 and 58. When in operation of the circuit there is a supply voltage $U_1$ between the input terminal 60 and the reference conductor 61 there is a voltage $U_2$ at the tap 62 and at the tap 63 there is a voltage $U_3$ corresponding to the voltage division ratios defined by the resistance values of the resistors 56, 57 and 58.

The sensor 50 is connected on the other hand to a buffer 65 containing an operational amplifier $A_1$, a storage capacitor 66 of capacitance C and two switches $S_1$ and $S_2$. When the switch $S_1$ is closed it connects the output of the operational amplifier $A_1$ to the inverting input thereof. When the switch $S_2$ is closed it connects the output of the operational amplifier $A_1$ to the one electrode of the storage capacitor 66, the other electrode of which is connected to the inverting input of the operational amplifier $A_1$ so that then the storage capacitor 66 lies in the feedback circuit of the operational amplifier $A_1$. The output voltage of the operational amplifier $A_1$ with reference to the reference potential at the reference conductor 61 is denoted by $U_{A1}$.

The switch group 55 includes four switches $S_3$, $S_4$, $S_5$, $S_6$. When the switch $S_3$ is closed it connects the one electrode of the measuring capacitor 51 to the tap 63 of the voltage divider 54 and when the switch $S_4$ is closed it connects the same electrode of the measuring capacitor 51 to the tap 62. When the switch $S_5$ is closed it connects the one electrode of the reference capacitor 52 to the tap 62 and when the switch $S_6$ is closed it connects the same terminal of the reference capacitor 52 to the tap 63. The other electrodes of the capacitors 51 and 52 are connected to the inverting input of the operational amplifier $A_1$, the noninverting input of which is at a fixed potential which differs by a voltage $U_B$ from the reference potential at the reference conductor 61. The potential at the inverting input differs only by the offset voltage $U_{01}$ of the operational amplifier $A_1$ from the fixed potential of the noninverting input.

Like all the other switches in the circuit illustrated the switches $S_1$ to $S_6$ are actuated by control signals furnished by a control circuit 67 which is synchronized by a clock signal furnished by a clock generator 68. For simplification the control signals are denoted by the same reference numerals $S_1$, $S_2$, $S_3$... as the switches controlled by them. The time profiles of the control signals are represented in the diagrams of FIG. 9. Each switch $S_1$, $S_2$... is open when the signal controlling it has the low signal value and is closed when the signal controlling it has the high signal value.

The switches $S_1$, $S_2$... are represented symbolically as mechanical switch contacts but in reality of course they are highspeed electronic switches, for example field-effect transistors.

The buffer 65 is followed by an integrator 70 itself followed by a comparator 71. The integrator 70 includes an operational amplifier $A_2$, an integration capacitor 72 of capacitance C lying in the feedback circuit of the operational amplifier $A_2$ and two switches $S_7$, $S_8$. When the switch $S_7$ is closed it connects the inverting input of the operational amplifier $A_2$ to the storage capacitor 66 in the buffer 65. When the switch $S_8$ is closed it connects the inverting input of the operational amplifier $A_2$ to the output of a correction circuit 73. The noninverting input of the operational amplifier $A_2$ is at the same fixed potential as the noninverting input of the operational amplifier $A_1$. The potential at the inverting input differs only by the offset voltage $U_2$ of the operational amplifier $A_2$ from said fixed potential.

The comparator 71 includes an operational amplifier $A_3$ which is connected in known manner as threshold value comparator by leaving its feedback circuit open. The inverting input of the operational amplifier $A_3$ is connected to the output of the operational amplifier $A_2$ in the integrator 70 and a threshold voltage $U_S$ is applied to the noninverting input of the operational amplifier $A_3$. Between the two inputs of the operational amplifier $A_3$ there is the offset voltage $U_{03}$. Corresponding to the known function of such a threshold value comparator, the output voltage $U_{A3}$ of the operational amplifier $A_3$ has a low value when the voltage $U_{A2}$ is above the threshold value $U_S$ and it assumes a high value when the voltage $U_{A2}$ drops below the threshold value $U_S$. The output of the comparator 71 is connected to an input of the control circuit 67.

The correction circuit 73 includes an input block 74, a switch-capacitor group 75 and a correction memory 76. The input block 74 includes a resistor 77 of which the one terminal is connected to the output of the operational amplifier $A_1$ in the buffer 65 so that at the circuit point 78 the output voltage $U_{A1}$ of the operational amplifier $A_1$ is present. The other terminal of the resistor 77 is connected to a temperature sensor 80 which corresponds to the second sensor 4 of FIG. 1 and serves to generate a second measuring effect $M_2$ which depends on the temperature T. The temperature sensor 80 is of course, like the capacitive sensor 50, spatially separated from the signal processing circuit. The temperature sensor 80 includes a temperature-dependent resistor 81 with the resistance value $R_T$. The temperature-dependent resistor 81 lies in series with the resistor 77 between the output of the operational amplifier $A_1$ and the reference conductor 61 so that the resistors 77 and 81 form a voltage divider 82 at which the voltage $U_{A1}$ is present. The resistance value of the resistor 77 is independent of the temperature and is denoted by $R_V$. Thus, the voltage divider 82 has a temperature-dependent voltage division ratio $V_T$ of value $$V_T = \frac{R_T}{R_V + R_T} \quad (14)$$

and at the tap 83 of the voltage divider 82 there is the temperature-dependent voltage $$U_T = V_T U_{A1}. \quad (15)$$

The temperature-dependent voltage division ratio forms the measuring effect $M_2$.

The correction memory 76 has the same structure as the buffer 65 with an operational amplifier $A_4$, two switches $S_9$, $S_{10}$ and a storage capacitor 84 of capacitance C. When the switch $S_9$ is closed it connects the output of the operational amplifier $A_4$ to the inverting input thereof to which the first electrode of the storage capacitor 84 is also connected. When the switch $S_{10}$ is closed it connects the second electrode of the storage capacitor 84 to the output of the operational amplifier $A_4$ so that the storage capacitor 84 is then in the feedback circuit of the operational amplifier $A_4$. Said second electrode of the storage capacitor 84 forms at the same time the output of the correction circuit which is connected to the inverting input of the operational amplifier $A_2$ in the integrator 70 when the switch $S_8$ is closed.

The switch-capacitor 75 contains eight switches $S_{11}$, $S_{12}$, $S_{13}$, $S_{14}$, $S_{15}$, $S_{16}$, $S_{17}$, $S_{18}$ and eight capacitors 91, 92, 93, 94, 95, 96, 97, 98. When the switch $S_{11}$ is closed it connects the first electrode of the capacitor 91 to the circuit point 78. In corresponding manner the switches $S_{12}$, $S_{13}$, $S_{14}$, when they are closed, connect the respective first electrode of the capacitors 92, 93, 94 to the circuit point 78. When the switch $S_{15}$ is closed it connects the first electrode of the capacitor 95 to the tap 83 of the voltage divider 82. In corresponding manner, the switches $S_6$, $S_7$, $S_8$, when they are closed, connect the first electrodes of the capacitors 96, 97, 98 to the tap 83. The second electrodes of the capacitors 91 to 98 are connected to the inverting input of the operational amplifier $A_4$, the noninverting input of which lies at the same fixed potential as the noninverting inputs of the operational amplifiers $A_1$ and $A_2$. The potential at the inverting input differs from said fixed potential only by the offset voltage $U_{04}$ of the operational amplifier $A_4$.

The control circuit 67 has an output to which a cycle counter 100 is connected and a further output to which a compensation cycle counter 101 is connected.

The circuit operates by the principle of charge balancing. Controlled by the switches $S_1$, $S_2$, $S_3$, $S_4$, $S_5$, $S_6$, in successive cycles charge packets are applied to the capacitors 51 and 52 of the sensor 50 which depend on the voltages $U_2$, $U_3$ and on the capacitance $C_x$, $C_{ref}$ of said capacitors. The purpose of the voltage divider 54 is to define the maximum magnitude of the charge packets within the circuit for given capacitance values of the sensor 50. The charge packets are buffered in the storage capacitor 66 and by closing the switch $S_7$ transferred to the integration capacitor 72 in which they are summated. With the aid of the correction circuit 73 additional charge packets are generated which are buffered in the storage capacitor 84 and at the end of each cycle likewise transferred to the integration capacitor 72 by closing the switch $S_8$. The voltage $U_{A2}$ corresponds to the voltage at the integration capacitor 72 which in turn depends on the charge integrated on the integration capacitor. The sequence of the circuit is so controlled that for $C_x > C_{ref}$ the voltage $U_{A2}$ becomes progressively smaller. If the voltage $U_{A2}$ drops below the predetermined threshold voltage $U_S$ of the comparator 71 the output voltage $U_{A3}$ thereof changes to its maximum value, the control circuit 67 thereby being caused to execute a compensation cycle. In the compensation cycle the correction circuit 73 is controlled in such a manner that on the next closing of the switch $S_8$ it transfers to the integration capacitor 72 a charge packet which is substantially proportional to the capacitance $C_{ref}$ of the reference capacitor 52 with a signal such that the voltage $U_{A2}$ is again raised above the threshold voltage $U_S$. As a result, in the integration capacitor 72 a charge balancing takes place because in the time mean the sum of all the integrated charge packets is equal to zero. This balance is always present at the instants in which the voltage $U_{A2}$ drops below the switching threshold of the comparator 71.

The sequence of the function described generally above will now be explained in detail with the aid of the diagrams of FIG. 9. Apart from the already mentioned time profiles of the switch control signals $S_1$ to $S_{18}$ the diagrams of FIG. 9 also show the time profiles of the voltages $U_{A1}$, $U_{A2}$ and $U_{A3}$ in several cycles, one of which is a compensation cycle K. The other cycles, which are not compensation cycles, are denoted as measuring cycles M. Each cycle consists of twelve phases which are numbered 1 to 12.

The switches $S_1$ and $S_2$ are controlled by a periodic square-wave signal in antiphase relationship so that the switch $S_1$ is open when the switch $S_2$ is closed and vice-versa. When the switch $S_1$ is closed and the switch $S_2$ open the capacitors 51 and 52 lying in the input circuit of the operational amplifier $A_1$ can be connected by the switches $S_3$ to $S_6$ to the voltages $U_2$ or $U_3$ and correspondingly charge without thereby influencing the charge in the storage capacitor 66. This state is referred to as "conditioning phase".

In the same manner the switches $S_9$ and $S_{10}$ are controlled by a periodic square-wave signal of twice the frequency in antiphase manner so that the switch $S_9$ is open when the switch $S_{10}$ is closed and vice-versa. When the switch $S_9$ is closed and the switch $S_{10}$ open the capacitors 91 to 98 lying in the input circuit of the operational amplifier $A_4$ can be connected by the switches $S_{11}$ to $S_{18}$ to the voltage $U_{A1}$ or $U_T$, respectively, and correspondingly charged without thereby influencing the charge in the storage capacitor 84. This state is once again referred to as "conditioning phase".

To facilitate understanding firstly the basic principle of the circuit will be described and only then the function of the correction circuit 73.

1. Basic principle:

Phase 1 and 2:

At the start of phase 1 of each cycle the circuit is in the initial state in which the storage capacitor 66 after the discharge operation effected by closing the switch 7 in the preceding cycle is charged to a residual charge $$Q_{66R} = (U_{02} - U_{01}) \cdot C \tag{16}$$

which is defined by the difference of the offset voltages of the two operational amplifiers $A_1$ and $A_2$.

For the duration of the phases 1 and 2 the switch $S_1$ is closed and the switch $S_2$ open. At the same time the switch $S_4$ is closed so that the measuring capacitor 51 is connected for conditioning to the tap 62 and charged by the voltage present there to the charge $$Q_{Cx(1,2)} = (U_{01} + U_B - U_2) \cdot C_x \tag{17}$$

During the phases 1 and 2 the voltage $U_{A1}$ has the value $$U_{A1(1,2)} = U_b + U_{01} \tag{18}$$

Phases 3 and 4:

In phases 3 and 4 the switch $S_1$ is open and the switch $S_2$ closed so that the buffer 65 is ready to transfer charge to the storage capacitor 66. At the same time the switch $S_3$ is closed, whereby the measuring capacitor 51 is connected to the tap 63. By the voltage $U_3$ present there the measuring capacitor 51 is reverse charged to the charge $$Q_{Cx(3,4)} = (U_{01} - U_3) \cdot C_x \tag{19}$$

The reverse charge quantity $$dQ_{Cx} = Q_{Cx(3,4)} - Q_{Cx(1,2)} = (U_2 - U_3) \cdot C_x \tag{20}$$

flows to the capacitor 66 which thus has the following charge $$Q_{66(3,4)} = Q_{66R} + dQ_{Cx} = Q_{66R} + (U_2 - U_3) \cdot C_x \tag{21}$$

During the phases 3 and 4 the voltage $U_{A1}$ has the value $$U_{A1} = U_{66} + U_{01} + U_B = Q_{66(3,4)}/C + U_{01} + U_B \tag{22}$$

If the residual charge $Q_{66R}$ is neglected the voltage $U_{A1}$ thus has during the phases 3 and 4 the value $$U_{A1(3,4)} = (U_2 - U_3) \cdot C_x / C + U_{01} + U_B \tag{23}$$

Phases 5 to 8:

The phases 5 to 8 correspond to the phases 1 to 4 with the difference that instead of the measuring capacitor 51 of capacitance $C_x$ the reference capacitor 52 of capacitance $C_{ref}$ is now used.

In the phases 5 and 6 the conditioning of the reference capacitor 52 is carried out, said capacitor being connected by the switch $S_6$ to the tap 63 and therefore charged by the voltage $U_3$ to the charge $$Q_{Cref(5,6)} = (U_{01} + U_B - U_3) \cdot C_{ref} \tag{24}$$

During the phases 5 and 6 the voltage $U_{A1}$ again has the value $$U_{A1(5,6)} = U_B + U_{01} \qquad (25)$$

In phases 7 and 8 the buffer 65 is ready to take over the charge and the reference capacitor 52 is connected by the switch $S_5$ to the tap 62 so that it is reverse charged by the voltage $U_2$ to the charge $$Q_{Cref(7,8)} = (U_{01} + U_B - U_2) \cdot C_{ref} \qquad (26)$$

The reverse charge amount $$dQ_{Cref} = Q_{Cref(7,8)} - Q_{Cref(5,6)} = -(U_2 - U_3) \cdot C_{ref} \qquad (27)$$

is transferred to the storage capacitor 66. The total charge in the storage capacitor 66 is then $$\begin{aligned} Q_{66(7,8)} &= Q_{66R} \, dQ_{Cx} + dQ_{Cref} \\ &= Q_{66R} + (U_2 - U_3) \cdot (C_x - C_{ref}) \end{aligned} \qquad (28)$$

If the residual charge $Q_{66R}$ is again neglected the voltage $U_{A1}$ has during the phases 7 and 8 the value $$U_{A1(7,8)} = Q_{66(7,8)}/C + U_{01} + U_B = (U_2 - U_3) \cdot (C_x - C_{ref})/C + U_{01} + U_B \qquad (29)$$

Phase 9

In phase 9 the switch $S_2$ is open so that the storage capacitor 66 is separated from the output of the operational amplifier $A_1$. In contrast, the switch $S_7$ is closed so that the two electrodes of the storage capacitor 66 are connected to the inverting inputs of the two operational amplifiers $A_1$ to $A_2$ which lie practically at the same potential which differs from refer. potential only by the offset voltage $U_{01}$ or $U_{02}$ respectively. Consequently, the storage capacitor 66 is discharged except for the residual charge $$Q_{66R} = (U_{02} - U_{01}) \cdot C \qquad (30)$$

The discharge is to the integration capacitor 72 to which the charge amount $$dQ_M = Q_{66R} - Q_{66(7,8)} = -(C_x - C_{ref}) \cdot (U_2 - U_3) \qquad (31)$$

is thus supplied. Hereinafter, $dQ_M$ is denoted as measuring charge packet. With $C_x > C_{ref}$ and $U_2 > U_3$, $dQ_M < 0$. The voltage $U_{A2}$ thus becomes smaller on each discharge of the storage capacitor 66 to the integration capacitor 72.

With phase 9 the sequence according to the basic principle is concluded which is repeated in each cycle. The remaining three phases of the cycle are required only for the correcting and compensation operations explained hereinafter.

If in this stepwise decreasing the voltage $U_{A2}$ drops below the predetermined threshold voltage $U_S$ the output voltage $U_{A3}$ of the comparator 71 changes to its maximum value, the control circuit 67 thereby initiating a compensation cycle K in the course of which it controls the correction circuit 73 in such a manner that the latter on the next charge transfer to the integration capacitor 72 transfers a compensation charge packet $dQ_K$ which (measured in $C_{72}$) has substantially the value $$dQ_K = (U_2 - U_3) \cdot C_{ref} \qquad (32)$$

The voltage $U_{A2}$ is thereby again raised to a value which lies above the threshold voltage $U_S$ and from whence the voltage $U_{A2}$ again drops in the following cycles. The generation of the compensation charge packets $dQ_K$ in the correction circuit 73 will be described hereinafter in relationship to the correction process.

It should be noted that in the compensation cycle K as well a measuring charge packet $dQ_M$ is transferred to the integration capacitor 72. If the correction additionally effected by the correction circuit 73 is initially disregarded, the mode of operation described gives a charge balance in the integration capacitor 72 in that in the course of n successive cycles it causes k compensation cycles in such a manner that the sum of the n measuring charge packets supplied in said n cycles is equal to the sum of the k compensation charge packets supplied in the n cycles. Consequently $$n \cdot dQ_M = k \cdot dQ_K \qquad (33)$$

$$n \cdot (U_2 - U_3) \cdot (C_x - C_{ref}) = k \cdot (U_2 - U_3) \cdot C_{ref} \qquad (34)$$

$$\frac{k}{n} = \frac{C_x - C_{ref}}{C_{ref}} \qquad (35)$$

On each initiation of a cycle the control circuit 67 sends a count pulse to the cycle counter 100 and on each initiation of a compensation cycle k a count pulse to the compensation cycle counter 101. Starting from the same initial count zero the cycle counter 100 thus indicates the total number n of the cycles carried out and the compensation cycle counter 101 the number k of the compensation cycles. The quotient of the two counts corresponds directly to the desired measurement result, however still without any correction of disturbance effects.

Whereas the cycles, controlled by the clock generator 68, follow each other with a fixed frequency the frequency of the count pulses sent to the compensation cycle counter 101 varies in dependence upon the ratio $(C_x - C_{ref})/C_{ref}$. Thus, instead of the ratio k/n of two counts read after a predetermined measuring time the frequency of the compensation count pulses can be used directly for continuous indication of the measured value.

2. Function of the correction circuit:

The correction circuit 73 operates by the same principle as the circuit blocks 53 and 65 described above. When the switch $S_9$ is closed and the switch $S_{10}$ open the capacitors 91 to 98 can be conditioned by closing the associated switches $S_{11}$ to $S_{18}$ selectively to the voltage $U_{A1}$ or $U_T$ available in the input block 74 and when the switch $S_9$ is open and the switch $S_{10}$ closed and one or more of the capacitors 91 to 98 reverse charged by closing the associated switch $S_{11}$ to $S_{18}$ the entire reverse charge amount is integrated in the storage capacitor 84. The values of the charge packets realisable in this manner depend on the one hand on the capacitance values of the capacitors 91 to 98 and on the other on the available voltage values at the circuit point 78 and at the tap 83. It should be remembered that the voltage $U_{A1}$ at the circuit point 78 assumes different values in the course of each cycle and that the voltage $U_T$ at the tap 83 depends both on the voltage $U_{A1}$ and on the temperature T. By suitable choice of the phases in which the switches $S_{11}$ to $S_{18}$ are closed it is thus possible to apply different voltages to the capacitors 91 to 98. Furthermore, by suitable choice of the switch phases positive or negative charge packets can be selectively generated.

At the end of each cycle the charge quantity integration on the storage capacitor 84 is transferred to the integration capacitor 72 by closing the switch $S_8$ while the switch $S_9$ is closed and switch $S_{10}$ is open. The charge packets transferred in the course of the measuring cycles M from the correction circuit 73 to the integrator 70 form correction charge packets which serve to correct the disturbance effects. The charge packets transferred in the course of the compensation cycles K form the previously explained compensation charge packets $dQ_K$ and additionally correction charge packets.

The formation of the correction and compensation charge packets by the correction circuit 73 will now be explained with the aid of the diagrams of FIG. 9. In FIG. 9 for each of the switches $S_{11}$ to $S_{18}$ two different control signals are represented which differ from each other by the added signs "+" and "−". The control signals provided with the sign "+" serve to generate positive charge packets and the control signals provided with the sign "−" serve to generate negative charge packets, in each case with the aid of the same switches and capacitors. The signs of these charge packets generated relate to the charge $Q_{84}$ of the storage capacitor 84. It should be noted that on charge transfer from the storage capacitor 84 to the integration capacitor 72 the sign of the transported charge packet is inverted. Thus, for example, with the aid of the capacitor 91 a positive charge packet is generated with the associated switch $S_{11}$ is controlled by the control signal $S_{11+}$ and a negative charge packet when the switch $S_{11}$ is controlled by the control signal $S_{11-}$. This applies accordingly to the remaining switch-capacitor combinations.

It is further to be seen in FIG. 9 that the switches $S_{11}$, $S_{13}$, $S_{15}$ and $S_{17}$ are actuated only during the measuring cycles M and the switches $S_{12}$, $S_{14}$, $S_{16}$ and $S_{18}$ only during the compensation cycles K. The switches $S_{11}$, $S_{13}$, $S_{15}$, $S_{17}$ thus serve in conjunction with the capacitors 91, 93, 95, 97 to generate correction charge packets and the switches $S_{12}$, $S_{14}$, $S_{16}$, $S_{18}$ serve in conjunction with the capacitors 92, 94, 96, 98 to generate charge packets each containing a compensation charge packet and a correction charge packet. A compensation charge packet here means a charge packet corresponding to the equation (32). All the other charge packets generated during the compensation cycles K and all the charge packets generated during the measuring cycles M are correction charge packets.

The following should be noted as regards the choice of the phases for actuation of the switches $S_{11}$ to $S_{18}$: If one of the switches $S_{11}$ to $S_{18}$ is closed in a phase in which the switch $S_9$ is closed and the switch $S_{10}$ open the circuit is in the "conditioning phase" and the associated capacitor is charged by the voltage which happens to be present without thereby influencing the charge on the storage capacitor 84. If however one of the switches $S_{11}$ to $S_{18}$ is closed in a phase in which the switch $S_9$ is open and the switch $S_{10}$ is closed the associated capacitor is reverse charged by the voltage which happens to be present and the reverse charge amount is transferred to the storage capacitor 84.

By way of example the case will be considered in which with the aid of the capacitor 91 a positive charge packets is to be generated. The control signal $S_{11}$ sent by the control circuit 67 to the switch $S_{11}$ then has the time profile denoted in FIG. 9 by $S_{11+}$. In each measuring cycle M the switch $S_{11}$ is closed for the first time in the phase 7. In this phase the signal $S_9$ has the high value so that the switch $S_9$ is closed and the switch $S_{10}$ open. The arrangement is thus in the conditioning phase for the capacitor 91. This means that to the capacitor 91 a charge $Q_{91(7)}$ is applied which is defined by the voltage $U_{A1(7,8)}$ present at the circuit point 78:

$$Q_{91(7)} = (U_{04} + U_B - U_{A1(7,8)}) \cdot C_{91} \tag{36}$$

Now, the voltage $U_{A1}$ in accordance with equation (29) has in phase 7 and 8 the value $$U_{A1(7,8)} = (U_2 - U_3) \cdot (C_x - C_{ref})/C + U_{01} + U_B \tag{37}$$

Consequently, the following holds true for the charge $Q_{91(7)}$ $$\begin{aligned} Q_{91(7)} &= [U_{04} + U_B - (U_2 - U_3) \cdot \\ & (C_x - C_{ref})/C - U_{01} - U_B] \cdot C_{91} \\ &= [U_{04} - U_{01} - (U_2 - U_3) \cdot \\ & (C_x - C_{ref})/C] \cdot C_{91} \end{aligned} \tag{38}$$

The switch $S_{11}$ is then again closed in phase 10 of the same measuring cycle. In phase 10 the switch $S_9$ is open and the switch $S_{10}$ is closed and thus the correction memory 76 ready for the transfer of charges to the storage capacitor 84. Since in this phase the voltage $U_{A1}$ at the circuit point 78 has the value $$U_{A1(10)} = U_B + U_{01} \tag{39}$$

the capacitor 91 is recharged to the charge $Q_{91(10)}$:

$$Q_{91(10)} = [U_{04} + U_B - U_{A1(10)}] \cdot C_{91} = (U_{04} - U_{01}) \cdot C_{91} \tag{40}$$

The reverse charge packet $$dQ_{91+} = Q_{91(10)} - Q_{91(7)} = (U_2 - U_3) \cdot (C_x - C_{ref}) \cdot C_{91}/C \tag{41}$$

is transferred to the storage capacitor 84 and there added to the other charge packets generated in the same measuring cycle M.

If however a negative charge packet is to be applied to the capacitor 91 the switch $S_{11}$ is controlled by the control signal $S_{11-}$ of FIG. 9. The first closing then takes place in the phase 5 of the measuring cycle M. In this phase the switch $S_9$ is closed and the switch $S_{10}$ open so that the capacitor 91 is conditioned by the voltage $U_{A1}$ which is present at the circuit point 78 and in phase 5 has the value $$U_{A1(5)} = U_B + U_{01} \tag{42}$$

The capacitor 91 is thus given the charge $$Q_{91(5)} = (U_{04} + U_B - U_{A1(5)}) \cdot C_{91} = (U_{04} - U_{01}) \cdot C_{91} \tag{43}$$

The next closing of the switch $S_{11}$ takes place in phase 8 of the same measuring cycle in which the voltage at the circuit point 78 has the value $$U_{A1(7,9)} = (U_2 - U_3) \cdot (C_x - C_{ref})/C + U_{01} + U_B \quad (44)$$

and consequently the capacitor 91 is reverse charged to the charge $$Q_{91(8)} = [U_{04} + U_B - (U_2 - U_3) \cdot \quad (45)$$
$$(C_x - C_{ref})/C_{ref} - U_{01} - U_B] \cdot C_{91}$$
$$= [U_{04} + U_{01} - (U_2 - U_3) \cdot$$
$$(C_x - C_{ref})/C_{ref}] \cdot C_{91}$$

The reverse charge packet $$dQ_{91-} = Q_{91(8)} - Q_{91(5)} = -(U_2 - U_3) \cdot (C_x - C_{ref}) \cdot C_{91}/C \quad (46)$$

is transferred to the storage capacitor 84 and there added to the other correction charge packets generated in the same measuring cycle.

As can be seen, the charge packets $dQ_{91+}$ and $dQ_{91-}$ have the same magnitude; they differ only in the sign.

It can be seen from the diagrams of FIG. 9 that the control signals $S_{15+}$ and $S_{15-}$ are identical to the control signals $S_{11+}$ and $S_{11-}$ respectively. The processes in the conditioning and reverse charging on the capacitor 95 thus take place in the manner described above but with the difference that instead of the voltage $U_{A1}$ present at the circuit point 78 the voltage $U_T$ present at the tap 83 is decisive for the charging and reverse charging of the capacitor 95. Since in accordance with equation (15) for the voltage $U_T$:

$$U_T = V_T U_{A1} \quad (47)$$

with the aid of the capacitor 95 the following charge packets can be generated and transferred to the storage capacitor 84:

$$dQ_{95+} = V_T(U_2 - U_3) \cdot (C_x - C_{ref}) \cdot C_{95}/C \quad (48)$$

$$dQ_{95-} = -V_T(U_2 - U_3) \cdot (C_x - C_{ref}) \cdot C_{95}/C \quad (49)$$

The control signals $S_{12+}$, $S_{16+}$ and $S_{12-}$, $S_{16-}$ have the same time profile as the control signals $S_{11+}$, $S_{15+}$ and $S_{11-}$, $S_{15-}$ described above; they differ therefrom only in that they do not occur in the measuring cycles M but in the compensation cycles K. Thus, by said control signals in each compensation cycle the following charge packets can be generated:

with the aid of the capacitor 92

$$dQ_{92+} = (U_2 - U_3) \cdot (C_x - C_{ref}) \cdot C_{92}/C \quad (50)$$

$$dQ_{92-} = -(U_2 - U_3) \cdot (C_x - C_{ref}) \cdot C_{92}/C \quad (51)$$

with the aid of the capacitor 96:

$$dQ_{96+} = V_T(U_2 - U_3) \cdot (C_x - C_{ref}) \cdot C_{96}/C \quad (47)$$

$$dQ_{96-} = -V_T(U_2 - U_3) \cdot (C_x - C_{ref}) \cdot C_{96}/C \quad (48)$$

If with the capacitor 93 a positive charge packet is to be generated the switch $S_{13}$ is controlled by the control signal $S_{13+}$ of FIG. 9. By this control signal the switch $S_{13}$ is closed in phase 3 for the first time in each measuring cycle M. In this phase the switch $S_9$ is closed and the switch $S_{10}$ open so that the capacitor 93 is conditioned by the voltage $U_{A1}$ which is present at the circuit point 78 and which in accordance with equation (23) in phase 3 has the following value:

$$U_{A1(3,4)} = (U_2 - U_3) \cdot C_x/C + U_{01} + U_B \quad (54)$$

Accordingly, the capacitor 93 is charged to the charge $$Q_{93(3)} = [U_{04} + U_B - (U_2 - U_3) \cdot \quad (55)$$
$$C_x/C + U_{01} + U_B] \cdot C_{93}$$
$$= [U_{04} + U_{01} - (U_2 - U_3) \cdot C_x/C] \cdot C_{93}$$

The next closing of the switch $S_{13}$ takes place in phase 8 in which the voltage $U_{A1}$ at the circuit point 78 in accordance with equation (29) has the following value:

$$U_{A1(7,8)} = (U_2 - U_3) \cdot (C_x - C_{ref})/C + U_{01} + U_B \quad (56)$$

Accordingly, the capacitor 93 is reverse charged to the charge $$Q_{93(8)} = [U_{04} - U_{01} - (U_2 - U_3) \cdot (C_x - C_{ref})/C] \cdot C_{93} \quad (57)$$

The reverse charge packet $$dQ_{93+} = Q_{93(8)} - Q_{93(3)} = (U_2 - U_3) \cdot C_{ref} \cdot C_{93}/C \quad (58)$$

is transferred to the storage capacitor 84 and there added to the other charge packets generated in the same measuring cycle.

If however a negative charge packet is to be generated with the capacitor 93 the control of the switch $S_{13}$ is by the control signal $S_{13-}$. By this control signal the switch $S_{13}$ is closed for the first time in phase 4 in each measuring cycle M. In this phase the switch $S_9$ is open and the switch $S_{10}$ closed; it is thus not a conditioning phase but a reverse charge phase in which the capacitor 93 is reverse charged compared with the conditioning which took place in the previous measuring cycle and the reverse charge packet is transferred to the storage capacitor 84. A conditioning of the capacitor 93 then takes place in phase 7 in which the switch $S_{13}$ is closed again and in which the switch $S_9$ is closed and the switch $S_{10}$ open. In phase 7 the voltage $U_{A1}$ at the circuit point 78 has the value $$U_{A1(7,9)} = (U_2 - U_3) \cdot (C_x - C_{ref})/C + U_{01} + U_B \quad (59)$$

and consequently the capacitor 93 is charged to the charge $$Q_{93(7)} = [U_{04} - U_{01} - (U_2 - U_3) \cdot (C_x - C_{ref})/C] \cdot C_{93} \quad (60)$$

The reverse charging of the capacitor 93 then takes place in phase 4 of the next measuring cycle M in which the voltage $U_{A1}$ has the value $$U_{A1(3,4)} = (U_2 - U_3) \cdot C_x/C + U_{01} + U_B \quad (61)$$

so that the capacitor 93 is reverse charged to the charge $$Q_{93(4)} = [U_{04} - U_{01} - (U_2 - U_3) \cdot C_x/C] \cdot C_{93} \quad (62)$$

The reverse charge packet $$dQ_{93-} = Q_{93(4)} - Q_{93(7)} = -(U_2 - U_3) \cdot C_{ref} \cdot C_{93}/C \quad (63)$$

is transferred to the storage capacitor 84 and there added to the other charge packets generated in the same measuring cycle. The charge packets $dQ_{93+}$ and $dQ_{93-}$ again have the same value and differ only in the sign.

The generation of charge packets with the capacitor 97 by the control signals $S_{17+}$ and $S_{17-}$ takes place in identical manner but with the voltage $U_T$ instead of the voltage $U_{A1}$ and consequently the following charge packets are generated and can be transferred to the storage capacitor 81:

$$dQ_{97+} = V_T(U_2-U_3) \cdot C_{ref} C_{97}/C \tag{64}$$

$$dQ_{97-} = -V_T(U_2-U_3) \cdot C_{ref} C_{97}/C \tag{65}$$

The control signals $S_{14+}$, $S_{18+}$ and $S_{14-}$, $S_{18-}$ for generation of the charge packets in the compensation cycles K again have the same time profile as the previously explained control signals $S_{13+}$, $S_{17+}$ and $S_{13-}$, $S_{17-}$ so that in each compensation cycle the following charge packets can be generated and transferred to the storage capacitor 84:

with the capacitor 94:

$$dQ_{94+} = (U_2-U_3) \cdot C_{ref} C_{94}/C \tag{66}$$

$$dQ_{94-} = -(U_2-U_3) \cdot C_{ref} C_{94}/C \tag{67}$$

with the capacitor 98:

$$dQ_{93+} = V_T(U_2-U_3) \cdot C_{ref} C_{98}/C \tag{68}$$

$$dQ_{98-} = -V_T(U_2-U_3) \cdot C_{ref} C_{98}/C \tag{69}$$

It is also clear from the above explanation why the switches $S_9$, $S_{10}$ are operated with twice the frequency as the switches $S_1$, $S_2$: Switches $S_1$, $S_2$ assume their alternate positions in each case for the duration of two phases and accordingly each value of the voltage $U_{A1}$ is also available for the duration of two phases. During this period of two phases the switches $S_9$ and $S_{10}$ first assume the one position and then the other so that the same value of the voltage $U_{A1}$ can be used selectively for conditioning or reverse charging.

In the manner outlined, with the aid of eight switch-capacitor combinations by suitable choice of the switching phases of the control signals $S_{11}$ to $S_{18}$ charge packets with eight different magnitudes can be generated which are each weighted by the capacitance value $C_{91}$ and $C_{98}$ of the respective capacitors and each of said charge packets can be generated optionally with positive or negative sign and buffered in the storage capacitor 84.

In the circuit of FIG. 8 for generating the charge packets eight capacitors 91 to 98 with different capacitance values are provided. This circuit implements a time-discrete signal processing in which the charge transfers via the capacitors 91 to 98 take place at different instants depending on the profile of the control signals $S_{11}$ to $S_{18}$. If the profile of the control signals $S_{11}$ to $S_{18}$ is suitably chosen it is thus also possible to use a smaller number of capacitors with adjustable capacitances which are then repeatedly employed.

In the Table I at the end of the description once again all charge packets which can be implemented with the arrangement of FIG. 8 are summarized. In each charge packet the term $\pm C_i/C$ (with i=91 ... 98) represents a correction coefficient $B_{11}$ to $C_{22}$ as likewise indicated in the Table I.

The formation and transfer of the charge packets is completed at the latest with phase 10. In phase 11 the switch $S_8$ is closed and as a result the total charge packet integrated on the storage capacitor 84 is transferred to the integration capacitor 72. Accordingly the voltage $U_{A2}$ undergoes another change in phase 11. In each measuring cycle M this is a correction change due to the correction charge packet transferred. In each compensation K this is however essentially the compensation change by which the voltage $U_{A2}$ is again raised above the predetermined threshold voltage $U_S$ but in combination with an additional correction change because correction charge packets are also contained in the compensation phase.

3. Transfer function:

The transfer function of the circuit is calculated from the equation for the charge balance: The sum of all charge packets integrated in the integration capacitor 72 is equal to zero in a predetermined time interval. If a time interval of n cycles containing k compensation cycles K and thus (n−k) measuring cycles M is considered, then in said time interval the following charge packets are transferred to the integration capacitor 72.

in each of the n cycles a measuring charge packet $dQ_M$, i.e. altogether $$n \cdot dQ_M = n \cdot (-1) \cdot (C_x - C_{ref}) \cdot (U_2 - U_3) \tag{70}$$

in each of the n-k measuring cycles M the correction charge packets $dQ_{91}+dQ_{95}$ and $dQ_{93}+dQ_{97}$ (with corresponding sign) i.e. altogether:

$$(n-k)\cdot(dQ_{91}+dQ_{95}) = (n-k)\cdot(B_{21}+B_{22}\cdot V_T)\cdot(C_x - C_{ref})\cdot(U_2-U_3) \tag{71}$$

$$(n-k)\cdot(dQ_{93}+dQ_{97}) = (n-k)\cdot(B_{11}+B_{12}\cdot V_T)\cdot C_{ref}(U_2-U_3) \tag{72}$$

in each of the k compensation cycles K the compensation charge packets $dQ_{92}+dQ_{96}$ and $dQ_{94}+dQ_{98}$ (with corresponding sign), i.e. altogether $$k\cdot(dQ_{92}+dQ_{96}) = k\cdot(C_{21}+C_{22}\cdot V_T)\cdot(C_x-C_{ref})\cdot(U_2-U_3) \tag{73}$$

$$k\cdot(dQ_{94}+dQ_{98}) = k\cdot(C_{11}+C_{12}\cdot V_T)\cdot C_{ref}(U_2-U_3) \tag{74}$$

All of these charge packets are listed in the Table II for better overview.

If all the charge packets in Table II are summated and put equal to zero, then the following is obtained as transfer function:

$$\frac{k}{n} = \frac{-B_{11} - B_{12} \cdot V_T + (1 - B_{21} - B_{22} \cdot V_T) \cdot (C_x - C_{ref})/C_{ref}}{C_{11} - B_{11} + (C_{12} - B_{12}) \cdot V_T + (C_{21} - B_{21} + (C_{22} - B_{22}) \cdot V_T) \cdot (C_x - C_{ref})/C_{ref}}$$

By simple combination of the coefficients this therefore gives exactly the desired transfer function according to equation (4):

$$\frac{k}{n} = \frac{b_{11} + b_{12} \cdot V_T + (b_{21} + b_{22} \cdot V_T) \cdot (C_x - C_{ref})/C_{ref}}{c_{11} + c_{12} \cdot V_T + (c_{21} + c_{22} \cdot V_T) \cdot (C_x - C_{ref})/C_{ref}} \tag{76}$$

If the equation (76) is compared with equation (4) it is seen that the measuring effect $M_1$ is the pressure-dependent and temperature-dependent capacitance ratio $(C_x - C/_{ref})/C_{ref}$ and the measuring effect $M_2$ is the temperature-dependent voltage division ratio $V_T$. With the transfer function according to equation (76) the most important characteristic data of the sensor 50 can be corrected with the following adjustable correction coefficients:

| | |
|---|---|
| Zero point | $b_{11}$ |
| TC zero point | $b_{12}$ |
| Sensitivity | $b_{21}, c_{11}$ |
| TC sensitivity | $b_{22}, c_{12}$ |
| Nonlinearity | $c_{21}$ |
| TC nonlinearity | $c_{22}$ |

The voltage divider 54 with the resistors 56, 57, 58 does not enter the transfer function but governs the magnitude of the measuring charge packet $dQ_M$ and thus the dimensioning of the capacitors 66 and 72. Similarly, the capacitance values of the capacitors 72 and 84, the offset voltages of the operational amplifiers, the operating voltage of the circuit and the frequency with which the control circuit is clocked do not enter the final result.

The value of the voltage $U_1$ is limited only by the operating range of the circuit.

In conjunction with Table I it is apparent from equation (75) that the correction coefficients of the transfer function are implemented by capacitance ratios, i.e. by the ratios of the capacitance values $C_{91}$ to $C_{98}$ of the capacitors 91 to 98 to the capacitance value C of the storage capacitor 66. The capacitors required for this purpose can be fabricated very well in integrated form. For setting the necessary capacitance values, in a manner known per se for each capacitor a plurality of sub-capacitors with gradated capacitance values may be provided which can be connected in parallel as required by digital programming. For this purpose, one of the procedures known for digital programming of read-only memories (ROM) can be employed. The number of necessary subcapacitors can be reduced in that the storage capacitor 66 is also formed by several sub-capacitors which for setting the capacitance value C are connected in parallel as required by digital programming.

Since the capacitance values of the capacitors 72 and 74 do not enter the transfer function no adjustment of said capacitors is necessary. It is however expedient for the capacitance values of these capacitors to be of the same order of magnitude as the capacitance value of the capacitor 66 and for this reason it was assumed in the above description that the capacitors 66, 72 have the same capacitance value C. This is however not an essential requirement.

For determining the necessary capacitance values firstly the sensor 50 is measured for determining the transfer function of the signal processing circuit in accordance with the equation (76) which would give the desired error-free relationship between the physical quantity to be measured, that is in the present case the pressure P, and the ratio k/n obtained as output signal. It makes no difference whether as output signal the ratio of two counts k and n obtained within a predetermined time interval is used or the ratio of the frequencies of the count pulses supplied to the two counters 100 and 101. When the transfer function has been determined in accordance with the equation (76) it can be brought into the form of equation (75) from which with the aid of Table I the necessary capacitance values $C_{91}$ to $C_{98}$ of the capacitor 91 to 98 can then be calculated. Thereafter, the subcapacitances of the capacitors 91 to 98 and possibly of the storage capacitor 66 are connected in parallel by digital programming in such a manner that the calculated capacitance values are set. The signal processing circuit then has the transfer function according to equation (76) so that the output signal k/n represents the physical quantity to be measured, for example the pressure P, linearly and free of any temperature influences.

The correction of further disturbing influences can be readily derived by the expert from the above description. From equation (2) the form of the transfer function according to equation (76) can be derived for the case in which apart from a disturbance effect $M_2$ further disturbance effects $M_3, M_4 \ldots$ are to be taken into account. Additional switch-capacitor combinations are then provided which, possibly with the aid of additional sensor for the further disturbance effects, permit formation of positive or negative charge packets which are likewise applied to the storage capacitor 84 of the correction memory 76 so that they contribute to the formation of the correction and compensation charge packets which are transferred to the integration capacitor 72. The capacitance values are calculated in the manner outlined above and set. The time sequences of the switch control signals required for correct formation of the positive or negative charge packets can be calculated by the expert without any difficulty from the rules given above. Likewise, on the basis of the above description he can calculate without any difficulty the correction coefficients associated with the further disturbance effects and the capacitance values necessary for the setting of said correction coefficients.

FIG. 10 shows a modified embodiment of the correction circuit in which the correction and compensation charge packets are weighted by adjustable resistors instead of by adjustable capacitors for setting the correction coefficients of the transfer function. The components of the correction circuit 110 of FIG. 10 identical to the corresponding components of the correction circuit 73 of FIG. 8 are denoted with the same reference numeral as in the latter and will not be described again.

The essential difference between the correction circuit 110 of FIG. 10 compared with the correction circuit 73 of FIG. 8 resides in that the capacitors 91 to 98 are connected by the associated switches $S_1$ to $S_8$ not directly to the circuit point 78 or the tap 83 of the temperature-dependent voltage divider 82 but to the taps of resistor voltage dividers 111 to 118. The voltage dividers 111 to 114 are connected between the circuit point 78 and the reference conductor 61 and the voltage dividers 115 to 118 are connected between the tap 83 and the reference conductor 61 with interposition of an isolating amplifier 120. The purpose of the isolating amplifier 120 is to prevent any influencing of the voltage division ratio $V_T$ of the temperature-dependent voltage divider 82 by the voltage dividers 115 to 118. It consists in conventional manner of an operational amplifier of which the output is connected directly to the inverting input so that it forms an impedance converter with the amplification factor 1. Thus, at the output of the isolating amplifier 120 the voltage $U_T$ is available if the offset voltage of the operational amplifier is neglected.

The voltage divider 111 consists of two temperature-independent resistors 121 and 131 which are connected in series between the circuit point 78 and the reference conductor 61. If the resistance value of the resistor 121 is denoted by $R_{121}$ and the resistance value of the resistor 131 by $R_{131}$ then the voltage divider 111 has the voltage division ratio $$V_{111} = R_{121}/(R_{121} + R_{131}) \qquad (77)$$

Since the voltage $U_{A1}$ is present at the voltage divider 111, at its tap the voltage $$U_{111} = U_{A1} \cdot V_{111} \qquad (78)$$

is available.

In corresponding manner the voltage dividers 112 to 114 consist of the temperature-independent resistors 122 and 132, 123 and 133 and 124 and 134 and they have the voltage division ratios $$V_{112} = R_{122}/(R_{122} + R_{132})$$

$$V_{113} = R_{123}/(R_{123} + R_{133}) \qquad (79)$$

$$V_{114} = R_{124}/(R_{124} + R_{134})$$

so that at their taps the following voltages are available:

$$U_{112} = U_{A1} \cdot V_{112}$$

$$U_{113} = U_{A1} \cdot V_{113} \qquad (80)$$

$$U_{114} = U_{A1} \cdot V_{114}$$

Each of the voltage dividers 115 to 118 likewise consists of two temperature-independent resistors 125 and 135, 126 and 136, 127 and 137, and 128 and 138, respectively, which are connected in series between the output of the isolating amplifier 120 and the reference conductor 61. These voltage dividers thus have the following voltage division ratios:

$$V_{115} = R_{125}/(R_{125} + R_{135})$$

$$V_{116} = R_{126}/(R_{126} + R_{136})$$

$$V_{117} = R_{127}/(R_{127} + R_{137}) \qquad (81)$$

$$V_{118} = R_{128}/(R_{128} + R_{138})$$

Since the voltage $$U_T = U_{A1} \cdot V_T \qquad (82)$$

is present at said voltage dividers, at their taps the following voltages are available:

$$U_{115} = U_T \cdot V_{115} = U_{A1} \cdot V_T \cdot V_{115}$$

$$U_{116} = U_T \cdot V_{116} = U_{A1} \cdot V_T \cdot V_{116}$$

$$U_{117} = U_T \cdot V_{117} = U_{A1} \cdot V_T \cdot V_{117} \qquad (83)$$

$$U_{118} = U_T \cdot V_{118} = U_{A1} \cdot V_T \cdot V_{118}$$

To form the correction and compensation charge packets the switches $S_{11}$ to $S_{18}$ are controlled in the manner previously described by the signals $S_{11+}$ to $S_{18+}$ and $S_{11-}$ to $S_{18-}$ of FIG. 9. The conditioning and reverse charging operations therefore take place in the same manner as in the signal processing circuit of FIG. 8, the only difference being that the conditioning and reverse chargings are not governed by the voltages $U_{A1}$ or $U_T$ but by the voltages $U_{111}$ to $U_{118}$ present at the taps of the voltage dividers 111 to 118. Thus, if for example the switch $S_1$ is controlled by the control signal $S_{11+}$ or by the control signal $S_{11-}$ of FIG. 9 for generating a positive or negative charge packet with the aid of the capacitor 91, then modifying equations (41) and (42) one of the following reverse charge packets is now transferred to the storage capacitor 84:

$$dQ_{1+} = (U_2 - U_3) \cdot (C_x - C_{ref}) \cdot V_{111} \cdot C_{91}/C \qquad (84)$$

$$dQ_{1-} = -(U_2 - U_3) \cdot (C_x - C_{ref}) \cdot V_{111} \cdot C_{91}/C \qquad (85)$$

The correction coefficient $B_{21}$ thus has the value $$B_{21} = \pm V_{111} \cdot C_{91}/C \qquad (86)$$

Said correction coefficient can be set to the desired value by changing the voltage division ratio $V_{111}$ instead of by changing the capacitance value $C_{91}$. The change of the voltage division ratio $V_{111}$ can be set either by changing the resistance value $R_{121}$ or by changing the resistance $R_{131}$ or also by changing both resistance values.

The remaining correction coefficients of the transfer function are obtained in corresponding manner. The correction coefficients differ from the correction coefficients specified in Table I in each case only by the factor $V_i$ (with i=111, 112 ... 118) and they can be set by varying the resistors 121 to 128 and/or the resistors 131 to 138.

The use of adjustable resistors instead of adjustable capacitors for weighting the charge packets is advantageous in particular is hybrid circuits because in this case the adjustment can easily be effected for example by laser trimming.

FIG. 11 shows the modification of the signal processing circuit of FIG. 8 for signal processing with error correction of the sensor signal furnished by a resistor half-bridge 140 and FIG. 12 shows the time profile of the associated switch control signals and voltages corresponding to the illustration of FIG. 9. The resistance half-bridge 140 contains two resistors 141 and 142 which are connected in series between the input terminal 60 and the reference conductor 61 and the connection point of which forms a tap 143. The resistance values of the resistors 141 and 142 differ from an identical basic value R by the same amounts dR, which are however of opposite sign. As example, it is indicated that the resistor 141 has the value R−dR and the resistor 142 the value R+dR. The resistor half-bridge 140 may therefore be formed for example by the force sensor 20 of FIGS. 3 and 4, the resistors 141 and 142 representing the resistance values of the strain gauges 22 and 23 respectively. R is the resistance value of the undeformed strain gauge and dR is the resistance change effected by the deformation of the strain gauge. The resistance ratio dR/R represents the measuring effect $M_1$ of interest which in the case of the force sensor 20 of FIGS. 3 and 4 gives the relationship between the force F to be measured and the resistance change of the strain gauges.

If a voltage $U_1$ is applied to the resistance half-bridge 140 between the input terminal 60 and the reference conductor 61, a voltage $U_2$ will be present at the resistor 141 which has the value $$U_2 = U_1 \cdot \frac{R - dR}{(R - dR) + (R + dR)} = U_1 \cdot \frac{R - dR}{2R} \tag{87}$$

and at the resistor 142 there will be a voltage $U_3$ of the value $$U_3 = U_1 \cdot \frac{R + dR}{(R - dR) + (R + dR)} = U_1 \cdot \frac{R + dR}{2R} \tag{88}$$

The signal processing circuit connected to the resistor half-bridge 140 employs the voltages $U_1$, $U_2$, and $U_3$ to recover an output signal which indicates the physical quantity causing the resistance change dR, i.e. in the example of the force sensor the force F to be measured. This signal processing circuit differs from the signal processing circuit of FIG. 8 only in the different structure of the function block 150 which in FIG. 11 is inserted between the resistor half-bridge 140 and the buffer 65. The remaining parts of the signal processing circuit of FIG. 11 are identical to those of FIG. 8. The mutually corresponding parts are therefore denoted by the same reference numerals as in FIG. 8 and will not be described again.

The function block 150 contains a switch group 151, a capacitor 152 with capacitance $C_m$ and a continuous connecting conductor 153 which connects the tap 143 of the resistor half-bridge 140 permanently to the noninverting input of the operational amplifier $A_1$ in the buffer 65. The switch group 151 contains three switches $S_{20}$, $S_{21}$ and $S_{22}$. The one electrode of the capacitor 152 is permanently connected to the inverting input of the operational amplifier $A_1$. The other electrode of the capacitor 152 is connected by the switch $S_{20}$ to the input terminal 60, by the switch $S_{21}$ to the reference conductor 61 and by the switch $S_{22}$ to the connecting conductor 153.

The time profiles of the control signals controlling the different switches of the signal processing circuit of FIG. 11 are illustrated in the diagrams of FIG. 12 where each control signal is again denoted by the same reference numeral as the switch controlled by it. As in the case of FIGS. 8 and 9, each switch is open when the signal controlling it has the low signal value and it is closed with the signal controlling it has the high signal value.

The diagrams of FIG. 12 also show the time profiles of the output voltage $U_{A1}$, $U_{A2}$ and $U_{A3}$ of the operational amplifiers $A_1$, $A_2$ and $A_3$, respectively.

The signal processing circuit of FIG. 11 operates like that of FIG. 8 by the principle of charge balancing which again takes place in the capacitor 72. The function block 150 again furnishes discrete charge packets which are buffered in the storage capacitor 66. Said charge packets are generated in that the capacitor 152 with the aid of the switches $S_{20}$, $S_{21}$, $S_{22}$ is alternately charged and reverse charged by the various voltages available at the resistance half-bridge 140. The charge packets buffered in the storage capacitor 66 are transferred by closing the switch $S_7$ to the integration capacitor 72. Via the switch $S_8$ the integration capacitor 72 also receives the correction and compensation charge packets which are generated in the correction circuit 73 and buffered in the storage capacitor 84. The capacitor 7 integrates all charge packets transferred via the switches $S_7$ and $S_8$. In the time mean charge balance obtains, i.e. the sum of all the integrated charge packets is equal to zero. This balance obtains whenever the output voltage $U_{A2}$ of the operational amplifier $A_2$ drops below the threshold voltage $U_S$ of the comparator 71.

The diagrams of FIG. 12 show the sequence of this mode of operation in the course of several cycles, one of which is a compensation cycle K whilst the remaining cycles are measuring cycles M. Each cycle consists of eight phases which are numbered 1 to 8.

The switches $S_1$ and $S_2$ are again controlled in antiphase manner by a square-wave signal so that they are alternately open and closed for the duration of two phases. The switches $S_9$ and $S_{10}$ are controlled in antiphase relationship by a square-wave signal of twice the frequency so that they are alternately open and closed for the duration of one phase.

When the switch $S_1$ is closed and the switch $S_2$ is open a "conditioning phase" is present in which the capacitor 152 can be charged via the switches $S_{20}$, $S_{21}$, $S_{22}$ by the voltages $U_1$, $U_2$, $U_3$ available at the resistance half-bridge 140 without the charge on the storage capacitor 66 thereby being influenced. When the switch $S_1$ is open and the switch $S_2$ is closed the buffer 65 is ready for transfer of a reverse charge packet from the capacitor 152 to the storage capacitor 66.

In the same manner the alternating positions of the switches $S_9$ and $S_{10}$ define either a conditioning phase for the capacitors 91 to 98 or the readiness of the correction memory 76 for taking over charge packets as has already been described for the signal processing circuit of FIG. 8.

As before, firstly the basic principle of the circuit and then the function of the correction circuit 73 will be described with the aid of the diagrams of FIG. 12.

1. Basic principle:

Phases 1 and 2:

Before the start of phase 1 of each cycle the charge applied in the previous cycle is still present on the storage capacitor 66. For the duration of the phases 1 and 2 the switch $S_1$ is closed and the switch $S_2$ open so that the capacitor 66 is separated from the output of the operational amplifier $A_1$. The switch $S_7$ is closed for the duration of the phase 1 so that with the start of the phase 1 a charge transfer takes place from the storage capacitor 66 to the integration capacitor 77. Since at the noninverting input of the operational amplifier $A_1$ there is the voltage $U_3$, the storage capacitor 66 is discharged down to the residual charge $$Q_{66R} = (U_{02} - U_{01} - U_3) \cdot C \tag{89}$$

the reverse charge amount flowing onto the integration capacitor 72.

At the same time, the circuit is in the conditioning phase for the capacitor 152. The switch $S_{22}$, which is always operated synchronously with the switch $S_1$, is closed during the phases 1 and 2. The capacitor 152 is therefore charged by the voltage $U_{01}$ to the charge $$Q_{Cm(1,2)} = U_{01} \cdot C_m \tag{90}$$

Phases 3 and 4:

In phases 3 and 4 the switch $S_1$ is open and the switch $S_2$ closed so that the buffer 65 is ready to take on charge from the storage capacitor 66. At the same time the switch $S_{20}$ is closed so that the capacitor 152 is connected to the input terminal 60. Thus, at the capacitor 152 there is the difference of the voltages $U_{01}$ and $U_2$ by which it is reverse charged to the charge $$Q_{Cm(3,4)} = (U_{01} - U_2) \cdot C_m \quad (91)$$

The reverse charge quantity $$dQ_{Cm(3,4)} = Q_{Cm(3,4)} - Q_{Cm(1,2)} = -U_2 \cdot C_m \quad (92)$$

is transferred to the storage capacitor 66 which thus has the following charge:

$$Q_{66(3,4)} = Q_{66R} + dQ_{Cm(3,4)} = Q_{66R} - U_2 \cdot C_m \quad (93)$$

Phases 5 and 6:

In phases 5 and 6 the switch $S_1$ is again closed and the switch $S_2$ open so that the circuit is in the conditioning phase for the capacitor 152. Since at the same time the switch $S_{22}$ is closed, the capacitor 152 again receives the charge $$Q_{Cm(5,6)} = U_{01} \cdot C_m \quad (94)$$

Phases 7 and 8:

In phases 7 and 8 the switch $S_1$ is open and the switch $S_2$ closed so that the buffer 65 is ready to take on charge. At the same time the switch $S_{21}$ is closed so that the capacitor 152 is connected to the reference conductor 61. There is therefore present at the capacitor 152 the sum of the voltages $U_{01}$ and $U_3$ by which it is reverse charge to the charge $$Q_{Cm(7,8)} = (U_{01} + U_3) \cdot C_m \quad (95)$$

The reverse charge amount $$dQ_{Cm(7,8)} = Q_{Cm(7,8)} - Q_{Cm(5,6)} = U_3 \cdot C_m \quad (96)$$

is transferred to the storage capacitor 66 which thus has the following total charge:

$$Q_{66(7,8)} = Q_{66R} + dQ_{Cm(3,4)} + dQ_{Cm(7,8)}$$
$$= Q_{66R} + (U_3 - U_2) \cdot C_m \quad (97)$$

In phase 1 of the following cycle the capacitor 66 is again discharged to the residual charge $Q_{66R}$ in accordance with equation (89). The same residual charge $Q_{66R}$ is present at the start of each cycle so that in phase 1 of each cycle the measuring charge packet $$dQ_M = Q_{66R} - Q_{66(7,8)} = -(U_3 - U_2) \cdot C_m \quad (98)$$

proportional to the actual measuring effect is transferred to the storage capacitor 72.

If in accordance with equations (87) and (88)

$$U_2 = U_1 \cdot (R - dR)/2R \quad (99)$$

$$U_3 = U_1 \cdot (R + dR)/2R \quad (100)$$

are inserted into equation (98), the result is $$dQ_M = -dR/R \cdot U_1 \cdot C_m \quad (101)$$

For $dR > 0$, $dQ_M$ is $< 0$. The charge on the integration capacitor 72 thus decreases on each transfer of a measuring charge packet $dQ_M$ and correspondingly the output voltage $U_{A2}$ the operational amplifier $A_2$ becomes smaller. When the voltage $U_{A2}$ drops below the predetermined threshold voltage $U_S$ of the comparator 71 the output voltage $U_{A3}$ thereof changes to its maximum value, the execution of a compensation cycle thereby being initiated in the control circuit 67. In the compensation cycle the correction circuit 73 is controlled in such a manner that on the next closing of the switch $S_8$ it transfers to the integration capacitor 72 a compensation charge packet $$dQ_K = (U_2 + U_3) \cdot C_m = U_1 \cdot C_m \quad (102)$$

with a sign such that the voltage $U_{A2}$ is again raised above the threshold voltage $U_S$.

2. Function of the correction circuit:

The correction circuit 73 of FIG. 11 is identical to that of FIG. 8 and has fundamentally the same mode of operation apart from the different time profile of the switch control signals.

In FIG. 12, for each switch two different time profiles of the associated control signals are again represented, one of which being used when a positive charge packet is to be generated whilst the other profile is used when a negative charge packet is to be generated. As in the case of FIGS. 8 and 6 the switches $S_{11}$, $S_{13}$, $S_{15}$, $S_{17}$ serve in conjunction with the associated capacitors 91, 93, 95, 97 to generate correction charge packets in the measuring cycles M and the switches $S_{12}$, $S_{14}$, $S_{16}$, $S_{18}$ serve to generate in the compensation cycles K charge packets which contain compensation charge packets and correction charge packets. Within each cycle the voltage $U_{A1}$ available at the circuit point 78 and thus also the temperature-dependent voltage $U_T$ available at the tap 83 assumes different values which by suitable choice of the switching phases can be used for charging or reverse charging of the capacitors. The square-wave signal controlling the switches $S_9$ and $S_{10}$ governs whether a reconditioning or a reverse charge takes place in a switching phase. The switching phases of the switch control signals $S_{11}$, $S_{12}$, $S_{13}$, $S_{14}$ are chosen in such a manner that both voltage changes according to $$dU_{A1} = \pm dR/R \cdot U_1 \cdot C_m/C \quad (103)$$

and voltage changes according to $$dU_{A1} = \pm U_1 \cdot C_m/C \quad (104)$$

can be used for charging or reverse charging the capacitors 91 to 94. In corresponding manner the switching phases of the switch control signals $S_{15}$, $S_{16}$, $S_{17}$, $S_{18}$ are so chosen that both voltage changes according to $$dU_T = \pm V_T dR/R \cdot U_1 \cdot C_m/C \quad (105)$$

and voltage changes according to $$dU_T = \pm V_T U_1 \cdot C_m/C \quad (106)$$

can be used for charging or reverse charging the capacitors 95 to 98. The square-wave signal controlling the switches $S_9$ and $S_{10}$ governs whether a switching phase effects a conditioning or a reverse charging.

Whereas the switch $S_7$ is closed in each cycle, the switch $S_8$ is closed only in every other cycle. This means that in each case the charge packets generated in the course of two successive cycles in the correction circuit 73 are collected on the storage capacitor 84 and then in the phase 7 of the second cycle transferred as correction charge packet or as combined compensation and correction charge packet to the integration capacitor 72. For clearer distinction, in FIG. 12 the two consecutive cycles in the course of which a correction charge packet is formed are designated measuring cycles $M_1$ and $M_2$ and the two consecutive cycles in the course of which a compensation and correction charge packet is formed are designated by $K_1$ and $K_2$.

If for example the identical control signals $S_{11+}$ and $S_{15+}$ of FIG. 12 are considered, then a conditioning takes place in phase 7 of each measuring cycle $M_1$ and the subsequent reverse charging in phase 2 of the following measuring cycle $M_2$. In corresponding manner, by the control signals $S_{12+}$ and $S_{16+}$ a conditioning takes place in phase 7 of each compensation cycle $K_1$ and a reverse charging in phase 2 of the following compensation cycle $K_2$.

The control signals $S_{11-}$ and $S_{12-}$ effect the conditioning in phase 5 of each measuring $M_1$ and the reverse charging in phase 8 of the same measuring cycle $M_1$. In corresponding manner, the control signals $S_{12-}$ and $S_{16-}$ effect the conditioning in phase 5 and the reverse charging in phase 8 of each compensation cycle $K_1$.

By the control signals $S_{13+}$ and $S_{17+}$ a first conditioning is effected in phase 1 and the following first reverse charging in phase 4 of each measuring cycle $M_1$. A second conditioning then takes place in phase 7 of each measuring cycle $M_1$ and the following second reverse charging in phase 4 of the following measuring cycle $M_2$. Thus, in each measuring cycle pair $M_1$, $M_2$ in succession two charge packets are generated which contribute to the formation of the same correction charge packet which is transferred in phase 7 of the measuring cycle $M_2$ to the integration capacitor 72.

In corresponding manner, by the control signals $S_{14+}$ and $S_{18+}$ in the same phases of the compensation cycles $K_1$ and $K_2$ two charge packets are generated which contribute to the formation of the same compensation and correction charge packet which in phase 7 of the compensation cycle $K_2$ is transferred to the integration capacitor 72.

Finally, the control signals $S_{13-}$ and $S_{17-}$ effect a first conditioning in phase 3 and a first reverse charging in phase 8 of each measuring cycle $M_1$ as well as a second conditioning in phase 3 and a second reverse charging in phase 6 of each measuring cycle $M_2$, two charge packets thereby being generated which contribute to the formation of the correction charge packet which in phase 7 of the measuring cycle $M_2$ is transferred to the integration capacitor 72. In the same phases of the compensation cycles $K_1$ and $K_2$ by the control signals $S_{14-}$ and $S_{18-}$ two charge packets are generated which contribute to the formation of the compensation and correction charge packet which in phase 7 of the compensation cycle $K_2$ is transferred to the integration capacitor 72.

In this manner, with the aid of the eight switch-capacitor combinations by suitable choice of the switching phases of the control signals $S_{11}$ to $S_{18}$ charge packets with eight different magnitudes each weighted by the respective capacitance values $C_{91}$ to $C_{98}$ of the respective capacitors can be generated, each of said charge packets optionally with positive or negative sign, and buffered in the storage capacitor 84.

In Table III at the end of the description all the charge packets are enumerated which can be implemented with the arrangement of FIG. 11. In each charge packet the term $\pm C_i/C$ (with $i=91 \ldots 98$) represents a correction factor $B_{11}$ to $C_{22}$ as likewise indicated in Table III.

3. Transfer function

The transfer function of the circuit is calculated from the equation for the charge balance: The sum of all of the charge packets integrated in the integration capacitor 72 is equal to zero in a predetermined time interval. If a time interval of 2n cycles is considered in which k compensation cycles and thus (n-k) correction cycles are contained then in this time interval the charge packets summarized in Table IV are transferred to the integration capacitor 72. The signs of the coefficients are set by suitable choice of the control signals $S_{11+}$ to $S_{18+}$ and $S_{11-}$ to $S_{18-}$.

If all the charge packets in Table IV are summated and made equal to zero, then the following transfer function is obtained $$\frac{k}{n} = \frac{-B_{11} - B_{12} \cdot V_T + (2 - B_{21} - B_{22} \cdot V_T) \cdot dR/R}{C_{11} - B_{11} + (C_{12} - B_{12}) \cdot V_T + (C_{21} - B_{21} + (C_{22} - B_{22}) \cdot V_T) \cdot dR/R} \quad (107)$$

By simple combination of the coefficients, exactly the desired transfer function according to equation (4) is obtained:

$$\frac{k}{n} = \frac{b_{11} + b_{12} \cdot V_T + (b_{21} + b_{22} \cdot V_T) \cdot dR/R}{c_{11} + c_{12} \cdot V_T + (c_{21} + c_{22} \cdot V_T) \cdot dR/R} \quad (108)$$

If equation (108) is compared with equation (4) it is seen that in this case the measuring effect $M_1$ is the force-dependent and temperature-dependent resistance ratio dR/R whilst the measuring effect $M_2$ is again the temperature-dependent voltage division ratio $V_T$. With the transfer function according to equation (108) the most important characteristic data of the sensor 140 can be corrected with the following adjustable correction coefficients:

| Zero point | $b_{11}$ |
| TC zero point | $b_{12}$ |
| Sensitivity | $b_{21}$, $c_{11}$ |
| TC sensitivity | $b_{22}$, $c_{12}$ |
| Nonlinearity | $c_{21}$ |
| TC nonlinearity | $c_{22}$ |

Equation (108) shows that the capacitance $C_M$ of the capacitor 152 and the capacitances of the capacitors 72 and 84, the offset voltages of the operational amplifiers, the operating voltages of the circuit and the frequency with which the control circuit 67 is clocked do not enter the transfer function. The value of the voltage $U_1$ is limited only by the working range of the circuit.

The correction coefficients can be set in the same manner as in the circuit of FIG. 8, i.e. for example with the aid of subcapacitors which are connected in parallel by digital programming, or alternatively by adjustable resistors when instead of the correction circuit 73 of FIG. 11 the correction circuit 110 of FIG. 10 is used. All other modifications which have been described in conjunction with the circuit of FIG. 8 are also applicable unqualified to the circuit of FIG. 11. This also applies to the correction of further disturbance effects.

FIG. 13 shows the modification of the signal processing circuit of FIG. 11 for the signal processing and error correction of the sensor signal furnished by a resistor full bridge. The resistor full bridge 160 consists of two resistor half-bridges of the type explained in conjunction with FIG. 11. It contains four resistors 161, 162, 163, 164 which are arranged in the four bridge branches and the resistance values of which differ from the same basic resistance R by equal amounts dR but with different signs. The resistors lying in diametrically opposite bridge branches have the same resistance values. It is assumed in FIG. 13 that the resistors 161 and 164 have the resistance value R+dR and the resistors 162 and 163 the resistance value R−dR.

The bridge corner 165 between the resistors 161 and 162 is connected to the input terminal 60 and the bridge corner 166 between the resistors 163 and 164 is connected to the reference conductor 61 which in this case is connected to ground. Thus, the supply voltage $U_1$ is applied to the bridge diagonal between the bridge corners 165 and 166. At the bridge corner 167 between the resistors 161 and 163 the voltage $U_2$ is present with respect to the reference potential and at the bridge corner 168 between the resistors 162 and 164 the voltage $U_3$ with respect to the reference potential.

The associated signal processing circuit differs from that of FIG. 11 only in a somewhat different configuration of the function block 170. Of the other components of the signal processing circuit, for simplification in FIG. 13 only the buffer 65 and the integrator 70 are shown, identical parts again being denoted with the same reference numerals as in FIG. 11. The noninverting input of the operational amplifier $A_1$ is connected in this case to the reference conductor 61 connected to ground.

The function block 170 contains a switch group 171 with four switches $S_{23}$, $S_{24}$, $S_{25}$, $S_{26}$ and a capacitor 172 of capacitance $C_m$, the one electrode of which is connected to the inverting input of the operational amplifier $A_1$. The other electrode of the capacitor 172 is connected by the switch $S_{23}$ to the bridge corder 165, by the switch $S_{24}$ to the bridge corner 168, by the switch $S_{25}$ to the bridge corner 167 and by the switch $S_{26}$ to the bridge corner 166. Thus, by the switch $S_{23}$ the voltage $U_1$ is applied to the capacitor 172, by the switch $S_{24}$ by voltage $U_3$, by the switch $S_{25}$ the voltage $U_2$ and by the switch $S_{26}$ the reference voltage.

The following holds true for the voltage $U_2$ and $U_3$:

$$U_2 = U_1 \cdot (R - dR)/R \quad (109)$$

$$U_3 = U_1 \cdot (R + dR)/R \quad (110)$$

These are the same values as in the resistor half-bridge of FIG. 11 according to equations (99) and (100).

One difference in the signal processing circuit of FIG. 13 compared with that of FIGS. 8 and 11 is that the function block 170 in conjunction with the buffer 65 generates not only measuring charge packets $dQ_M$ but also the compensation charge packets $dQ_K$ which are both transmitted via the switch $S_7$ to the integrator 70 so that (not shown in FIG. 13) the correction circuit 73 (FIG. 11) only generates the correction charge packets which are transferred via the switch $S_8$ to the integrator 70. The switches of the switch group 171 are thus controlled by the control circuit 67 (FIG. 11) in consecutive measuring cycles M in such a manner that in each case a measuring charge packets $dQ_M$ is generated and when the control circuit 67 is activated by the output signal of the comparator 71 for execution of a compensation cycle K it controls the switches of the switch group 171 in such a manner that a compensation charge packet $dQ_K$ is generated.

It will now be described how with the circuit of FIG. 13 a measuring charge packet $dQ_M$ is obtained in a measuring cycle M and a compensation charge packet $dQ_K$ in a compensation cycle K.

Obtaining a measuring charge packet:

Before the start of a measuring cycle M the circuit is in the initial state in which the storage capacitor 66 still carries the charge applied in the preceding cycle. In a first phase of the measuring cycle the switches $S_1$ and $S_7$ are closed, the storage capacitor 66 thereby being discharged to the residual charge $$Q_{66R} = (U_{02} - U_{01}) \cdot C \quad (111)$$

At the same time the switch $S_{24}$ is closed, the capacitor 172 thereby being charged in the conditioning phase to the charge $$Q_{Cm(1)} = (U_{01} - U_3) \cdot C_m \quad (112)$$

In a further phase of the measuring cycle M the switch 51 is opened and the switch 52 closed so that the buffer 65 is ready to transfer charge to the storage capacitor 66. At the same time the switch $S_{25}$ is closed so that the capacitor 172 is applied to the voltage $U_2$ and thereby reverse charged to the charge $$Q_{Cm(2)} = (U_{01} - U_2) \cdot C_m \quad (113)$$

The reverse charge amount $$dQ_{Cm} = Q_{Cm(2)} - Q_{Cm(1)} = (U_3 - U_2) \cdot C_m \quad (114)$$

is transferred to the storage capacitor 66. The total charge of the storage capacitor 66 is now $$Q_{66(2)} = Q_{66R} + dQ_{Cm} = Q_{66R} + (U_3 - U_2) \cdot C_m \quad (115)$$

If now the storage capacitor 66 is discharged in the first phase of the following measuring cycle by opening the switch $S_2$ and closing the switch $S_7$ down to the residual charge $Q_{66R}$ again, on reverse charging the measuring charge packet $$dQ_M = Q_{66R} - Q_{66(2)} = -(U_3 - U_2) \cdot C_m \quad (116)$$

is transferred to the integration capacitor 72. This corresponds exactly to the measuring charge packet $dQ_M$ in the resistor half-bridge of FIG. 11 according to equation (98).

Obtaining the compensation charge packet:

At the start of a compensation cycle K the circuit is in the initial state. In a first phase of the compensation cycle the switches $S_1$ and $S_7$ are closed, the storage capacitor 66 thereby being discharged to the residual charge $$Q_{66R} = (U_{02} - U_{01}) \cdot C \quad (117)$$

At the same time the switch $S_{26}$ is closed, the capacitor 172 thereby being charged to the charge $$Q_{Cm(1)} = U_{01} \cdot C_m \quad (118)$$

In a further phase of the compensation cycle K the switch $S_1$ is opened and the switch $S_2$ closed so that the buffer 65 is ready for the transfer of charge to the storage capacitor 66. At the same time the switch $S_{23}$ is closed so that the capacitor 172 is applied to the voltage $U_1$ and thereby reverse charged to the charge $$Q_{Cm(2)} = (U_{01} - U_1) \cdot C_m \tag{119}$$

The reverse charge amount $$dQ_{Cm} = Q_{Cm(2)} - Q_{Cm(1)} = -U_1 \cdot C_m \tag{120}$$

is transferred to the storage capacitor 66. The total charge of the storage capacitor 66 is now $$Q_{66(2)} = Q_{66R} + dQ_{Cm} = Q_{66R} - U_1 \cdot C_m \tag{121}$$

If now the storage capacitor 66 in the first phase of the following cycle is discharged by opening the switch $S_2$ and closing the switch $S_7$ to the residual charge $Q_{66R}$, in the reverse charging the compensation charge packet $$dQ_K = Q_{66R} - Q_{66(2)} = U_1 \cdot C_m \tag{122}$$

is transferred to the integration capacitor 72. This corresponds exactly to the compensation charge packet $dQ_K$ in the resistor half-bridge of FIG. 11 according to equation (102).

Thus, in the resistor full bridge the same measuring and compensation charge packets $dQ_M$ and $dQ_K$ as in the resistor half-bridge are available. The correction method explained in conjunction with FIGS. 11 and 12 is thus also applicable to the resistor full bridge. By the correction circuit, which can have the same structure as the correction circuit 73 of FIG. 11 or the correction circuit 110 of FIG. 10, the correction charge packets are generated in the manner explained above by suitable choice of the switching phases of the switch control signals and transferred via the switch $S_8$ to the integration capacitor 72 of the integrator 70.

While the embodiments explained so far, the signal processing circuit provides a digital output signal, and a supply signal V independent of this output signal is fed to the sensor, it will now be shown with the aid of the further embodiments explained with reference to FIGS. 14 to 21 that the arrangement of the invention and its disturbance-variable correction can also be used if the signal processing circuit provides an analog output signal and if this signal is fed back to the sensor.

FIG. 14 shows an embodiment which corresponds to that of FIG. 8 except for this difference and the modifications conditioned thereby. FIG. 14 thus does not include the comparator 71 and the two counters 100, 101. A switch $S_{27}$ is placed between the input terminal 60 and the end of the voltage divider 54. The output of the integrator 70, i.e., the output voltage $U_{A2}$, is applied through a switch $S_{28}$ to the same end of the voltage divider 54.

The operation of the arrangement of FIG. 14 will now be explained with the aid of FIGS. 15 to 18, first without that of the correction circuit 73. FIG. 15 is a timing diagram for the case in which the measuring effect is $(C_x - C_{ref})/C_{ref}$, and $C_x > C_{ref}$.

The switches S . . . are actuated by control signals which are furnished by a control circuit 67 which is synchronized by a clock signal furnished by a clock generator 68.

The control signals are again denoted by the same reference numerals S . . . as the switches controlled by the them.

Each switch is open when the signal controlling it has the low signal value and is closed when the signal controlling it has the high signal value.

The switches are again represented symbolically as mechanical switch contacts but in reality of course they are highspeed electronic switches, for example field-effect transistors.

Apart from the time profile of the control signals the diagrams of FIG. 15 to 18 also show the time profile of the voltage $U_C$ at the voltage capacitor 66 and the output voltage $U_{A2}$ in the course of several consecutive cycles Z. Each cycle Z is divided into four phases which are designated 1 to 4.

The switches $S_1$ and $S_2$ are controlled by a periodic square-wave signal in antiphase relationship so that the switch $S_1$ is open when the switch $S_2$ is closed and vice-versa. The switches $S_1$ and $S_2$ assume their alternating states in each case for the duration of one of the phases 1 to 4. When the switch $S_1$ is closed and the switch $S_2$ is open, which is the case in each of the phases 1 and 3 of each cycle Z, the capacitors 51 and 52 lying in the input circuit of the operational amplifier $A_1$ can be connected by the switches $S_3$ to $S_6$ to the voltages $U_2$ or $U_3$ and correspondingly charges without thereby influencing the charge in the storage capacitor 66. This state is referred to as "conditioning phase" for the conditioning of the capacitors 51 and 52.

In the same way, the switches $S_{27}$, $S_{28}$ are controlled by a periodic square-wave signal in antiphase manner so that the switch $S_{27}$ is open when the switch $S_{28}$ is closed and vice-versa. The switches $S_{27}$ and $S_{28}$ assume their alternating states in each case for the duration of two phases. During the phases 1 and 2 of each cycle Z the switch $S_{27}$ is closed and the switch $S_{28}$ open. The phases 1 and 2 thus form a subcycle $Z_1$ in which the voltage $U_1$ is applied to the voltage divider 54. In contrast, in the phase 3 and 4 the switch $S_{28}$ is closed and the switch $S_{27}$ open. The phases 3 and 4 thus from a subcycle $Z_A$ ub sitch the voltage $U_{A2}$ is applied to the voltage divider 54.

In each subcycle $Z_1$ or $Z_A$ the voltages $U_2$ and $U_3$ available at the voltage divider 54 are defined on the one hand by the voltage present at the terminal 60 and on the other hand by the voltage divider ratios. The following holds true for the voltage divider ratios:

$$V_2 = (R_{57} + R_{58})/(R_{56} + R_{57} + R_{58}) \tag{123}$$

$$V_3 = R_{58}/(R_{56} + R_{57} + R_{58}) \tag{124}$$

Thus, in each subcycle $Z_1$, i.e. during the phases 1 and 2, the following voltages are available:

$$U_{2(1,2)} = V_2 \cdot U_1 \tag{125}$$

$$U_{3(1,2)} = V_3 \cdot U_1 \tag{126}$$

and in each subcycle $Z_A$, i.e. during the phases 3 and 4, the following voltages are available:

$$U_{2(3,4)} = V_2 \cdot U_A \tag{127}$$

$$U_{3(3,4)} = V_3 \cdot U_A \tag{128}$$

The switches $S_4$ and $S_6$ are controlled in antiphase manner to the switch $S_5$ by the same square-wave signal as the switches $S_1$ and $S_2$ so that the switches $S_4$ and $S_6$ are opened and closed synchronously with the switch $S_1$ and the switch $S_5$ synchronously with the switch $S_2$.

The switch $S_3$ is closed only during the phase 2 of each cycle Z and the switch $S_7$ is closed only during the phase 1 of each cycle Z. This results in the following time sequence of the operation of the signal processing circuit of FIG. 14:

Phase 1:

At the start of the phase 1 of each cycle Z the charge applied in the preceding cycle is still present on the storage capacitor 66. For the duration of the phase 1 the switch $S_1$ is closed and the switch $S_2$ open so that the storage capacitor 66 is separated from the output of the operational amplifier $A_1$. The switch $S_7$ is closed for the duration of the phase 1 so that a charge transfer takes place from the storage capacitor 66 to the integration capacitor 72. The storage capacitor 66 is thereby discharged to the residual charge $$Q_{C(R)} = (U_{02} - U_{01}) \cdot C \quad (129)$$

the reverse charge amount flowing to the integration capacitor 72.

Furthermore, for the duration of phase 1 the circuit is in the conditioning phase for the capacitors 51 and 52 because the switch $S_1$ is closed and the switch $S_2$ open. Since the switch $S_3$ is open and the switch $S_4$ is closed, the measuring capacitor 51 is connected to the tap 62 of the voltage divider so that it is charged to the charge $$Q_{Cx(1)} = (U_{01} + U_B - U_2) \cdot C_x = (U_{01} + U_B - V_2 \cdot U_1) \cdot C_x \quad (130)$$

without the charge of the storage capacitor 66 being influenced by this charging operation.

On the other hand, the reference capacitor 52 is connected to the tap 63 of the voltage divider so that the switch $S_5$ is open and the switch $S_6$ is closed. Therefore, the reference capacitor 52 is charged to the charge $$Q_{Cref(1)} = (U_{01} + U_B - U_3) \cdot C_{ref} = (U_{01} + U_B - V_3 \cdot U_1) \cdot C_{ref} \quad (131)$$

without the charge of the storage capacitor 66 being influenced by this charging.

Phase 2:

In phase 2 of each cycle Z the switch $S_1$ is open and the switch $S_2$ closed so that the buffer 65 is ready to receive charge on the storage capacitor 66. At the same time the switches $S_4$ and $S_6$ are open and the switches $S_3$ and $S_5$ closed so that now the measuring capacitor 51 is connected to the tap 63 and the reference capacitor 52 to the tap 62. Accordingly, the capacitors 51 and 52 are reverse charged to the following charges:

$$Q_{Cx(2)} = (U_{01} + U_B - U_3) \cdot C_x = (U_{01} + U_B - V_3 \cdot U_1) \cdot C_x \quad (132)$$

$$Q_{Cref(2)} = (U_{01} + U_B - U_2) \cdot C_{ref} = (U_{01} + U_B - V_2 \cdot U_1) \cdot C_{ref} \quad (133)$$

The reverse charge amounts are:

$$dQ_{Cx} = Q_{Cx(2)} - Q_{Cx(1)} = (U_2 - U_3) \cdot C_x = (V_2 - V_3) \cdot U_1 \cdot C_x \quad (134)$$

$$dQ_{Cref} = Q_{Cref(2)} - Q_{Cref(1)} = -(U_2 - U_3) \cdot C_x = -(V_2 - V_3) \cdot U_1 \cdot C_{ref} \quad (135)$$

The total reverse charge is the sum of equations (134), (135)

$$dQ_M = (C_x - C_{ref}) \cdot (U_2 - U_3) = (C_x - C_{ref}) \cdot (V_2 - V_3) \cdot U_1 \quad (136)$$

flows to the storage capacitor 66. This reverse charge amount $dQ_M$ is referred to as "measuring charge packet". With $C_x > C_{ref}$ and $U_2 > U_3$ it causes a positive change of the voltage $U_{Cs}$, as apparent from the associated diagram of FIG. 15. Together with the initial charge the storage capacitor 66 now has the resultant charge $$Q_C = Q_{C(R)} + dQ_M = Q_{C(R)} + (C_x - C_{ref}) \cdot (V_2 - V_3) \cdot U_1 \quad (137)$$

This completes the subcycle $Z_1$.

Phase 3:

In phase 3 the switches $S_1$ to $S_6$ are again in the same positions as in phase 1 but the switch $S_7$ remains open so that no reverse charging takes place from the storage capacitor 66 to the integration capacitor 72 and thus the storage capacitor 66 retains its charge. Furthermore, the switch $S_{27}$ is now open and the switch $S_{28}$ closed so that the voltage $U_{A2}$ is present at the voltage divider 54. Accordingly the capacitors 51 and 52 are charged to the following charges:

$$Q_{Cx(3)} = (U_{01} + U_B - U_2) \cdot C_x = (U_{01} + U_B - V_2 \cdot U_{A2}) \cdot C_x \quad (138)$$

$$Q_{Cref(3)} = (U_{01} + U_B - U_3) \cdot C_{ref} = (U_{01} + U_B - V_3 \cdot U_{A2} \cdot C_{ref} \quad (139)$$

Phase 4:

Phase 4 differs from phase 2 in that the switch $S_3$ remains open so that the measuring capacitor 51 is connected neither to the tap 62 nor to the tap 63. Accordingly, the reference capacitor 52 is now reverse charged to the charge $$Q_{Cref(4)} = (U_{01} + U_B - U_2) \cdot C_{ref} = (U_{01} + U_B - V_2 \cdot U_{A2}) \cdot C_{ref} \quad (140)$$

The reverse charge amount $$dQ_K = Q_{Cref(4)} - Q_{Cref(3)} = -(U_2 - U_3) \cdot C_x = -(V_2 - V_3) \cdot U_A \cdot C_{ref} \quad (141)$$

forms at the same time the total charge amount which flows in the subcycle $Z_A$ to the storage capacitor 66. It is referred to as compensation charge packet $dQ_K$ and causes a negative change of the voltage $U_C$, as will be apparent from the associated diagram of FIG. 15.

This completes the subcycle $Z_A$.

FIG. 16 is a timing diagram modified from that of FIG. 15 for the case in which the same measuring effect, but with opposite sign, namely $-(C_x - C_{ref})/C_{ref}$, is to be measured, because now $C_x < C_{ref}$. The explanation of FIG. 15 therefore applies with the following changes:

The switch $S_3$ is closed during phase 1. It is thus operated simultaneously with and in the same sense as the switch $S_7$. The switches $S_4$, $S_6$ are closed during phases 2 and 3 while—inversely thereto—the switch $S_5$ is open. The following sequences are thus obtained:

Phase 1:

At the start of the phase 1 of each cycle Z the charge applied in the preceding cycle is still present on the storage capacitor 66. For the duration of the phase 1 the switch $S_1$ is closed and the switch $S_2$ open so that the storage capacitor 66 is separated from the output of the operational amplifier $A_1$. The switch $S_7$ is closed for the duration of the phase 1 so that a charge transfer takes place from the storage capacitor 66 to the integration capacitor 72. The storage capacitor 66 is thereby discharged to the residual charge $$Q_{C(R)}=(U_{02}-U_{01})\cdot C \tag{142}$$

the reverse charge amount flowing to the integration capacitor 72. Equations (146) and (129) are identical.

Furthermore, for the duration of phase 1 the circuit is in the conditioning phase for the capacitors 51 and 52 because the switch $S_1$ is closed and the switch $S_2$ open. Since the switch $S_4$ is open and the switch $S_3$ is closed, the measuring capacitor 51 is connected to the tap 63 of the voltage divider so that it is charged to the charge $$Q_{Cx(1)}=(U_{01}+U_B-U_3)\cdot C_x=(U_{01}+U_B-V_3\cdot U_1)\cdot C_x \tag{143}$$

without the charge of the storage capacitor 66 being influenced by this charging operation.

On the other hand, the reference capacitor 52 is connected to the tap 62 of the voltage divider so that the switch $S_6$ is open and the switch $S_5$ is closed. Therefore, the reference capacitor 52 is charged to the charge $$Q_{ref(1)}=(U_{01}+U_B-U_2)\cdot C_{ref}=(U_{01}+U_B-V_2\cdot U_1)\cdot C_{ref} \tag{144}$$

without the charge of the storage capacitor 66 being influenced by this charging.

Phase 2:

In phase 2 of each cycle Z the switch $S_1$ is open and the switch $S_2$ closed so that the buffer 65 is ready to receive charge on the storage capacitor 66. At the same time the switches $S_3$ and $S_5$ are open and the switches $S_4$ and $S_6$ closed so that now the measuring capacitor 51 is connected to the tap 62 and the reference capacitor 51 to the tap 63. Accordingly, the capacitors 51 and 52 are reverse charged to the following charges:

$$Q_{Cx(2)}=(U_{01}+U_B-U_2)\cdot C_x=(U_{01}+U_B-V_2\cdot U_1)\cdot C_x \tag{145}$$

$$Q_{Cref(2)}=(U_{01}+U_B-U_3)\cdot C_{ref}=(U_{01}+U_B-V_3\cdot U_1)\cdot C_{ref} \tag{146}$$

The reverse charge amounts are:

$$dQ_{Cx}=Q_{Cx(2)}-Q_{Cx(1)}=(U_3-U_2)\cdot C_x=(V_3-V_2)\cdot U_1 C_x \tag{147}$$

$$dQ_{Cref}=Q_{Cref(2)}-Q_{Cref(1)}=-(U_3-U_2)\cdot C_{ref}-(V_3-V_2)\cdot U_1\cdot C_{ref} \tag{148}$$

The total reverse charge is the sum of equation (147), (148)

$$dQ_M=(C_x-C_{ref})\cdot(U_2-U_3)=-(C_x-C_{ref})\cdot(V_2-V_3)\cdot U_1 \tag{149}$$

flows to the storage capacitor 66. This reverse charge amount $dQ_M$ is referred to as "measuring charge packet". With $C_x<C_{ref}$ and $U_2>U_3$ it causes a positive change of the voltage $U_C$, as apparent from the associated diagram of FIG. 16. Together with the initial charge the storage capacitor 66 now has the resultant charge $$Q_C=Q_{C(R)}+dQ_M=Q_{C(R)}-(C_x-C_{ref})\cdot(V_2-V_3)\cdot U_1 \tag{150}$$

This completes the subcycle $Z_1$.

Phase 3:

In phase 3 switches $S_1$, $S_6$ are in the same positions as in phase 1 and switches $S_4$ to $S_6$ as in phase 2. Switches $S_3$, $S_7$ remain open so that no reverse charging takes place from the storage capacitor 66 to the integration capacitor 72 and thus the storage capacitor 66 retains its charge. Furthermore, the switch $S_{27}$ is now open and the switch $S_{28}$ closed so that the voltage $U_{A2}$ is present at the voltage divider 54. Accordingly the capacitors 51 and 52 are charged to the following charges:

$$Q_{Cx(3)}=(U_{01}+U_B-U_2)\cdot C_x=(U_{01}+U_B-V_2\cdot U_{A2}\cdot C_x \tag{151}$$

$$Q_{Cref(3)}=(U_{01}+U_B-U_3)\cdot C_{ref}=(U_{01}+U_B-V_3\cdot U_{A2}\cdot C_{ref} \tag{152}$$

Phase 4:

Phase 4 differs from phase 2 in that the switch $S_3$ remains open and switch $S_5$ is closed so that the measuring capacitor 51 is connected neither to the tap 62 nor to the tap 63. Accordingly, the reference capacitor 52 is now reverse charged to the charge $$Q_{ref(4)}=(U_{01}+U_B-U_2)\cdot C_{ref}=(U_{01}+U_B-V_2\cdot U_{A2}\cdot C_{ref} \tag{153}$$

The reverse charge amount $$dQ_K=Q_{Cref(4)}-Q_{Cref(3)}=-(U_2-U_3)\cdot C_x=-(V_2-V_3)\cdot U_{A2}\cdot C_{ref} \tag{154}$$

forms at the same time the total charge amount which flows in the subcycle $Z_A$ to the storage capacitor 66. It is referred to as compensation charge packet $dQ_K$ and causes a negative change of the voltage $U_C$, as will be apparent from the associated diagram of FIG. 16.

This completes the subcycle $Z_A$.

FIG. 17 shows a timing diagram modified from that of FIG. 15 for the case in which another one of the above-mentioned measuring effects, namely $(C_x-C_{ref})/C_x$ is to be measured, and in which $C_x>C_{ref}$. The explanation of FIG. 15 thus applies with the following changes:

Switch $S_4$ is operated 180° out of phase with switch $S_3$. The latter is closed in phases 2 and 3, and open in phases 1 and 4. Consequently, switch $S_4$ is open in phases 2 and 3 but closed in phases 1 and 4. The quantities of charge and the charge reversals in the individual phases follow from equations (129) to (141), set up in connection with the explanation of FIG. 15, in a manner comparable to the derivation of equations (142) to (154) for FIG. 16; their derivation can therefore be dispensed with.

FIG. 18 shows a timing diagram modified from that of FIG. 15 for the case in which the measuring effect is $C_x/C_{ref}$, and $C_x>C_{ref}$ or $C_x\leq C_{ref}$. Accordingly, the explanation of FIG. 15 applies with the following changes:

Switch $S_4$—like in FIG. 17—is operated 180° out of phase with switch $S_3$, which is closed only in phase 2. Consequently, switch $S_4$ is open only in phase 2. Switch $S_6$ (and switch $S_5$ in 180° phase relationship) is closed (open) only in phase 3. The quantities of charge and the charge reversals again follow in a comparable manner, so that their derivation can be dispensed with.

With the aid of FIGS. 15 to 18, it was shown that the charge packets associated with the respective measuring effect and the charge reversals resulting therefrom can be produced by clocking the switches S . . . in a suitable manner. Therefore, if the user is to be able to choose from the measuring effects shown, the above-explained control signals must be held ready in the control circuit 67 so that they can be called up by means of suitable signals or instructions (options). The control circuit 67 can therefore be implemented, for example, with a suitably programmed microprocessor.

In FIGS. 15 to 18 each cycle Z may consist generally of n subcycles $Z_1$ and of k subcycles $Z_A$. In FIG. 15 the function of the sequence is represented for the case $n=k=1$. Together with the residual charge $Q_{C(R)}$ present at the start of the cycle, in the course of the cycle Z the total charge $$Q_{C(Z)} = Q_{C(R)} + n \cdot dQ_M + k \cdot dQ_K \quad (155)$$

has collected on the storage capacitor 66.

In phase 1 of the following cycle Z the storage capacitor 66 is again discharged by closing the switch $S_7$ to the residual charge $Q_{C(R)}$. The differential charge $$dQ = n \cdot dQ_M + k \cdot dQ_K \quad (156)$$

is transferred to the integration capacitor 72, the output voltage $U_{A2}$ thereby being regulated. The entire circuit therefore operates as control loop tending to bring the output voltage $U_{A2}$ to a value at which a charge balance exists in the storage capacitor 68. The time behaviour of the transient process is governed by the capacitance value C of the integration capacitor 72. In the steady state in which charge balance takes place in the storage capacitor 66 the following applies:

$$n \cdot dQ_M + k \cdot dQ_K = 0 \quad (157)$$

By inserting the values for $dQ_M$ and $dQ_K$ from the equations (136), (141), this gives the transfer function of the circuit:

$$\frac{U_{A2}}{U_1} = \frac{n}{k} \cdot \frac{C_x - C_{ref}}{C_{ref}} \quad (158)$$

It is assumed in FIGS. 15 to 18 that the steady state has arisen at the instant $t_E$ at the end of the third cycle Z shown. From this instant onwards, the voltage ratio $U_{A2}/U_1$ indicates the desired measuring effect and the output voltage $U_{A2}$ does not change any more as long as the capacitance $C_x$ of the measuring capacitor 51 retains its value. On a change of the capacitance $C_x$ the output voltage $U_{A2}$ changes to another value with the time constant defined by the capacitance C of the integration capacitor 72.

The resistance values of the resistors 56, 57, 58 of the voltage divider 54 do not enter the transfer function but the voltage divider ratios $V_2$ and $V_3$ define the magnitude of the charge packets and thus the dimensioning of the capacitors 66 and 72. Similarly, the capacitance values of the capacitors 66 and 72, the offset voltages of the operational amplifiers, the supply voltage of the circuit and the frequency with which the control circuit is clocked so not enter the final result.

The value of the voltage $U_1$ is limited only by the operating range of the circuit.

If a supply voltage $U_1$ the current supply voltage of the circuit is chosen, then in accordance with equation (158) output signal is obtained which is proportional to the supply voltage.

If a fixed reference voltage $U_{ref}$ is chosen as supply voltage $U_1$, then in accordance with the equation (158) an absolute output signal is obtained.

In the different control variants of the signal processing circuit of FIG. 14 which are illustrated in FIGS. 15 to 18, error correction takes place in the same manner as explained with the aid of FIGS. 8 and 9.

FIG. 19 shows an embodiment which differs from that of FIG. 11 only in that the signal processing circuit provides an analog output signal, and that this signal is fed back to the sensor.

The operation of the arrangement of FIG. 19, without that of the correction circuit 73, which follows from the explanation of FIG. 12, will now be explained with the aid of FIG. 20.

Apart from the time profile of the switch control signals the diagrams of FIG. 20 show the time profile of the voltage $U_C$ at the storage capacitor 66 and of the output voltage $U_A$ in the course of a plurality of consecutive cycles Z. Each cycle Z is divided into 6 phases which are denoted 1 to 6. The switches $S_1$ and $S_2$ are controlled by a periodic square-wave signal in antiphase manner so that the switch $S_1$ is open when the switch $S_2$ is closed and vice-versa. The switches $S_1$ and $S_2$ assume their alternating states in each case for the duration of one of the phases 1 to 6. When the switch $S_1$ is closed and the switch $S_2$ is open, which is the case in each of the phases 1, 3 and 5 of each cycle Z, the capacitor 152 lying in the input circuit of the operational amplifier $A_1$ can be applied by one of the switches $S_0$ to $S_2$ to one of the voltages $U_2$, $U_3$ or $U_{01}$ and correspondingly charged without thereby influencing the charge in the storage capacitor 66. The circuit is then in the conditioning phase for the conditioning of the capacitor 152. If on the other hand the switch $S_1$ is open and the switch $S_2$ is closed and the buffer 65 is ready for the transfer of charge from the capacitor 152 to the storage capacitor 66.

The switches $S_{27}$ and $S_{28}$ are likewise again controlled by a periodic square-wave signal in antiphase manner so that the switch $S_{27}$ is open when the switch $S_{28}$ is closed and vice-versa. During the phases 1 to 4 of each cycle Z the switch $S_{27}$ is closed and the switch $S_{28}$ is open. The phases 1 to 4 of each cycle Z thus form a subcycle $Z_1$ in which the voltage $U_1$ is applied to the resistor half-bridge 140. In contrast, in phases 5 and 6 the switch $S_{28}$ is closed and the switch $S_{27}$ open. The phases 5 and 6 thus form a subcycle $Z_A$ in which the voltage $U_{A2}$ is applied to the resistor half-bridge 140.

In each subcycle $Z_1$ in which the voltage $U_1$ is applied to the resistor half-bridge 60 the voltages $U_2$ and $U_3$ have the following values:

$$U_{2(1-4)} = U_1 \cdot \frac{R - dR}{(R - dR) + (R + dR)} = U_1 \cdot \frac{R - dR}{2R} \quad (159)$$

$$U_{3(1-4)} = U_1 \cdot \frac{R + dR}{(R - dR) + (R + dR)} = U_1 \cdot \frac{R + dR}{2R} \quad (160)$$

In each subcycle $Z_A$ in which the voltage $U_{A2}$ is applied to the resistor half-bridge 140 the voltages $U_2$ and $U_3$ have the values $$U_{2(5,6)} = U_{A2} \cdot \frac{R - dR}{(R - dR) + (R + dR)} = U_{A2} \cdot \frac{R - dR}{2R} \quad (161)$$

-continued $$U_{3(5,6)} = U_{A2} \cdot \frac{R + dR}{(R - dR) + (R + dR)} = U_{A2} \cdot \frac{R + dR}{2R} \quad (162)$$

The signal processing circuit of FIG. 19 operates like that of FIG. 11 by the principle of charge balancing which takes place in the storage capacitor 66. The function block 150 furnishes discrete charge packets which are transferred to the storage capacitor 66. Said charge packets are generated in that the capacitor 152 is alternately charged and reverse charged by the different voltages $U_2$, $U_3$ and $U_{01}$ with the aid of the switches $S_{20}$, $S_{21}$, $S_{22}$. The charge packets stored in the storage capacitor 66 and summated are transferred by closing the switch $S_7$ to the integration capacitor 72. With the time profile of the various switch control signals illustrated in FIG. 20 the following time sequence results for the operation of the signal processing circuit of FIG. 19:

Phase 1:

At the start of phase 1 of each cycle Z the charge applied on the preceding cycle is still present on the storage capacitor 66. For the duration of the phase 1 the switch $S_1$ is closed and the switch $S_2$ open so that the storage capacitor 66 is separated form the output of the operational amplifier $A_1$. The switch $S_7$ is closed for the duration of the phase 1 so that a charge transfer takes place from the storage capacitor 66 to the integration capacitor 72. The storage capacitor 66 is thereby discharged to the residual charge $$Q_{C(R)} = (U_{02} + U_B - U_{01} - U_3) \cdot C \quad (163)$$

the reverse charge amount flowing to the integration capacitor 72.

Furthermore, for the duration of the phase 1 the circuit is in the conditioning phase for the capacitor 152 because the switch $S_1$ is closed and the switch $S_2$ is open. Since at the same time the switch $S_{21}$ is closed, the capacitor 152 is connected to the reference conductor 61 so that it is charged to the charge $$Q_{Cm(1)} = (U_{01} + U_{3(1-4)}) \cdot C_m \quad (164)$$

without the charge of the storage capacitor 66 being influenced by this charging operation.

Phase 2:

In phase 2 of each cycle Z the switch $S_1$ is open and the switch $S_2$ closed so that the buffer 65 is ready for the transfer of charge to the storage capacitor 66. At the same time the switch $S_{22}$ is closed so that the capacitor 152 is connected via the connecting conductor 153 to the noninverting input of the operational amplifier $A_1$. As a result, at the capacitor 152 only the offset voltage $U_{01}$ is present by which it is reverse charged to the charge $$Q_{Cm(2)} = U_{01} \cdot C_m \quad (165)$$

The reverse charge amount $$dQ_{Cm(1,2)} = Q_{Cm(2)} - Q_{Cm(1)} = -U_{3(1-4)} \cdot C_m \quad (166)$$

flows to the storage capacitor 66 and causes a negative change of the voltage $U_C$ as is apparent from the associated diagram of FIG. 20.

Phase 3:

In phase 3 the switch $S_1$ is again closed and the switch $S_2$ open so that the circuit is in the conditioning phase for the capacitor 152. However, the switch $S_7$ remains open so that no charge transfer takes place from the storage capacitor 66 to the integration capacitor 72 and the storage capacitor retains its charge. Furthermore, the switch $S_{20}$ is now closed so that the capacitor 152 is connected to the terminal 60 and is thus charged to the charge $$Q_{Cm(3)} = (U_{01} - U_{2(1-4)}) \cdot C_m \quad (167)$$

Phase 4:

In phase 4 the switch $S_1$ is open and the switch $S_2$ is closed so that the buffer 65 is ready for the transfer of charge. At the same time the switch $S_{22}$ is again closed so that the capacitor 152 is connected via the connecting conductor 152 to the noninverting input of the operational amplifier $A_1$ and by the offset voltage $U_{01}$ is reverse charged to the charge $$Q_{Cm(4)} = U_{01} \cdot C_m \quad (168)$$

The reverse charge amount $$dQ_{Cm(3,4)} = Q_{Cm(4)} - Q_{C(3)} = U_{2(1-4)} \cdot C_m \quad (169)$$

flows to the storage capacitor 66 and causes a positive change of the voltage $U_C$ as is apparent from the associated diagram of FIG. 20. This positive voltage change is however smaller than the negative voltage change caused in the phase 2 because the voltage $U_{2(1-4)}$ is less than the voltage $U_{3(1-4)}$.

Thus, in the phases 1 to 4 altogether a measuring charge packet $$dQ_M = dQ_{Cm(1,2)} + dQ_{Cm(3,4)} = U_{2(1-4)} \cdot C_m - U_{3(1-4)} \cdot C_m \quad (170)$$

has been transferred to the storage capacitor 66. If the values from the equations (159), (160) are inserted for $U_{2(1-4)}$ and $U_{3(1-4)}$, this gives $$dQ_M = U_1 \cdot C_m (R - dR)/2R^2 - U_1 \cdot C_m (R + dR)/2R = -U_1 \cdot C_m \cdot dR/R \quad (171)$$

The difference between the changes of the voltage $U_C$ caused in phases 2 and 4 is proportional to this measuring charge packet $dQ_M$, as is indicated in the associated diagram of FIG. 20.

Phase 5:

Phase 5 is again a conditioning phase for the capacitor 152 Since the switch $S_{20}$ is closed, the capacitor is charged to the charge $$Q_{Cm(5)} = (U_{01} - U_{2(5,6)}) \cdot C_m \quad (172)$$

Phase 6:

In phase 6 the switch $S_{21}$ is closed so that the capacitor 152 is connected to the reference conductor 61 and is reverse charged to the charge $$Q_{Cm(6)} = (U_{01} - U_{3(5,6)}) \cdot C_m \quad (173)$$

The reverse charge amount is transferred as compensation charge packet $$dQ_K = Q_{Cm(6)} - Q_{Cm(5)} = U_{2(5,6)} \cdot C_m + U_{3(5,6)} \cdot C_m \quad (174)$$

to the storage capacitor 66. If the values from the equations (161), (162) are inserted for $U_{2(5,6)}$ and $U_{3(5,6)}$, this gives, $$dQ_K = U_{A2} \cdot C_m(R-dR)/2R + U_{A2} \cdot C_m(R+dR)/2 \cdot R = U_{A2} \cdot C_m \quad (175)$$

The compensation charge packet $dQ_K$ causes a positive charge of the voltage $U_C$ proportional thereto as is indicated in the corresponding diagram of FIG. 20.

Each cycle Z may consist of n subcycles $Z_1$ and k subcycles $Z_A$; FIG. 20 shows the relationships for the special case n=k=1. In the general case in each cycle Z the charge $$Q_{C(Z)} = Q_{C(R)} + n \cdot dQ_M + k \cdot dQ_K \quad (176)$$

has collected on the storage capacitor 66. At the start of the following cycle Z the storage capacitor 66 is again discharged to the residual charge $Q_{C(R)}$. The differential charge $$dQ = n \cdot dQ_M + k \cdot dQ_K \quad (177)$$

is transferred to the integration capacitor 72, thereby regulating the output voltage $U_{A2}$. The circuit thus operates as a closed loop which tends to bring the output voltage $U_{A2}$ to a value at which the sum of the k compensation charge packets $dQ_K$ is equal to the sum of the n measuring charge packets $dQ_M$. When this charge is reached, charge balance exists in the storage capacitor 66

$$n \cdot dQ_M + k \cdot dQ_K = 0 \quad (178)$$

By inserting the values for $dQ_M$ and $dQ_K$ from the equations (171), (175), this gives the transfer function of the circuit:

$$\frac{U_{A2}}{U_1} = \frac{n}{k} \cdot \frac{dR}{R} \quad (179)$$

The ratio of the analog output voltage $U_{A2}$ to the supply voltage $U_1$ therefore indicates in the steady state the desired resistance ratio directly. In FIG. 20 it is assumed that the steady stage has arisen at the instant $t_E$ at the end of the second cycle Z illustrated. From this instant on the voltage $U_A$ no longer changes as long as the resistances 141, 142 retain their values. On a change of the resistance ratio dR/R the output voltage $U_A$ changes to another value with a time constant defined by the capacitance C of the integrated capacitor 72.

The capacitance value of the capacitor 152 does not enter the transfer function but is does govern the magnitude of the charge packets and thus the dimensioning of the capacitors 66 and 72. Likewise, the capacitance values of the capacitors 66 and 72, the offset voltages of the operational amplifiers, the supply voltage of the circuit and the frequency with which the control circuit is clocked do not enter the final result.

The value of the voltage $U_1$ is limited only by the working range of the circuit. If the supply voltage of the circuit is chosen as supply voltage $U_1$, then in accordance with equation (178) an output signal is obtained which is proportional to the current supply voltage.

If a fixed reference voltage $U_{ref}$ is chosen as supply voltage $U_1$ then in accordance with equation (178) an absolute output signal is obtained.

FIG. 21 shows a modification of the circuits of FIGS. 14 and 19 which furnish an analog output current $I_A$ instead of an analog output voltage $U_A$. In FIG. 21 the buffer 65 and the integrator 67 of FIGS. 14 and 19 are each represented by a circuit block. The circuit block 180 of FIG. 21 corresponds to the circuit group of the circuits of FIGS. 14, 19 consisting of the sensor and the function block, i.e. the sensor 50 and the function block 53 of FIG. 14 or the resistor half-bridge 140 and the function block 150 of FIG. 19.

In FIG. 21 the output of the integrator 67 is connected to the base of an n-p-n transistor 81 which is connected as emitter follower with a resistor 182 of value $R_A$ lying in the emitter circuit. The feedback leading to the switch $S_{28}$ is connected to the emitter of the transistor 181. The output voltage $U_{A2}$ of the integrator 67 causes the output current $I_A$ to flow through the collector-emitter circuit of the transistor 181. Thus, with this circuit the voltage $$U_{RA} = R_A \cdot I_A \quad (180)$$

is fed back to the input. Thus, for the compensation charge packet $dQ_K$ in the case of the circuit of FIG. 14, instead of equation (141) we have:

$$dQ_K = -(V_2 - V_3) \cdot U_{RA} \cdot C_{ref} \quad (181)$$

and in the case of the circuit of FIG. 19 instead of the equation (158):

$$dQ_K = U_{RA} \cdot C_m \quad (182)$$

Accordingly, for the circuit of FIG. 14 instead of the equation (158) the transfer function $$\frac{I_A}{U_1} = \frac{n}{k \cdot R_A} \cdot \frac{C_x - C_{ref}}{C_{ref}} \quad (183)$$

is obtained and for the circuit of FIG. 19 instead of the equation (179) the transfer function $$\frac{I_A}{U_1} = \frac{n}{k \cdot R_A} \cdot \frac{dR}{R} \quad (184)$$

The circuit of FIG. 21 is particularly suitable for measuring arrangements in which the measured value signal is transmitted in the form of a direct current via a single two-conductor line, said current being variable for example between 4 mA and 20 mA and also comprises the supply current for the sensor and the signal processing circuit.

TABLE I

| Capacitor | Control signal | Charge packets | Correction coefficient |
|---|---|---|---|
| 91 | $S_{11+}$ | $dQ_{91+} = +C_{91}/C \cdot (C_x - C_{ref}) \cdot (U_2 - U_3)$ | $B_{21} = \pm C_{91}/C$ |
|  | $S_{11-}$ | $dQ_{91-} = -C_{91}/C \cdot (C_x - C_{ref}) \cdot (U_2 - U_3)$ |  |
| 92 | $S_{12+}$ | $dQ_{92+} = +C_{92}/C \cdot (C_x - C_{ref}) \cdot (U_2 - U_3)$ | $C_{21} = \pm C_{92}/C$ |
|  | $S_{12-}$ | $dQ_{92-} = -C_{92}/C \cdot (C_x - C_{ref}) \cdot (U_2 - U_3)$ |  |
| 93 | $S_{13+}$ | $dQ_{93+} = +C_{93}/C \cdot C_{ref} \cdot (U_2 - U_3)$ | $B_{11} = \pm C_{93}/C$ |
|  | $S_{13-}$ | $dQ_{93-} = -C_{93}/C \cdot C_{ref} \cdot (U_2 - U_3)$ |  |
| 94 | $S_{14+}$ | $dQ_{94+} = +C_{94}/C \cdot C_{ref} \cdot (U_2 - U_3)$ | $C_{11} = \pm C_{94}/C$ |

TABLE I-continued

| Capacitor | Control signal | Charge packets | Correction coefficient |
|---|---|---|---|
|  | $S_{14-}$ | $dQ_{94-} = -C_{94}/C \cdot C_{ref} \cdot (U_2 - U_3)$ |  |
| 95 | $S_{15+}$ | $dQ_{95+} = +C_{95}/C \cdot (C_x - C_{ref}) \cdot (U_2 - U_3)$ | $B_{22} = \pm C_{95}/C$ |
|  | $S_{15-}$ | $dQ_{95-} = -C_{95}/C \cdot (C_x - C_{ref}) \cdot (U_2 - U_3)$ |  |
| 96 | $S_{16+}$ | $dQ_{96+} = +C_{96}/C \cdot (C_x - C_{ref}) \cdot (U_2 - U_3)$ | $C_{22} = \pm C_{96}/C$ |
|  | $S_{16-}$ | $dQ_{96-} = -C_{96}/C \cdot (C_x - C_{ref}) \cdot (U_2 - U_3)$ |  |
| 97 | $S_{17+}$ | $dQ_{97+} = +C_{97}/C \cdot C_{ref} \cdot (U_2 - U_3)$ | $B_{12} = \pm C_{97}/C$ |
|  | $S_{17-}$ | $dQ_{97-} = -C_{97}/C \cdot C_{ref} \cdot (U_2 - U_3)$ |  |
| 98 | $S_{18+}$ | $dQ_{98+} = +C_{98}/C \cdot C_{ref} \cdot (U_2 - U_3)$ | $C_{12} = \pm C_{98}/C$ |
|  | $S_{18-}$ | $dQ_{98-} = -C_{98}/C \cdot C_{ref} \cdot (U_2 - U_3)$ |  |

TABLE II

| Frequency | Charge packet units | |
|---|---|---|
|  | $(C_x - C_{ref}) \cdot (U_2 - U_3)$ | $C_{ref} \cdot (U_2 - U_3)$ |
| n | $\cdot (-1)$ | $\cdot 0$ |
| n−k | $\cdot (B_{21} + B_{22} \cdot V_T)$ | $\cdot (B_{11} + B_{12} \cdot V_T)$ |
| k | $\cdot (C_{21} + C_{22} \cdot V_T)$ | $\cdot (C_{11} + C_{12} \cdot V_T)$ |

TABLE III

| Capacitor | Control signal | Charge packets | Correction coefficient |
|---|---|---|---|
| 91 | $S_{11+}$ | $dQ_{91+} = +C_{91}/C \cdot dR/R \cdot C_m \cdot U_1$ | $B_{21} = \pm C_{91}/C$ |
|  | $S_{11-}$ | $dQ_{91-} = -C_{91}/C \cdot dR/R \cdot C_m \cdot U_1$ |  |
| 92 | $S_{12+}$ | $dQ_{92+} = +C_{92}/C \cdot dR/R \cdot C_m \cdot U_1$ | $C_{21} = \pm C_{92}/C$ |
|  | $S_{12-}$ | $dQ_{92-} = -C_{92}/C \cdot dR/R \cdot C_m \cdot U_1$ |  |
| 93 | $S_{13+}$ | $dQ_{93+} = +C_{93}/C \cdot C_m \cdot U_1$ | $B_{11} = \pm C_{93}/C$ |
|  | $S_{13-}$ | $dQ_{93-} = -C_{93}/C \cdot C_m \cdot U_1$ |  |
| 94 | $S_{14+}$ | $dQ_{94+} = +C_{94}/C \cdot C_m \cdot U_1$ | $C_{11} = \pm C_{94}/C$ |
|  | $S_{14-}$ | $dQ_{94-} = -C_{94}/C \cdot C_m \cdot U_1$ |  |
| 95 | $S_{15+}$ | $dQ_{95+} = +C_{95}/C \cdot dR/R \cdot C_m \cdot U_1$ | $B_{22} = \pm C_{95}/C$ |
|  | $S_{15-}$ | $dQ_{95-} = -C_{95}/C \cdot dR/R \cdot C_m \cdot U_1$ |  |
| 96 | $S_{16+}$ | $dQ_{96+} = +C_{96}/C \cdot dR/R \cdot C_m \cdot U_1$ | $C_{22} = \pm C_{96}/C$ |
|  | $S_{16-}$ | $dQ_{96-} = -C_{96}/C \cdot dR/R \cdot C_m \cdot U_1$ |  |
| 97 | $S_{17+}$ | $dQ_{97+} = +C_{97}/C \cdot C_m \cdot U_1$ | $B_{12} = \pm C_{97}/C$ |
|  | $S_{17-}$ | $dQ_{97-} = -C_{97}/C \cdot C_m \cdot U_1$ |  |
| 98 | $S_{18+}$ | $dQ_{98+} = +C_{98}/C \cdot C_m \cdot U_1$ | $C_{12} = \pm C_{98}/C$ |
|  | $S_{18-}$ | $dQ_{98-} = -C_{98}/C \cdot C_m \cdot U_1$ |  |

TABLE IV

| Frequency | Charge packet units | |
|---|---|---|
|  | $dR/R \cdot C_m \cdot U_1$ | $C_m \cdot U_1$ |
| 2n | $\cdot (-1)$ | $\cdot 0$ |
| n−k | $\cdot (B_{21} + B_{22} \cdot V_T)$ | $\cdot (B_{11} + B_{12} \cdot V_T)$ |
| k | $\cdot (C_{21} + C_{22} \cdot V_T)$ | $\cdot (C_{11} + C_{12} \cdot V_T)$ |

We claim:

1. A processor of sensor signals which are supplied by a measuring sensor fed by a source of a supply signal, which measuring sensor in response to a physical action of a physical measured quantity to be determined and in response to one or more physical disturbance variables generates a measuring effect $M_1$ which depends on the physical measured quantity to be determined and on the physical disturbance variables, and which sensor signals are also supplied by one or more further sensors which generate measuring effects $M_2 \ldots M_n$ which depend only on the physical disturbance variables, wherein the measuring sensor and each physical disturbance sensor generate output signals proportional to the product of one of the measuring effects with a supply signal supplied to the sensors, the processor comprising:

first weighting means for weighting the output signal of the measuring sensor and at least one signal related to its supply signal with first adjustable coefficients, second weighting means for weighting the output signal of the further sensors and at least one signal related to their supply signals with second adjustable coefficients, first summing means for summing the output signals of the first weighting means to generate a first sum:

$$S = b_{11} + b_{12} \cdot M_2 + \ldots + b_{1n} \cdot M_n + (b_{21} + b_{22} \cdot M_2 + \ldots + b_{2n} \cdot M_n) \cdot M_1$$

and second summing means for summing the output signals of the second weighting means to generate a second sum:

$$S_{ref} = c_{11} + c_{12} \cdot M_2 + \ldots + c_{1n} \cdot M_n + (c_{21} + c_{22} \cdot M_2 + \ldots + c_{2n} \cdot M_n) \cdot M_1$$

and an analog to digital converter having a signal input, a reference input, and an output, said signal input being coupled to an output of the first summing means and the reference input being coupled to an output of the second summing means, the analog to digital converter supplying at its output a digital signal which corresponds to the ratio between the analog signals supplied to the signal input and the reference input and, therefore, corresponds to the transfer function $$\frac{S}{S_{ref}} = \frac{b_{11} + b_{12} \cdot M_2 + \ldots + b_{1n} \cdot M_n + (b_{21} + b_{22} \cdot M_2 + \ldots + b_{2n} \cdot M_n) \cdot M_1}{c_{11} + c_{12} \cdot M_2 + \ldots + c_{1n} \cdot M_n + (c_{21} + c_{22} \cdot M_2 + \ldots + c_{2n} \cdot M_n) \cdot M_1}$$

the coefficients $b_{11} \ldots b_{2n}$ and $c_{11} \ldots c_{2n}$ being adjustable for obtaining a desired transfer behavior in dependence upon the properties of the measuring sensor.

2. The processor according to claim 1 in which at least one further sensor is a temperature-dependent resistor and in which the measuring effect generated by the further sensor is a temperature-dependent voltage division ratio.

3. The processor according to claim 2 in which the output signal of at least one sensor is used to form the supply signal of at least one further sensor.

4. The processor according to claim 1 in which the analog-digital converter operates by the principle of current balance between the currents supplied to the signal input and the reference input.

5. A processor of sensor signals which are supplied by a measuring sensor fed by a source of a supply signal, which measuring sensor in response to a physical action of a physical measured quantity to be determined and in response to one or more physical disturbance variables generates a sensor signal measuring effect $M_1$ which depends on the physical measured quantity to be determined and on the physical disturbance variables, and which are supplied by one or more further sensors which generate sensor signal measuring effects $M_2 \ldots M_n$ which depend only on the physical disturbance variables, the processor receiving said measuring effects as input quantities, the processor comprising:

switch-capacitor structures for processing the sensor signals by charge balancing to generate an output quantity S, the ratio of the output quantity S to a reference quantity $S_{ref}$ being defined in dependence upon the measuring effects $M_1, M_2, \ldots M_n$ forming the input quantities by a transfer function as given by the following equation $$\frac{S}{S_{ref}} = \frac{\begin{array}{l}b_{11} + b_{12} \cdot M_2 + \ldots + b_{1n} \cdot M_n + \\ (b_{21} + b_{22} \cdot M_2 + \ldots + b_{2n} \cdot M_n) \cdot M_1\end{array}}{\begin{array}{l}c_{11} + c_{12} \cdot M_2 + \ldots + c_{1n} \cdot M_n + \\ (c_{21} + c_{22} \cdot M_2 + \ldots + c_{2n} \cdot M_n) \cdot M_1\end{array}}$$

the coefficients $b_{11} \ldots b_{2n}$ and $c_{11} \ldots c_{2n}$ being adjustable for obtaining a desired transfer behavior in dependence upon the properties of the measuring sensor.

6. The processor according to claim 5 in which charge packets are incorporated into the charge balance which are formed from signals which are in fixed relationship to the supply signals of the sensors.

7. The processor according to claim 5 with a function block having cyclically actuated switches which in conjunction with at least one capacitor serve to form measuring charge packets, a correction circuit comprising switch-capacitor structures for forming correction charge packets weighted corresponding to the coefficients of the transfer function, and an integrator for integrating the measuring charge packets and the correction charge packets and continuously furnishing an output signal representing the integration result, and a control circuit for cyclic actuation of the switches of the function block and the correction circuit.

8. The processor according to claim 7 further comprising a comparator which on each exceeding or dropping below a predetermined threshold value by the output signal of the integrator initiates a compensation cycle in the course of which a compensation charge packet is supplied to the integrator by which the latter is returned to an initial state, and said control circuit on each initiation of a compensation cycle varies the cyclic actuation of the switches to form a compensation charge packet.

9. The processor according to claim 7 in which compensation charge packets are formed by switch capacitor structures of the correction circuit or by the function block.

10. The processor according to claim 7 in which switching phases of the cyclic switch actuation are defined by the control circuit and are adjustable for selecting the sign of the correction charge packets and/or for processing different measuring effects.

11. The processor according to claim 7 in which the capacitance values of the capacitors of the correction circuit are adjustable for weighting the charge packets corresponding to the coefficients of the transfer function.

12. The processor according to claim 7 in which the weighting of voltages sampled by the switch-capacitor structures of the correction circuit for generating the charge packets is adjustable corresponding to the coefficients of the transfer function.

13. The processor according to claim 12 in which that an adjustable resistor voltage divider is associated with each switch-capacitor structure of the correction circuit.

14. The processor according to claim 7 wherein each capacitor cooperating with the switches of the function block for forming the measuring charge packets is a capacitor of a capacitive sensor furnishing the measuring effect.

15. The processor according to claim 14 in which the function block includes a voltage divider from which the voltages serving to form the measuring charge packets are tapped and which is adjusted for adapting the measuring charge packets to an operating range of the processor.

16. The processor according to claim 7 in which the measuring sensor is one of a resistor half and full bridge and the function block includes at least one capacitor cooperating with the switches for forming the measuring charge packets.

17. The processor according to claim 16 in which the capacitor is adjusted to adapt the measuring charge packets to an operating range of the correction circuit.

18. The processor according to claim 7 further comprising means for generating an analog output signal corresponding to the measuring effect and the supply of the measuring sensor is influenced by a feedback signal being in fixed relationship to the analog output signal to obtain the charge balance.

19. The processor according to claim 18 in which feedback signal is used in periodic alternation with a supply signal for feeding the measuring sensor.

20. The processor according to claim 19 further comprising means for controlling switch-capacitor structures to generate the measuring charge packets dependent on the measuring effect on supplying the sensor with the supply signal and the compensation charge packets independent of the measuring effect on supplying the sensor with the feedback signal.

21. The processor according to claim 20 in which the supply signal is a voltage, the analog output signal of the processor is a current and the feedback signal is a voltage proportional to this current.

22. The processor according to claim 19 in which the supply signal is a voltage, the analog output signal of the processor is a current and the feedback signal is a voltage proportional to this current.

23. The processor according to 23 in which the supply signal is a voltage and the analog output signal of the processor is likewise a voltage which is used at the same time as feedback signal.

24. The processor according to claim 23 in which the supply signal is the current supply voltage or a fixed reference voltage.

25. The processor according to claim 23 in which the supply signal is a voltage, the analog output signal of the signal processing circuit is a current and the feedback signal is a voltage proportional to this current.

* * * * *